(12) United States Patent
Pal et al.

(10) Patent No.: US 10,664,560 B2
(45) Date of Patent: May 26, 2020

(54) MULTI-SCALE MESH MODELING SOFTWARE PRODUCTS AND CONTROLLERS

(71) Applicant: UNIVERSITY OF LOUISVILLE RESEARCH FOUNDATION, INC., Louisville, KY (US)

(72) Inventors: Deepankar Pal, Jeffersonville, IN (US); Nachiket Patil, Louisville, KY (US); Brent Stucker, Louisville, KY (US)

(73) Assignee: University of Louisville Research Foundation, Inc., Louisville, KY (US)

(*) Notice: Subject to any disclaimer, the term of this patent is extended or adjusted under 35 U.S.C. 154(b) by 530 days.

(21) Appl. No.: 15/105,683

(22) PCT Filed: Dec. 19, 2014

(86) PCT No.: PCT/US2014/071651
§ 371 (c)(1),
(2) Date: Jun. 17, 2016

(87) PCT Pub. No.: WO2015/095785
PCT Pub. Date: Jun. 25, 2015

(65) Prior Publication Data
US 2016/0321384 A1   Nov. 3, 2016

Related U.S. Application Data

(60) Provisional application No. 61/918,475, filed on Dec. 19, 2013.

(51) Int. Cl.
*G06F 17/50* (2006.01)
*B33Y 30/00* (2015.01)
(Continued)

(52) U.S. Cl.
CPC ........ *G06F 17/5018* (2013.01); *B22F 3/1055* (2013.01); *B33Y 30/00* (2014.12);
(Continued)

(58) Field of Classification Search
CPC ...... G06F 17/5018; B33Y 30/00; B33Y 50/02
(Continued)

(56) References Cited

U.S. PATENT DOCUMENTS

| 6,678,642 B1 | 1/2004 | Budge |
| 2003/0055577 A1* | 3/2003 | Gartner .................. B28D 1/30 |
| | | 702/32 |

(Continued)

OTHER PUBLICATIONS

Yong Chen, "3D Texture Mapping for Rapid Manufacturing", 2007, University of Southern California (Year: 2007).*

(Continued)

*Primary Examiner* — Saif A Alhija
*Assistant Examiner* — Faraj Ayoub
(74) *Attorney, Agent, or Firm* — Jenkins, Wilson, Taylor & Hunt, P.A.

(57) ABSTRACT

Simulation systems, manufacturing systems, software products and controllers are provided with multi-scale modeling in which a coarse mesh and a fine mesh that models a stimulus are decoupled. The fine mesh can be moved within the coarse mesh with a cut and paste operation. The coarse mesh is updated by sparsely propagated effects through the coarse mesh. Simulations of the invention can be conducted in real-time, and be used as controllers in manufacturing systems, such as additive manufacturing systems. A number of efficient methods are provided for solving meshing determinations that arise from movement of a stimulus modeled within a fine mesh.

22 Claims, 46 Drawing Sheets

(51) Int. Cl.
B33Y 50/02 (2015.01)
B22F 3/105 (2006.01)
G05B 19/4099 (2006.01)

(52) U.S. Cl.
CPC .......... *B33Y 50/02* (2014.12); *G05B 19/4099* (2013.01); *B22F 2003/1057* (2013.01); *G05B 2219/35134* (2013.01); *G05B 2219/49007* (2013.01); *G06F 2217/12* (2013.01); *G06F 2217/16* (2013.01); *Y02P 10/295* (2015.11)

(58) Field of Classification Search
USPC ........................................................... 703/2
See application file for complete search history.

(56) References Cited

U.S. PATENT DOCUMENTS

| | | | |
|---|---|---|---|
| 2004/0194051 A1* | 9/2004 | Croft ................... | G06F 17/5018 703/2 |
| 2004/0230411 A1 | 11/2004 | Zheng et al. | |
| 2010/0074280 A1* | 3/2010 | Ma ...................... | H01S 3/08031 372/19 |
| 2011/0110560 A1* | 5/2011 | Adhikari ................. | G06F 3/017 382/103 |
| 2013/0124150 A1* | 5/2013 | Kim .................... | G06F 17/5018 703/1 |

OTHER PUBLICATIONS

Liu et al., "Strange eigenmodes and decay of variance in the mixing of diffusive tracers", 2004, Elsevier (Year: 2004).*
Zeng et al, "A New Dynamic Mesh Method Applied to the Simulation of Selective Laser Melting", 2013, Department of Industrial Engineering, University of Louisville (Year: 2013).*
Pal et al., "An Integrated Approach to Cyber-Enabled Additive Manufacturing using Physics based, Coupled Multi-scale Process Modeling", 2013, Department of Industrial Engineering, University of Louisville, ResearchGate (Year: 2013).*
Contuzzi et al., "3D Finite Element Analysis in the Selective Laser Melting Process", 2011, Dept of Management and Mech Engr (Year: 2011).*
Wu et al, "The virtual node polygonal element method for nonlinear thermal analysis with application to hybrid laser welding", 2013, School of engineering, Institute of Mechanics and Advanced Material, Cardiff University. (Year: 2013).*
Boillat et al, "A Three Dimensional Fem-simulation of the Selective Laser Sintering Process With Locally Refined Meshes and Non-constant Thermal Conductivity", 2002, Institute for Production and Robotics, Laboratory for Production Management and Process. (Year: 2002).*
Mumtaz et al, "Selective Laser Melting of thin wall parts using pulse shaping", 2010, Elsevier, ScienceDirect (Year: 2010).*
Liu, Weiju, et al., "Strange eigenmodes and decay of variance in the mixing of diffusive tracers", Physica D, 188, (2004), pp. 1-39.
Pal, Deepankar, et al., "An Integrated Approach to Cyber-Enabled Additive Manufacturing using Physics based, Coupled Multi-scale Process Modeling", SFF Symposium 2013, 24th International Solid Freeform Fabrication Symposium, Proceedings, vol. 1, Austin, TX, US, Aug. 12-14, 2013, 18 pages.
Zeng, Kai, et al., "A New Dynamic Method Applied to the Simulation of selective Laser Melting", Proceedings of the Solid Freeform Fabrication Symposium, Austin, TX, Aug. 2013, pp. 549-559.
Adjerid and Flaherty, "A moving finite element method with error estimation and refinement for one-dimensional time dependent partial differential equations," SIAM Journal on Numerical Analysis, 1986, 23(4): 778-796.
Ahmed, "Analysis of Data Transfer Methods Between Non-Matching Meshes in Multiphysics Simulations," Master Thesis, Master of Science in Computational Engineering, FAU Universitat Erlangen-Nurnberg, 2006, 90 pages.

Berger and Colella, "Local Adaptive Mesh Refinement for Shock Hydrodynamics," Journal of Computational Physics, 1989, 82(1): 64-84.
Berger and Oliger, "Adaptive mesh refinement for hyperbolic partial differential equations," Journal of Computational Physics, 1984, 53(3): 484-512.
Boussetta et al., "Adaptive remeshing based on a posteriori error estimation for forging simulation," Computer Methods in Applied Mechanics and Engineering, 2006, 195( 48): 6626-6645.
Carey, "A perspective on adaptive modeling and meshing (AM &M)," Computer Methods in Applied Mechanics and Engineering, 2006, 195: 214-235.
Ceniceros and Hou, "An efficient dynamically adaptive mesh for potentially singular solutions," Journal of Computational Physics, 2001, 172(2): 609-639.
Childs et al., "Selective laser sintering (melting) of stainless and tool steel powders: experiments and modelling," Proceedings of the Institution of Mechanical Engineers, Part B: Journal of Engineering Manufacture, 2005, 219: 339-357.
Givoli and Rivkin, "A Finite Element Method for Domains with Corners," International Journal for Numerical Methods in Engineering, 1992, 35: 1329-1345.
Gu et al., "Influences of Energy Density on Porosity and Microstructure of Selective Laser Melted 17-4 PH Stainless Steel," 2013, 16 pages.
Hyman and Li "Interactive and dynamic control of adaptive mesh refinement with nested hierarchical grids," Rea port, (5462), 1998, 26 pages.
Ku and Hatziavramidis, "Chebyshev Expansion Methods for the Solution of the Extended Graetz Problem," Journal of Computational Physics, 1984, 495-512.
Lax and Milgram, "Parabolic equations, Contributions to the theory of partial differential equations," Annals of Mathematics Studies, 1954, 33: 167-190.
Liao et al., "Level-set-based deformation methods for adaptive grids," Journal of Computational Physics, 2000, 159(1): 103-122.
Murti and Vallippan, "Numerical inverse isoparametric mapping in remeshing and nodal quantity contouring," Comput. Struct, 1986, 22(6): 1011-1021.
Peyre et al., "Analytical and numerical modelling of the direct metal deposition laser process," Journal of Physics D: Applied Physics, 2008, 41: 025403.
Salerno, "How to Recognize the Order of Infinitesimal Mechanisms: A Numerical Approach," International Journal for Numerical Methods in Engineering, 1992, 35: 1351-1395.
Shen and Chou, "Thermal Modeling of Electron Beam Additive Manufacturing Process-Powder Sintering Effects," Proceedings of the ASME 2012 International Manufacturing Science and Engineering Conference MSEC2012-7253, 2012, 9 pages.
Shestakov and Mirin, A Fourier Method for Three-Dimensional Partial Differential Equations in Periodic Geometry. Application: HELIAC, Journal of Computational Physics, 1984, 56: 469-494.
Smith et al., "An evaluation of computational algorithms to interface between CFD and, CSD methodologies," Wright-Patterson Air Force Base Report No. WL-TR-96-3055, 1995, 472 pages.
Zhang et al., "Numerical algorithm using multizone adaptive grid generation for multiphase transport processes with moving and free boundaries," Numerical Heat Transfer, Part B: Fundamentals: An International Journal of Computation and Methodology, 1996, 27 pages.
Zienkiewicz and Zhu, "The superconvergent patch recovery and a posteriori error estimates—Part 1: the technical recovery," International Journal for Numerical Methods in Engineering , 1992, 33(7): 1331-1364.
International Preliminary Report on Patentability corresponding to International Patent Application No. PCT/US2014/071651 dated May 29, 2015.
International Search Report corresponding to International Patent Application No. PCT/US2014/071651 dated May 29, 2015.
Nikoukar et al. Methods for Enhancing the Speed of Numerical Calculations for the Prediction of the Mechanical Behavior of Parts Made Using Additive Manufacturing, Proceedings of the Solid Freeform Fabrication Symposium, Aug. 2013, pp. 525-534.

(56) References Cited

OTHER PUBLICATIONS

Patil, N. et al. (2013) A New Finite Element Solver Using Numerical Eigen Modes for Fast Simulation of Additive Manufacturing Processes. Proceedings of the Solid Freeform Symposium. pp. 535-548.
Summons to Attend Oral Proceedings corresponding to European Patent Application No. 14873030.2—1224 dated Feb. 20, 2019.
Written Opinioin of the International Searching Authority corresponding to International Patent Application No. PCT/US2014/071651 dated May 29, 2015.

* cited by examiner

MULTI-SCALE MESH MODELING SOFTWARE PRODUCTS AND CONTROLLERS

PRIORITY CLAIM AND REFERENCE TO RELATED APPLICATION

The application claims priority under 35 U.S.C. § 119 from prior provisional application Ser. No. 61/918,475, which was filed Dec. 19, 2013. That application is incorporated by reference herein.

STATEMENT OF GOVERNMENT INTEREST

This invention was made with government support under contract numbers N00014-07-1-0633, N00014-11-0689 awarded by the Office of Naval Research; 1234468 awarded by the National Science Foundation; FA8650-12-M-5153 awarded by the United States Air Force; and, 70NANB12H262 awarded by the National Institute for Standards and Technology. The government has certain rights in the invention.

FIELD

Fields of the invention concern modeling and simulation software products. The invention is generally applicable to modeling perturbations caused by energy, such as thermal energy or mechanical energy. Particular example products are utilized for prediction of part characteristics when fabricated using manufacturing processes in general and additive manufacturing technologies in particular. Additional applications of the invention include closed loop control of manufacturing processes, optimization and control software, finite element modeling software products and product design software. The systems and software products mentioned herein are applicable to process modeling, material and space modelling, object and part behavior prediction and can predict responses for a variety of static and dynamic energy sources and sinks and for matter exhibiting various material/geometrical nonlinearities.

BACKGROUND

Additive manufacturing processes are very difficult to model and therefore are hard to predictably control. Example processes such as metal laser sintering (mLS) and electron beam melting (EBM) are incredibly time-consuming to simulate using physics-based finite element modeling. Similarly, other systems that apply a dynamic force to an object or a part being manufactured are extremely time consuming to model.

Additive processes can be characterized by fine-scale finite element meshes. However, meshes that are 10 microns or smaller in size are required to accurately capture the solidification physics around a melt pool for mLS, while the overall part size can be 10,000 times larger than the element size. A uniform mesh size in three dimensions requires more than $10^8$ elements in the first layer and more than $10^{12}$ elements in total to fully capture the physics for a single part that fills much of the powder bed. Since mLS and EBM involve the movement of a point heat source to create a part, capturing the physics requires a time step of 10 microseconds or less during laser/electron beam melting, which for a complete build would require more than $10^{10}$ total time steps. Such a problem can't be solved as a practical matter. A relatively high-speed supercomputer would take more than $10^{18}$ years to solve a problem with this number of elements for this many time steps! The traditional approaches for high-fidelity finite element analysis require over a billion years of computational time to solve a full bed metal laser sintering problem with uniformly small mesh elements. Most models therefore simulate only a small fraction of a part, or simplified "canonical" geometries.

These past efforts have are represented by techniques that model (1) a high-fidelity, multi-physics simulation of a small portion of a larger part; (2) a high-fidelity simulation of a very small part, or (3) a low-fidelity approximation of a small or medium-sized part. Some past efforts use a refinement zone as simulation strategy. The refinement zone may be repeated but is not moved. Past efforts to simulate metal additive manufacturing processes have primarily utilized fine-gridded/static meshing and solution algorithms. See, e.g., Contuzzi, N., Campanelli, S. L. and Ludvico, A. D., "3D Finite Element Analysis in the Selective Laser Melting Process, International Journal of Simulation and Modeling," Vol. 10, Issue 3, pp. 113-121 (2011); Peyre, P., Aubry, P., Fabbro, R., Neveu, R., and Longuet, A., "Analytical and numerical modelling of the direct metal deposition laser process," Journal of Physics D: Applied Physics, Vol. 41, Issue 2, pp. 025403 (2008); Shen, N., and Chou, K., "Thermal Modeling of Electron Beam Additive Manufacturing ProcessPowder Sintering Effects," Proceedings of the ASME 2012 International Manufacturing Science and Engineering Conference MSEC2012-7253 pp. 1-9 (2012); Childs, T. H. C., Hauser, C., and Badrossamay, M., "Selective laser sintering (melting) of stainless and tool steel powders: experiments and modelling. Proceedings of the Institution of Mechanical Engineers, Part B: Journal of Engineering Manufacture," Vol. 219, Issue 4, pp. 339-357 (2005).

Manufacturing processes generally involve energy insertion in matter by contact or non-contact mechanisms. The introduced energy generally results in changes in the parent materials such as solid-state metal working, addition or removal of material, melting, etc. This introduces structural changes at various length scales. Examples include coarse scale geometric changes visible to the naked eye and microstructural changes responsible for material transitions at finer length scales. In traditional manufacturing processes, contributions to fine length scales are orders of magnitude lower than the coarse length scales of the entire part. Additive manufacturing processes involve energy insertion mechanisms as point or line source(s), which leads to appreciable effects at both micro and macroscopic length scales. Current analysis techniques such as asymptotic and continuum based finite element methods are often too simplistic and tied to coarser length scales and do not incorporate microstructural modes. Similarly, spatial homogenization techniques are tied to finer length scales and extrapolate information on the coarser length scale without computing the coupling between the two length scales. Manufacturing techniques such as forging, welding and wire-drawing have been widely viewed as posing macroscopic boundary conditions. The result is that much manufacturing and control is developed by observation, trial and error rather than simulation.

SUMMARY OF THE INVENTION

Preferred embodiments of the invention provide simulation systems, manufacturing systems, software products and controllers. Embodiments of the invention provide multi-scale modeling in which a coarse mesh and a fine mesh that model a stimulus are decoupled. The fine mesh can be moved within the coarse mesh with a cut and paste operation. The coarse mesh is updated by sparsely propagated effects through the coarse mesh. Simulations of the invention can be conducted in real-time, and the results can be used as controllers in manufacturing systems, such as additive manufacturing systems.

A preferred adaptive mesh enables multi-scale meshing and a solution strategy (with its appropriate stiffness construction) for dynamic energy source thermo-mechanical problems can accurately predict thermal and stress/strain fields during metal laser sintering (or any problem involving scalar and higher order tensor fields). The meshing and involved solution strategy can be implemented in such a way that the mesh is refined in a gradual/non-gradual manner (with or without hanging nodes at the interface during mesh transition) encompassing the highly non-linear regime in space very close to the point of energy exposure with an accompanied intelligent stiffness matrix formulation and assembly leading to a faster solution. This strategy is also accompanied with mesh and stiffness de-refinement as the dynamic energy source moves away from the already refined zone along with mesh and stiffness refinement at the new location of concentrated energy exposure. This invention is different with respect to already established Adaptive mesh refinement strategies since they call for regeneration of the mesh and recomputation of the stiffness matrices, and the present methods are much faster and less computationally expensive.

Preferred embodiments use different algorithms to construct scarcity of the pseudo-Cholesky decomposition matrix. The pseudo-Cholesky decomposition matrix has to be generated for a given stiffness matrix. The pseudo-Cholesky matrix helps in faster solution of simulations equations required in linear and nonlinear analysis presented in the present innovation.

DETAILED DESCRIPTION OF THE PREFERRED EMBODIMENTS

Figure 1:
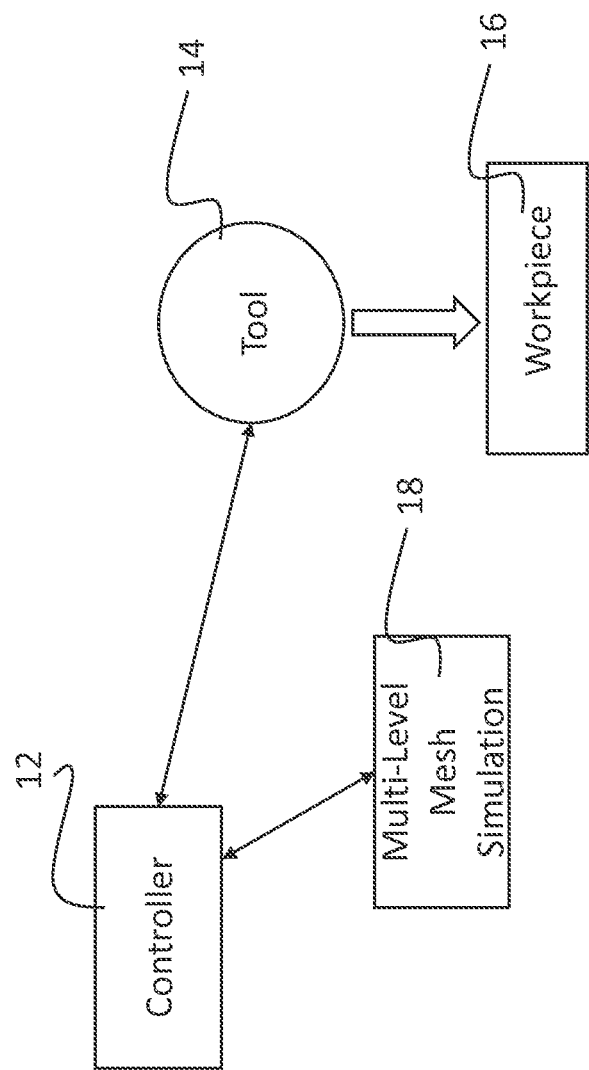
FIG. 1 is a block diagram of an additive manufacturing system of the invention.

The invention has general applicability to modeling and control applications, and particularly closed loop control. Embodiments of the invention can model and control physical processes with high energy sources, such as themomechnical problems including a high energy source. Any physical process including a high energy source, e.g., a laser, that creates a localized anomaly can be modeled and controlled in real time through preferred embodiment modeling and control methods. Other applications include, for example, friction surfacing based solid state additive manufacturing which is another moving point energy source problem (though the material is heated below the melting point). Other areas of interest could be line and surface energy sources such as ultrasonic consolidation and photopolymer UV light exposure, and weapon systems that use high energy power beams.

Preferred embodiments provide methods for formulating and solving multi-scale moving meshes. Multi-scale simulation is dramatically improved compared to typical past efforts. Preferred embodiments provide and utilize a finite element based Eigensolver that accurately predicts thermal profiles and residual stresses very quickly (to permit real time control) in regions of low thermal gradients. Preferred embodiments provide and utilize a banded vectorization solver which predetermines the location of zero and near zero numbers in the Cholesky decomposition of the stiffness matrix along with reduced time to compute non-zeros of the decomposition for faster solution of the response fields. Preferred embodiments provide and utilize an Eigenmodal approach to identifying periodicity in Finite Element method based computations of the additively processing parts to enable very rapid feed-forward insertion of solutions into regions where periodicity is present and the solution is already known. Preferred embodiments will be discussed with respect to an example metal laser sintering application, while artisans will appreciate wider applicability.

Artisans will recognize that software products and controllers of the invention have other applications. Various solvers used in software products and processes controllers of the invention are generally applicable separately and together to model and control many physical processes, including the interaction of materials with other materials and energy sources. Software products and controllers of the invention are generally applicable, for example, to finite element frameworks, approaches which focus on computation of these fields using non-polynomial basis functions (polynomials require discretized points for fitting a field) such as wavelets, which can be localized both in time and frequency domains (Fourier transforms, for instance, can only be localized in the frequency domain).

Preferred embodiments can provide simulation tools that are faster than an additive manufacturing machine can fabricate an article, and thereby permit also real-time control, adjustment, and optimization of the fabrication. Embodiments can provide physically/metallurgically informed models at the crystal level in both metals, ceramics and semi-crystalline polymers. Preferred embodiments predict multi-scale part behavior directly from process parameters. Preferred embodiments can simulate both the fabrication process and the resultant mechanical properties. In preferred embodiments, a mesh models a physical space where thermal, mechanical and other transformations take place on whatever material (e.g. powder, solid, void, etc.) may be resident in that space at that point in time. A physical object may or may not be created when thermal energy passes nearby. Mesh elements can track the thermal history tbr the process in a particular region.

Preferred embodiments are $10^n$ faster than commercially available software products known to the inventors when implemented in the same hardware (where n can range from 1 to 18 or more depending on the type of problem being solved). Software products of the invention exhibit excellent performance on GPU-based computers and parallel high performance CPU architectures.

Preferred embodiment software modeling products and controllers for manufacturing methods include a feed forward dynamic adaptive mesh. The mesh provides a mathematical construct for refinement and de-refinement that is simpler and faster than prior mesh methods and solution strategies. A preferred adaptive mesh enables multi-scale meshing and a solution strategy (with its appropriate stiffness construction) for dynamic energy source thermo-mechanical problems to accurately predict thermal and stress/strain fields during metal laser sintering (or any problem involving scalar and higher order tensor fields). The meshing and involved solution strategy can be implemented in such a way that the mesh is refined in a gradual/non-gradual manner (with or without hanging nodes at the interface during mesh transition) near the highly non-linear regime very close to the point of energy exposure with an accompanied intelligent stiffness matrix formulation leading to a faster solution. A preferred intelligent stiffness matrix generation algorithm has the following characteristics: a) A coarse-scale mesh and stiffness matrix without localization, b) removing stiffness and coarse node numbers interior to the fine mesh boundary at regions of insufficient refinement along with corresponding nodes and elements at the point/line/area or volume of interest, c) to assign new node numbers to the coarse mesh domain based on the original node numbers and their offset with respect to the removed coarse mesh node numbers, d) addition of a refined mesh along with mapping of the fine mesh boundary to the coarse cut-out node numbers and incorporation of fine mesh dynamic stiffness matrix at the region of interest using a map based approach and an intelligent node appending algorithm which has constant node numbers in the fine mesh during time-iterative dynamic solutions.

Preferred embodiment software modeling products and controllers for manufacturing methods include a banded vectorization solver. The solver conducts an efficient row multiplication for computing an intelligent Cholesky decomposition that includes efficient elimination of zero calculations and provides models and control based upon the same. A preferred banded vectorization solver pre-determines zero and near zero numbers in the Cholesky decomposition of the stiffness matrix or any general positive definite matrix. It is performed by extracting the Cholesky decomposed lower triangular matrix from the stiffness matrix in such a fashion that if the row-wise multiplication of any two lower triangular matrix vectors is less than a certain threshold then the entity corresponding to the lower triangular matrix is assumed to be zero and is not computed.

Followed by the identification of zero or near-zero locations, the non-zero addresses are saved and used recurrently for computation of the thermomechanical fields and can be extended for electromagnetic field calculations using FEM. This embodiment can include taking advantage of the asymptotic expansion involved in a row of the corresponding Cholesky Matrix for predicting a significant portion of the wave contributing to the actual stiffness matrix.

Preferred embodiment software modeling products and controllers for manufacturing methods include an Eigen mode solver that is applied to solve finite element analysis and provide models and control based upon the same. "Eigensolvers" formulate a novel solution strategy for prediction of thermo-mechanical variables away from the point of laser exposure. The involved strategy has been borrowed from structural vibrations and image analysis algorithms where Eigenmodes are computed as orthogonal functions. The typical approach for determination of modes using sine or cosine functions has been extended to fit a finite element framework where an Eigenvalue problem of the thermomechanical propagator matrices (these matrices compute the propagation of the thermomechanical field from one cross-sectional layer to another along the −z direction) is computed in order to determine the orthogonal basis functions (Eigenvectors) for thermomechanical fields. This methodology could be also extended for simulation of electromagnetic fields using FEM.

Preferred embodiment software modeling products and controllers for manufacturing methods include solvers that utilize periodic and higher order boundary conditions based on Eigenmode representations of a cross-section. The solver addresses zeroth order periodic and higher order boundary conditions and efficiently identifies decoupled multiscale regions leading to faster local and global solutions and provides models and control based upon the same. A preferred solver is based on the assumption that the coupling between microscopic and macroscopic scales could be computed leading to evaluation of on-the-fly macroscopic stiffness updates and thus solutions can be computed in the entire domain in a sequential manner almost instantaneously based on the instantaneous position and applied boundary conditions (using macroscopic Eigenmodes) on the fine-scale scan box (following the laser scan vectors) from start to end in a layer. The assumption of scale decoupling is true in metal laser sintering and other processes involving localized application of energy because the thermo-mechanical gradients/cooling rates (temperature time derivative equals the spatial curvature of the thermal field according to the governing equation) away from the melt pool decreases exponentially within the fine-scale region to a value near zero in the portion of the domain that is outside the fine-scale region.

Preferred embodiment systems include a multi-scale modeling infrastructure for metal additive manufacturing technologies which is user-friendly and is validated against analytical solutions, state-of-the art finite element solutions and experiments.

Those knowledgeable in the art will appreciate that embodiments of the present invention lend themselves well to practice in the form of computer program products. Accordingly, it will be appreciated that embodiments of the present invention may comprise computer program products comprising computer executable instructions stored on a non-transitory computer readable medium that, when executed, cause a computer to undertake methods according to the present invention, or a computer configured to carry out such methods. The executable instructions may comprise computer program language instructions that have been compiled into a machine-readable format. The non-transitory computer-readable medium may comprise, by way of example, a magnetic, optical, signal-based, and/or circuitry medium useful for storing data. The instructions may be downloaded entirely or in part from a networked computer. Also, it will be appreciated that the term "computer" as used herein is intended to broadly refer to any machine capable of reading and executing recorded instructions. It will also be understood that results of methods of the present invention may be displayed on one or more monitors or displays (e.g., as text, graphics, charts, code, etc.), printed on suitable media, stored in appropriate memory or storage, etc. Computer program products of the invention can also control systems and machinery used in manufacturing processes, such as used for deposition of material during additive manufacturing processes.

Preferred embodiments will be discussed in the context of additive manufacturing processes. Example applications include mLS and EBM energy sources. Artisans will recognize many other applications, e.g. to the PMS Laser warfare systems. Other areas of interest include additional point, line and area energy sources such as ultrasonic consolidation, stereolithography using photopolymer UV light exposure, rolling, welding, and other manufacturing processes.

FIG. 1 illustrates an example embodiment additive manufacturing system 10. The system includes a controller 12 that receives material information and data regarding the manufacturing system, such as energy applied, gas flow, images, etc. The controller 12 outputs, in real time, power and movement updates to a tool 14, which can be a laser, for example, or a more complex tool that includes multiple components, such as components that move and hold a workpiece 16 or add material to the system. The controller 12 relies upon a multi-scale simulation and control 18 that separates a coarse and fine mesh and permits real time movement of a fine mesh within the coarse mesh and update of both.

The controller 12 in a preferred embodiment monitors and controls parameters to achieve the manufacture of a part in the manufacturing system 10. In an example, the controller 12 controls the following parameters and conducts the following steps:

1) Laser system to input energy into the powder bed (or other material or space);

2) Measure the intensity profile using plexiglass or other laser vibrometer equipment;

3) Measure powder bed characteristics such as powder bed density, thermal conductivity and specific heat along with laser absorptivity;

4) User input laser patterns and part orientations;

5) Computational/Experimental Characterization of Solidus, Liquidus, Point of vaporization and bulk properties such as specific heat, Latent heats experimentally or computationally characterized or obtained based upon known values;

6) Conduct multi-scale simulation with 1-5 as inputs and thermal history, distortion, residual stress and melt pool profiles as outputs as a function of space and time;

7) Monitor the thermal and stress profiles using FLIR or ARAMIS technology using specialized glass windows through the viewing panes of the machine at optimum resolution, acquisition rate and appropriate infrared windows;

8) Control the laser heat flux, speed or build scan for future implementation in the machine on-the-fly.

Figure 2:
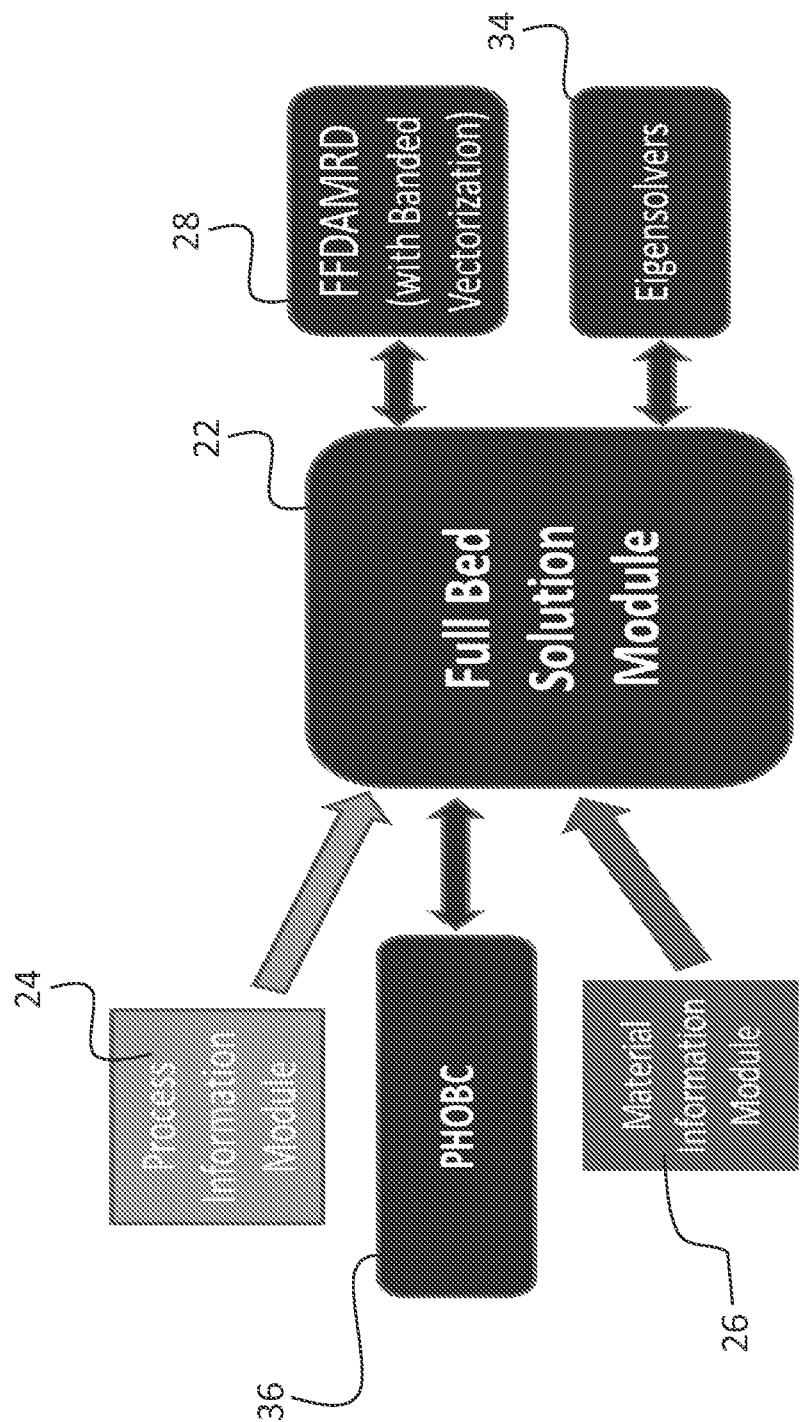
FIG. 2 is a block diagram of a controller of the manufacturing system of FIG. 1.
Figure 3:
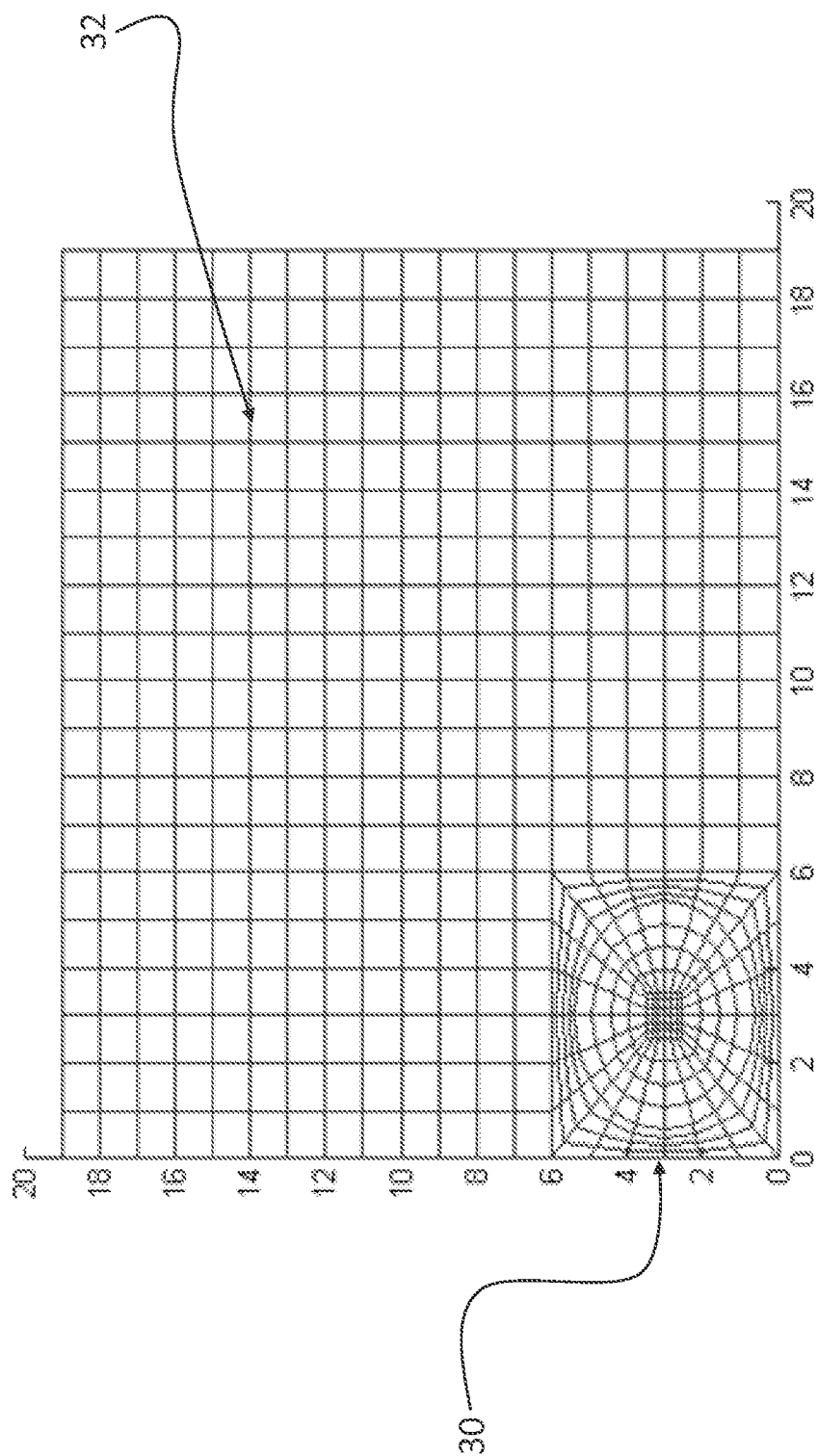
FIG. 3 illustrates a multi-scale adaptive dynamic mesh with a coarse mesh and a fine mesh used in preferred methods and controllers of the invention.

FIG. 2 illustrates the overall logical structure for the controller 12 of FIG. 1. A full bed solution module 22 reads data from a process information module 24 and material information module 26. The process information module 24 stores data concerning processing details such as process parameters, laser scan vectors, and geometry. The geometry and laser scan vectors are planned, and the process parameters are predetermined as users inputs them into the system The material information module 26 stores data concerning material details such as material chemistry, microstructural phases, thermomechanical properties and thermophysical properties for the part(s) being built. The solution module 22 begins with Feed Forward Dynamic Adaptive Mesh Refinement and De-refinement (FFDAMRD) with or without banded vectorization 28 to simulate the article to be manufactured. The mesh is shown in FIG. 3, with a non-linear thermal region 30 comprising of the melt pool boundaries acquired using simplified analytical calculations and remaining uniform mesh region 32 outside the non-linear thermal region comprising of the melt region. After a predetermined number of layers (predetermined is based on the melt pool cut off region), e.g. 4 layers, Eigensolvers 34 are used to quickly populate the remaining uniform finite element mesh 32 with the thermomechanical field solutions at every node and for every time step in regions away from the melt pool 30 in an efficient manner along with high resolution combined fine-coarse mesh solutions in volumes closer to the melt pool regimes and the first few layers where thermomechanical gradients are still appreciable. Simulation continues point-by-point and layer-by-layer, the PHOBC (periodic and higher order boundary conditions) 36 analyzes the problem to identify regions of zeroth, first, second and third order periodicity within the layers using an Eigenmodal calculation. When periodicity is identified, the PHOBC solver 36 feeds forward the correct solution into regions of periodicity as the problem solution progresses. The solution module 22 accumulates a database of solutions layer-by-layer and laser-contour-by-laser-contour. As the database is accumulated, periodicity increases in the problem. After a sufficiently large number of layers (where the thermal gradients are low, typically 4-6 layers) have been simulated, a next layer can be "solved" by a combination of: (1) calculating a solution from using FFDAMRD in regions where no periodicity is present, (2) feeding the correct solution into regions of periodicity when the solution is already known from a previous time-step, and (3) using Eigensolvers to solve the thermomechanical fields away from the melt pool 30. This accumulation of information layer-by-layer and time-step-by-time-step can be performed very quickly and accurately on a GPU machine. With the invention a rigorous physics-based solution can be provided with standard computational resources at a computational speed that is faster than a machine can build a part to achieve real-time control. Preferred embodiments provide a fine scale mesh 30 that can be moved with a cut-paste-solve-restore sequence of steps.

As graphically illustrated in FIG. 3, the FFDAMRD provides multi-scale meshing for dynamic, moving energy source thermo-mechanical problems to accurately predict thermal and stress/strain fields during metal laser sintering (or any thermal/strain/stress problem). In practical terms, a fine scale region 30 (encompassing a thermo-mechanical anomaly such as a melt pool in an additive manufacturing process) is made independent of the rest of the mesh that is treated as a coarse scale region 32. The fine scale region 30 can be moved within the coarse scale region 32. (In some systems multiple fine scale regions are needed to properly model the phenomena, such as when using multiple lasers in mLS and/or multiple melt pools due to rapid movement of the electron beam in EBM, within a single coarse mesh.) The meshing is implemented to bifurcate the mesh in the highly non-linear region fine scale 30 close to the point of laser exposure. Apart from multiple fine mesh regions in EBM, a nested 3 or higher level of coarse-fine meshing and corresponding stiffness computations are also possible with this strategy. The nested strategies could be used for more savings on the total number of degrees of freedom to be solved for along with an ease of computation of less number of eigenmodes. The thermo-mechanical stiffness matrices are calculated such that there is no need to re-compute nodal connectivity each time the fine mesh region moves. This strategy provides the correct solutions (when validated against an established commercial platform such as ANSYS with the same process parameters and using either a submodeling approach or fine-gridded mesh in the entire domain). A permutation based approach for updating non-linear thermal properties in the vicinity of the melt pool is implemented to provide more accurate capture of nonlinear thermophysical properties than is possible with conventional commercial simulation systems.

The dynamic meshing and non-linear properties, computes the correct answer ~$10^2$ faster than ANSYS, as validated by simulations for various materials, including Ti6Al4V, In625 alloys (Face Centered Cubic-FCC with solution hardening changed to precipitation hardening), and CoCrMo alloys (with metastable Hexagonally Closed Packed-HCP and equilibrium FCC phases). The speed enhancements of FFDAMRD dynamic meshing should become even more pronounced with more efficient code implementations and will be generically applicable to all material systems.

The Eigensolvers 34 efficiently predict thermo-mechanical variables away from the point of laser exposure. This strategy has not been applied to thermo-mechanical stresses. The inventors have adapted techniques from structural vibrations and image analysis algorithms where modal contributions (Eigenmodes) are computed in terms of orthogonal functions for the Eigensolvers. The approach for determination of modes using sine or cosine functions is extended to fit a finite element framework. The framework provides an Eigenvalue problem of thermomechanical propagator matrices. These matrices compute the propagation of the thermomechanical field from one cross-sectional layer to another along the z direction in order to determine the orthogonal basis functions (Eigenvectors) for thermomechanical fields. Very near to the point of laser exposure (or other energy source) the number of modes required to reconstruct the solutions is very high (the number of modes is limited by the number of nodal points or degrees of freedom (for a thermal case number of nodes equals the number of degrees of freedom whereas for a structural or deformation problem the number of degrees of freedom is 3 per node) in each cross-section and as the distance from the point of energy exposure increases, the number of modes required to accurately predict the solution with negligible error ($<=0.001\%$) drops very quickly. In the example case of Ti6Al4V, accurate thermomechanical solutions can be calculated almost instantaneously 4 or more layers away from the point of laser exposure using only 16-24 modes. The error introduction using this approach was determined to be negligibly small. For cases of a distributed, constant area source, due to unrefined orthogonal modes the trend of solutions is replicated but the error is appreciably under bounds when compared to a point energy-source solution which helps in the applicability of this method for point, line or area based energy sources leading to the general applicability of the method outside the scope of metal melting based Additive Manufacturing technologies. Arnoldi and other methods for refinement of modes can reduce this error, which is relevant for manufacturing processes that don't use point-wise (e.g. laser or electron beam) energy sources.

For focused energy sources such as mLS and EBM, the invention eliminates the need to re-compute thermomechanical fields using fine-scale FFDAMRD for the parts of the finite element framework which are more than a few layers away from the point source; thus eliminating the vast majority of the computational time necessary to simulate real parts (which are made up of thousands or tens of thousands of layers.

Eigenvalues have been solved for the $B^{-1}A$ matrix for the thermal case. A parallel architecture can solve the deformation problem using a dislocation density based crystal plasticity (DDCP) finite element solver. For DDCP, the Eigenvalue problem has orders of magnitude higher complexity than for the FFDAMRD thermal problem and will thus require a very fine refinement to compute the B and A matrices correctly in order to obtain the $B^{-1}A$ matrix for its Eigenvalue determination. Hence, mesh strategies will be used to determine the −z direction spread for the DDCP/mechanical part of the thermomechanical solver for quick determination of stress/traction distribution in each cross-section followed by the integration of these methodologies with the thermomechanical construct developed so far with FFDAMRD.

The banded vectorization 28 solver eliminates zero or near zero numbers in the lower triangular Cholesky Decomposition of the Stiffness matrix and hence speeding up those calculations by truncating the neighborhood of any nodal point used for computation of thermomechanical fields. This is done by extracting the lower triangular Cholesky matrix from the stiffness matrix in such a fashion that if the row-wise multiplication of any two lower triangular matrix vectors is less than a certain threshold (e.g. between $\sim 10^{-14}$ to $10^{-6}$) then the entity corresponding to the lower triangular matrix is assumed to be zero and is not computed. Using this approach, the neighborhood of a nodal point is truncated and those addresses are saved along with the address of the nodal point in the lower triangular matrix. In conventional finite element approaches performing dynamic or adaptive mesh analysis, this method is impractical to implement since the nodal connectivity changes with every movement of the point of laser exposure, changes in features in the simulation domains or change in microstructure if such a problem is solved for. Therefore, the truncated neighborhood of a nodal point which was good in the previous instant will no longer be of use for computations in the next instant, whereas using FFDAMRD it is possible to compute the truncated neighborhood in the mesh following the point of laser exposure using a very conservative threshold. Since, a conservative threshold has been used, it is possible to accommodate nonlinear changes in thermal properties with no adverse effect on the quality of the solution.

The PHOBC—Periodic and Higher Order Boundary Conditions—solver 36 treats the microscopic and macroscopic scales as being decoupled. Solutions can then be computed in the entire domain in a sequential manner. The solutions are almost instantaneous based on the movements of the fine-scale scan box (following the laser scan vectors comprising of the multiscale coarse-fine mesh) from start to end in a layer. The inventors have recognized that scale decoupling can be used in metal laser sintering and comparable localized thermo-mechanical processes. This works well in practice of the invention because the thermo-mechanical gradients/cooling rates (temperature time derivative is equal to the spatial curvature of the thermal field according to the governing equation) away from the melt pool region decreases exponentially within the fine-scale region 30 to a value near zero in the remaining portion 32 of the domain that is outside the fine-scale region 30. Moving the fine-scale mesh 30 within the specific, stationary coarse-scale mesh 32 while applying the PHOBC solver 36 provides the opportunity to introduce negligible error while solving the entire problem $\sim 10^4$ times faster than when using FFDAMRD with the Eigensolvers but without PHOBC.

In addition to the discretized finite element framework described above, alternative embodiments compute fields with non-polynomial basis functions (polynomials require discretized points for fitting a field) such as wavelets, which can be localized both in time and frequency domains (Fourier transforms, in contrast, can only be localized in the frequency domain). The inventors have provided formulations for dynamic thermo-mechanical scenarios. Preferred methods and controllers use algorithms and mathematical formulations that can accurately predict thermo-mechanical fields in additive manufacturing techniques such as metal power bed fusion AM processes without the use of finite element discretization. A preferred embodiment uses a derivation of Cauchy Green's heat function and obtains its space-time analog and derivation of the Eigenvalue problem for triband and pentaband matrices.

Preferred methods and controllers can provide unique approaches to simulation of thermo-mechanical fields that include: (1) analytical Eigenmodal decomposition, (2) Eigenwavelet formulation and development and (3) Bayesian statistical methods. The analytical Eigenmodal decompositions enable analytical near closed form computations of dispersion of a forcing stimulus across a domain. Since the stiffness matrices, by the virtue of their spreading characteristics and symmetry, form banded [B A B] matrices, their analytical Eigenvalues can be computed using rigorous mathematical formulations. One simple triband [B A B] matrix results in an Eigenvalue set, $$\bigcup_{i=1}^{n} \left( A + 2B\cos\left(\frac{2\pi j}{2n+1}\right) \right)$$

where n=Number of points and j=0, 1, 2 . . . n. From a three dimensional perspective, n denotes the number of cross-sections (layers) in the geometry, solved using the FEM technique. For correlations between a point in an FEM mesh and the entire three dimensional FEM stiffness matrix, many banded and nested tribanded matrices must be considered, which makes it difficult to compute Eigenvalues. For the thermal problem for moving point energy sources, this difficulty is reduced due to the scalar character of temperature. For this reason, it is possible to compute the banded 3 spectra Eigenvalues for the thermal stiffness matrices, and using recursive and asymptotic analysis, the deformation Eigenvalues can also be computed.

Eigenwavelets equate the curvature in time with the curvature in space, providing a complex transfer function predicting the future and adjusting the past behavior in three dimensional space, which can be derived provided a source. Extension of Eigenwavelets to a heat transfer equation is not straightforward because the heat equation equates the first derivative of the thermal response in time with its curvature in space. The Cauchy heat integral represents one approach to address this. In this formulation, the space and time variables are not represented in a combined complex form. This method has been demonstrated for solving linear one dimensional static heat problems in textbooks and linear one-dimensional dynamic problems in research texts. However, the prior approaches do not extend Eigenwavelets to the heat equation in three-dimensions, necessitating remarkable enhancements in the Cauchy heat integral for solving space time problems.

Using Bayesian statistics, the conditional probability of an event is computed. In the case of porosity within a part made using additive manufacturing, a probability distribution in the three-dimensional domain of the part can be computed using the thermo-mechnical history and the distribution of defects in the previous time step. A model can be constructed to compute a probability evolution law for the distribution of defects and porosity in space and time.

Feed Forward Dynamic Adaptive Mesh Refinement

The preferred methods provide the ability to cut-paste-solve-restore the fine scale mesh 30 within the large coarse scale mesh 32 of FIG. 3. The fine scale mesh 30 is generated and assembled separately from the large coarse scale mesh 32. This occurs with steps that include pre-processing based upon the object to be built, and the meshing. A bounding box defines extremities of the coarse matrix 32. The fine mesh is defined or selected based upon a motif that includes knowledge of an energy source (perturbation—load, thermal, etc.). The coarse grid 32 is then removed in region(s) of energy source(s). In the example of FIG. 3, a single fine region 30 is in an area where the coarse grid 32 has been removed, and the fine mesh motif replaces the removed area. The fine region 30 and coarse grid are then assembled with mathematical operations (in section FFD-AMRD thermal FEM algorithm). The assembly can address nonlinearities and can be flexible to strike a balance between or adjust between speed and accuracy, and can divide linear and nonlinear calculations. A stiffness matrix is also calculated for the mesh, as discussed below (in section FFD-AMRD thermal FEM algorithm). The stiffness computation relates input to output based upon material information. Background calculations will first be reviewed to define concepts for the dynamic meshing of the preferred embodiment.

Adaptive Meshing Refinement (AMR)—

Adaptive mesh refinement was described by Berger and Oliger to solve wave equations with localized steep gradients. M. Berger, J. Oliger, "Adaptive mesh refinement for hyperbolic partial differential equations," Journal of Computational Physics 53 (3) (1984) 484-512; M. Berger, P. Colella, "Local Adaptive Mesh Refinement for Shock Hydrodynamics," Journal of Computational Physics 82 (1) (1989) 64-84. The multi-scale nature of AMR reduces computational cost and time that would otherwise be very high if the entire problem were solved with a high resolution. Effective application of AMR requires acceptable values of error bounds and estimated error.

Error Estimates in FEM—

Traditionally, convergence of a finite element model is checked using mesh convergence. This method is computationally expensive for time dependent dynamic problems where adaptive meshing is required. G. Carey, "A perspective on adaptive modeling and meshing (AM&M)," Computer Methods in Applied Mechanics and Engineering 195 (4-6) (2006) 214-235. General adaptive meshing software tools employ error estimators to estimate accuracy of the solution obtained within a particular level of refinement, via apriori and posteriori estimators. Apriori error estimators are used to understand the asymptotic behavior of the errors but are not used to determine an actual error estimate. Posteriori error estimators work on the solution itself to obtain estimates of the actual solution errors.

A Priori Error Estimates—

A priori error estimates provide useful information on the asymptotic behavior of the approximation. The Lax Theorem is a fundamental theorem for apriori error estimation in the numerical solution of partial differential equations. P. Lax, A. Milgram, "Parabolic equations," Contributions to the theory of partial differential equations. Annals of Mathematics Studies, Annals of Mathematics Studies 33 (1954) 167-190. It starts with a generalized representation of a PDE in the following form where L is a differential operator and $\emptyset$ is an actual solution of the differential equation:

$$L\emptyset = f \tag{1}$$

to understand the Lax Theorem assume a system where:

$$L\varphi = \frac{\partial^2 \emptyset}{\partial x^2} = f \tag{2}$$

Taylor's expansion of the above equation using central difference approximation gives $$\frac{\partial^2 \emptyset}{\partial x^2} = \frac{\emptyset(i+1)h - 2\emptyset(ih) + \emptyset(i-1)h}{h^2} + O(h^2) \tag{3}$$

Assuming a discrete solution $$\varphi_i = \emptyset(ih) \tag{4}$$

A discrete operator $L^h$ is defined as $$L^h \varphi = \frac{\varphi_{i+1} - 2\varphi_i + \varphi_{i-1}}{h^2} \tag{5}$$

The final discretized system of equations will be $$(L^h \varphi)_i = f_i \tag{6}$$

where $f_i = f(u=ih)$

Consistency equations can be further defined as $$\emptyset_i = \emptyset(ih) \tag{7}$$

$$(L^h \varphi)_i - f_i = \tau_i = O(h^2)$$

and the stability equation $$\|(L^{h^{-1}})\| \tag{8}$$

is bounded and independent of h.

Thus error is defined as $$\varepsilon = \emptyset - \varphi \tag{9}$$

$$L^h \varepsilon = \tau$$

Convergence is then derived from stability and consistency $$\|\varepsilon\| \leq \|(L^{h^{-1}})\tau\| \leq C\|\tau\| \tag{10}$$

This theorem proves that the convergence is proportional to $h^2$ for the elliptic differential equation considered here. This is true with respect to linear FEM formulations with bilinear shape functions.

Posteriori Error Estimates—

In FEM, a domain is decomposed into small elements and a solution of the differential equation in each element is assumed to have the form $$\hat{\varnothing} = N_i(\hat{x}) q_i \quad (11)$$

where $N_i$ are the shape functions and $q_i$ is an approximate solution of the differential equation at the $i^{th}$ node of the element. A posteriori error in the approximate solution $\hat{\varnothing}$ is defined as:

$$e_\varnothing(x) = \varnothing(x) - \hat{\varnothing}(x) \quad (12)$$

Similarly, errors in integration point variables namely stress ($\sigma$) and strain ($\varepsilon$) are defined as:

$$e_\sigma(x) = \sigma(x) - \hat{\sigma}(x) \quad (13)$$

$$e_\varepsilon(x) = \varepsilon(x) - \hat{\varepsilon}(x)$$

These error measures are a function of position vector $\vec{x}$ and can be positive or negative depending on the location of $\vec{x}$. A better error indicator should be a scalar so that error criteria can be checked and decisions can be made accordingly. For this purpose, different error norms are used. For example an $L_2$ norm is defined as $$\|\varnothing\|^2 = \int_\Omega \varnothing(x) \varnothing(x) d\Omega \quad (14)$$

The energy norm $L_2$ norm of the conjugate stress and strain spaces is one of the most widely applied norms in FEM error analysis of linear elastic structural problems. It is defined as $$\|\varnothing\|^2 = \int_\Omega (\varepsilon - \bar{\varepsilon}) E (\varepsilon - \bar{\varepsilon}) d\Omega \quad (15)$$

$$= \int_\Omega e_\varepsilon^T e_\sigma E \, d\Omega$$

A relative percentage error norm is defined as $$n = 100 \times \frac{\text{norm of the error}(e)}{\text{norm of the corresponding variable } \varnothing} \quad (16)$$

The main challenge in the posteriori error estimate mentioned so far is to derive an exact solution $\varnothing(x)$ for the differential equation. It is not possible in most practical problems involving complex geometries to find an exact analytical solution. It has been shown that in continuous smoothened solutions for stress and strain it is more accurate compared to piecewise approximate solutions determined using FEM. Among various methods of smoothening FEM solutions, Super Convergent Patch (SCP) recovery of the elements is preferred as one of the most accurate methods. O. C. Zienkiewicz, J. Z. Zhu, "The superconvergent patch recovery and a posteriori error estimates—Part 1: the technical recovery," International Journal for Numerical Methods in Engineering 33 (7) (1992) 1331-1364.

Error peaks due to localized variations and steep gradients in material response can be reduced via refinement. The refinements are adaptive in nature where the refinement sizes are corrected inversely with error magnitudes. The process of correction of refinement sizes is iterative in nature where the refinements are corrected until the local error magnitudes are below a user-specified error-tolerance. Generally, the error-tolerances are kept as a very small fraction of the initial maximum response magnitude or initial maximum magnitude of the external stimulus or combinations of both depending on the definition of error calculation. When the error is out of the bound, the mesh is refined adaptively to bring it within the tolerance level.

Structured Adaptive Meshes—

Figure 4B:
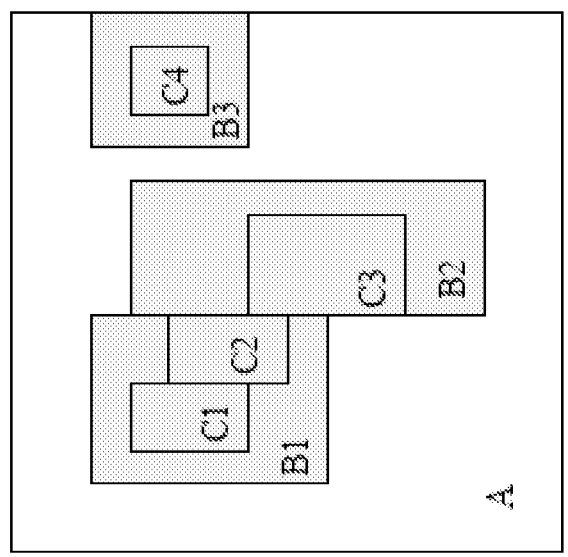
FIGS. 4A and 4B illustrate a prior art block structured mesh refinement technique.
Figure 4A:
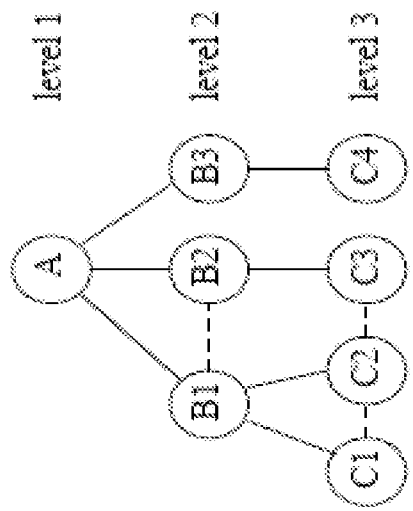
Figures 4C, 4D:
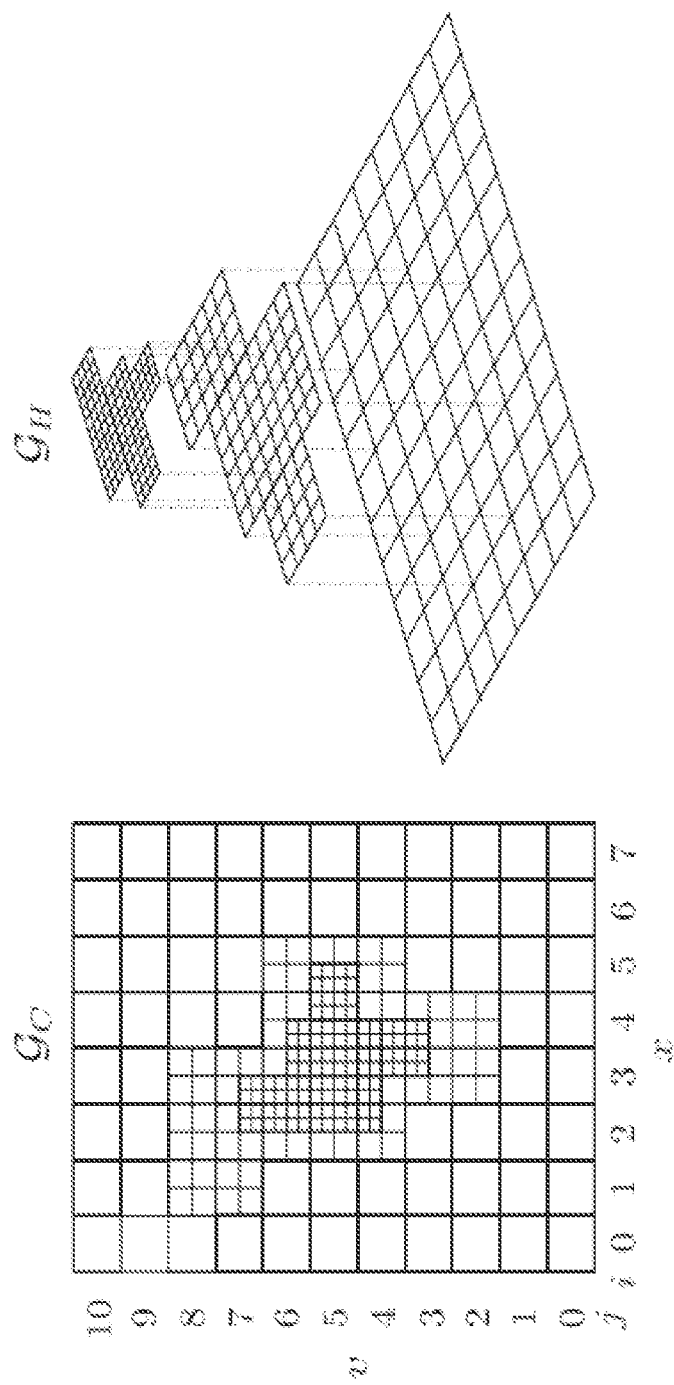
FIGS. 4C and 4D illustrate a prior art mismatch of mesh density at the interface of a coarse grid and refined subdomain grid during assembly of the fine mesh and the coarse grid in the multi-scale adaptive dynamic mesh method.
Figure 4E:
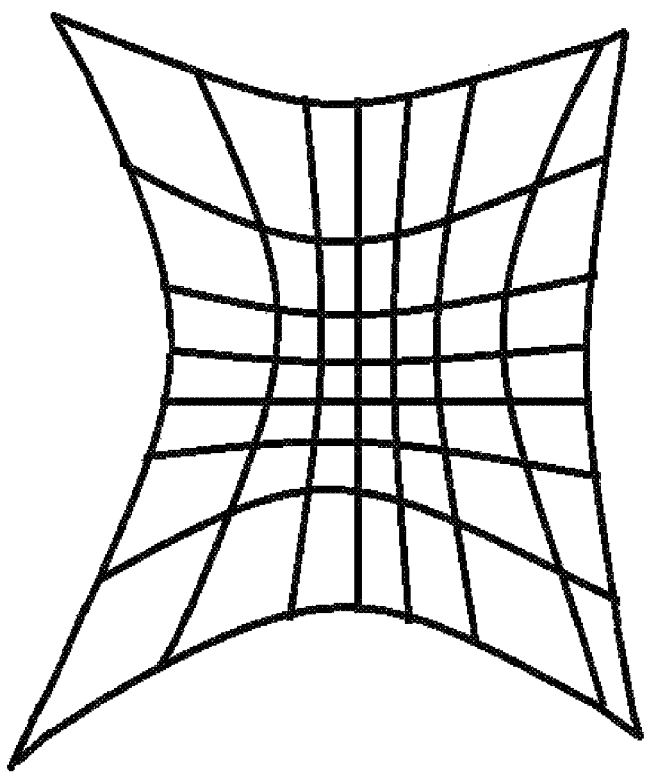
FIG. 4E illustrates a prior art curvilinear mesh distortion that can be used to avoid the mismatch of FIGS. 4C and 4D.

In structured adaptive meshes, the mapped orthonormality of the grid is strictly maintained or a particular motif is maintained. The basis of the mesh can be regular Cartesian or curvilinear in nature. Block structured mesh refinement uses mesh refinement of multiple sub domains such that two domains can share a boundary but no area can be shared. Each domain can be meshed independently and can be further refined to reach higher amounts of resolution. This prior strategy is illustrated with a tree diagram as shown in FIGS. 4A and 4B. The refinement inside each subdomain creates a mismatch of mesh density at the interface of the coarse grid and refined subdomain grid FIGS. 4C and 4D and can lead to erroneous results. This can be avoided with additional constraints at interfaces. A disadvantage of having additional constraints is that the solution may not reach its equilibrium distribution. The irregular nodes in the block structured adaptive mesh can be avoided with an adaptive mesh generated with mesh distortion as shown in FIG. 4E. This method has been used along with Multizone Adaptive Grid Generation (MAGG) or Moving Meshes. See, H. Zhang, V. Prasad, M. K. Moallemi, "Numerical algorithm using multizone adaptive grid generation for multiphase transport processes with moving and free boundaries, Numerical Heat Transfer, Part B: Fundamentals: An International Journal of Computation and Methodology," 29 (4) (1996) 399-421. These methods require additional computations to compute the characteristics of a curvilinear mesh grid shown in FIG. 4E.

Adaptive Meshing in Dynamic Problems and Data Transfer between Meshes—Certain classes of problems such as large deformation or time dependent dynamic problems require adaptive dynamic mesh refinement where the mesh is dynamically adapted to new boundary conditions, evolving constitutive laws or geometry. This dynamic adaptivity of the mesh calls for data transfer from the parent mesh to the newly adapted mesh. M. Smith, D. Hodges, C. Cesnik, "An evaluation of computational algorithms to interface between CFD and, CSD methodologies," Wright-Patterson Air Force Base Report No. WL-TR-96-3055, 1995, pp. 1-45; F. Ahmed, Analysis of Data Transfer Methods Between Non-Matching Meshes In Multiphysics Simulations, M.S. Thesis, Universität Erlangen-http://images.tn-services.com/S06/Figs/T11162F1.jpgNürnb erg, Erlangen-Nürnberg, 2006. Various interpolation techniques can be used for this purpose. Two widely used interpolation techniques are the Radial Basis Function Method and the Inverse Isoparametric Method. Preferred embodiments of the invention utilized the inverse isoparametric interpolation method. See, V. Murti, S. Valliappan, Numerical Inverse Isoparametric Mapping in Remeshing and Nodal Quantity Contouring, Comput. Struct. 22 (6) (1986) 1011-1021.

Dynamic Adaptive Mesh Generation—

"Dynamic adaptive meshing" has been used to refer to adaptive meshing strategies with dynamic boundary conditions or response evolution. Different examples include a moving mesh strategy, error based re-distribution, and level set methods. See, e.g., Ceniceros, H. D., & Hou, T. Y., "An efficient dynamically adaptive mesh for potentially singular solutions," Journal of Computational Physics, 172(2), 609-639 (2001); Adjerid, S., & Flaherty, J. E. "A moving finite element method with error estimation and refinement for one-dimensional time dependent partial differential equations," SIAM Journal on Numerical Analysis, 23(4), 778-796 (1986); Liao, G., Liu, F., De la Pena, G. C., Peng, D., & Osher, S. "Level-set-based deformation methods for adaptive grids," Journal of Computational Physics, 159(1), 103-122 (2000). Error estimate calculations and graph generation can be avoided with intelligent schemes where patterns learned from similar problems are used to develop intelligent schemes. Hyman, J. M., & Li, S. "Interactive and dynamic control of adaptive mesh refinement with nested hierarchical grids," Rea port, (5462) (1998).

A simpler solution uses a refined moving region with upper bounded refinement to avoid repeated error estimate calculations, mesh graph generation and support the intelligent matrix reassembly.

The present invention generates a moving finite element refinement zone with a cut-paste-solve-restore algorithm. Mesh graph generation (excludes stiffness matrix assembly) by cut paste strategy has been attempted for triangulated meshes in literature. Boussetta, R., Coupez, T., & Fourment, L. "Adaptive remeshing based on a posteriori error estimation for forging simulation," Computer methods in applied mechanics and engineering, 195(48), 6626-6645 (2006). The computational time required to generate stiffness matrices for newly adapted mesh graph is significantly higher compared to the present cut paste strategy for stiffness assembly. The invention also provides for efficient regeneration of a stiffness matrix for the new location of the moving refinement box.

A special sub class of dynamic meshing problems include a moving energy source with quasi Spatio-temporal Periodic response. The present invention is applicable and not limited to Spatio-temporal Periodic Problems and Metal Laser Sintering but also includes similar problems solvable with variable size (as a function of time) moving fine box. The subsequent discussion provides background for Spatio-temporal Periodic Problems and Metal Laser Sintering.

Spatio-temporal Periodic Problems and Metal Laser Sintering

A spatio-temporal periodic function is defined as a function which repeats itself over time with rigid translation in space. It can be expressed in the following form.

$$f(x,t)=f(x+v\ T,t+T) \quad (17)$$

Where the v represents the speed and T represents the time-period of the problem. An assumption for continuously spatio-temporal periodic problems in time is given in equation 18.

$$T \rightarrow 0 \quad (18)$$

Figure 5A:
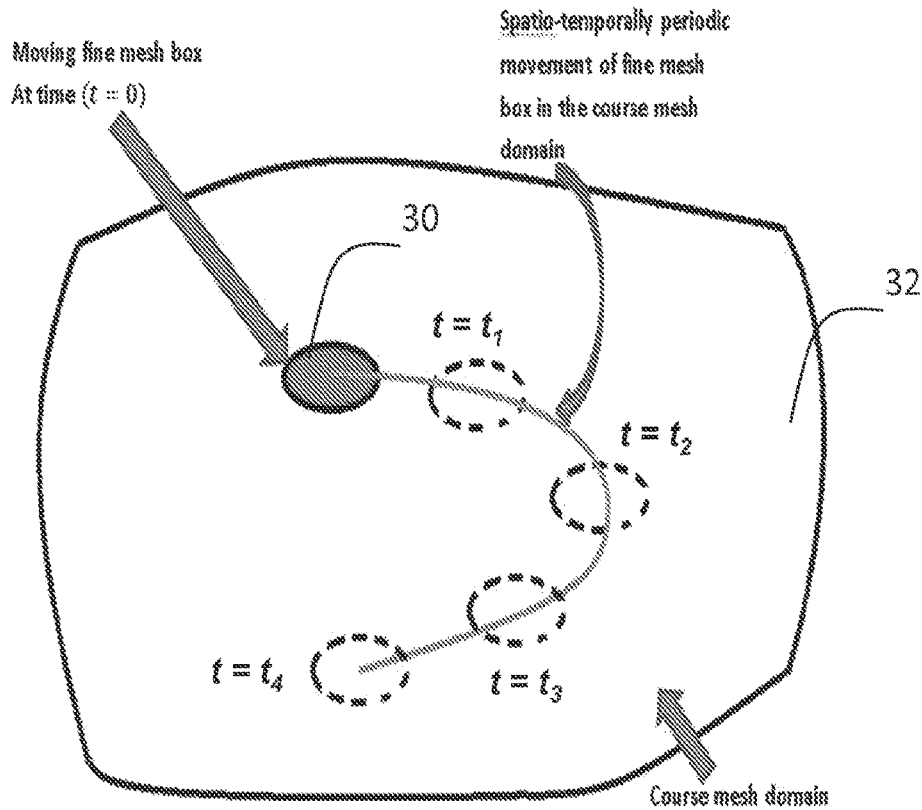
FIGS. 5A and 5B illustrate spatiotemporal phenomena to be captured in a simulation of laser metal sintering with a fine mesh box moving within a coarse mesh.
Figure 5B:
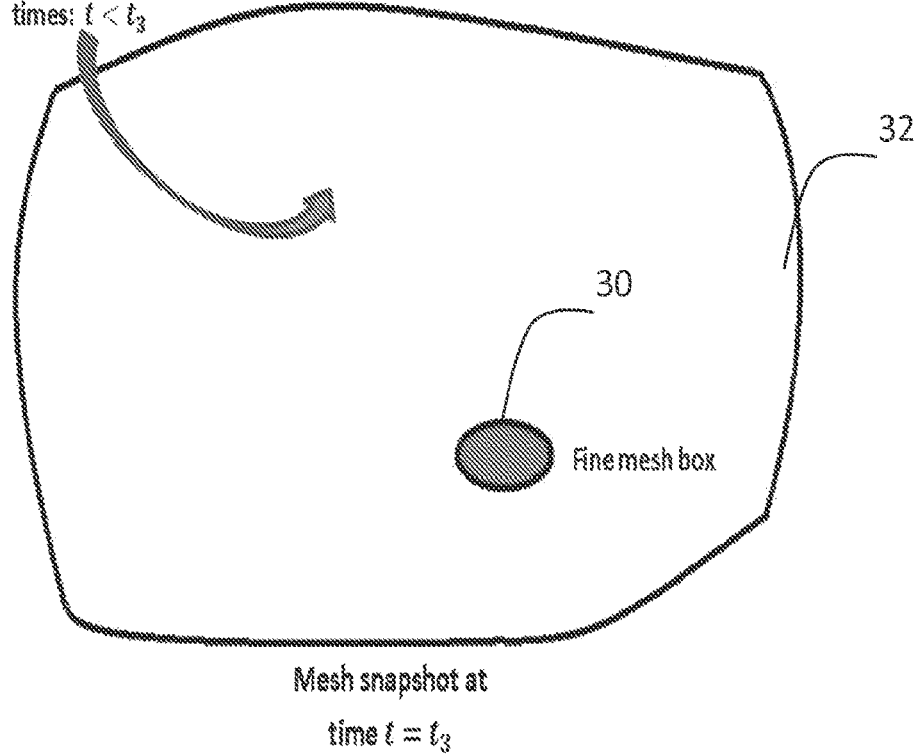

Spatio-Temporal periodicity can be observed in various problems including metal laser sintering, wave propagations, thermodynamics of welding, various manufacturing processes like sheet metal rolling, and dynamic tire road surface contact. A preferred embodiment provides for the simulation and control of metal laser sintering with the unique feed forward dynamic adaptive mesh refinement and de-refinement finite element (FFD-AMRD) method of the invention. This method moves the fine-mesh box 30 in the coarse mesh domain 32 in a manner that can capture the spatiotemporal phenomena shown in FIGS. 5A and 5B.

Metal Laser Sintering and Other Similar Analogues

Figure 6B:
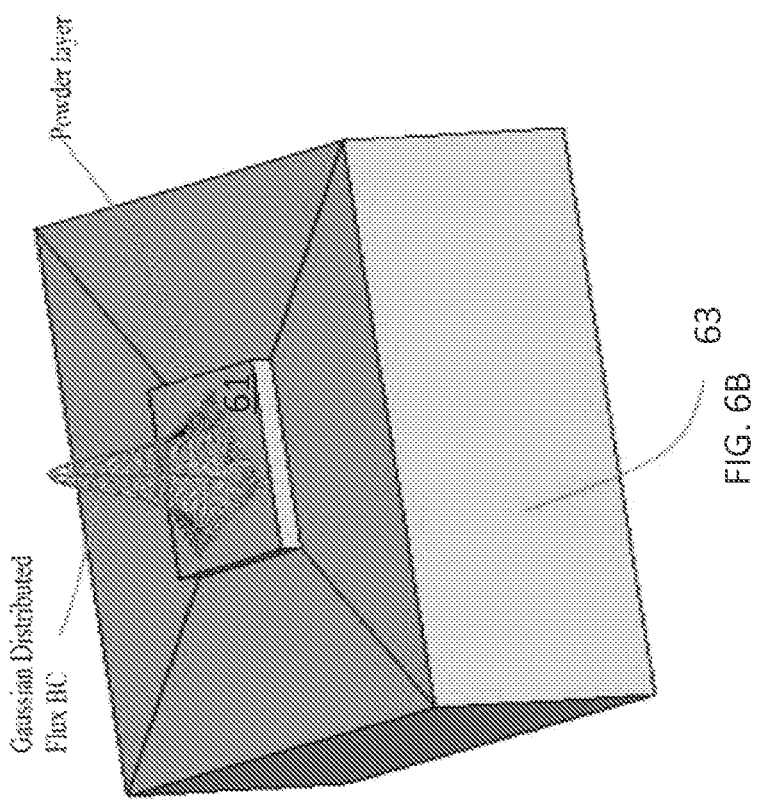
FIG. 6A illustrates a preferred laser metal sintering system that is controlled with a simulator and controller of the invention and FIG. 6B illustrates boundary conditions for modeling and control of the sintering operation.
Figure 6A:
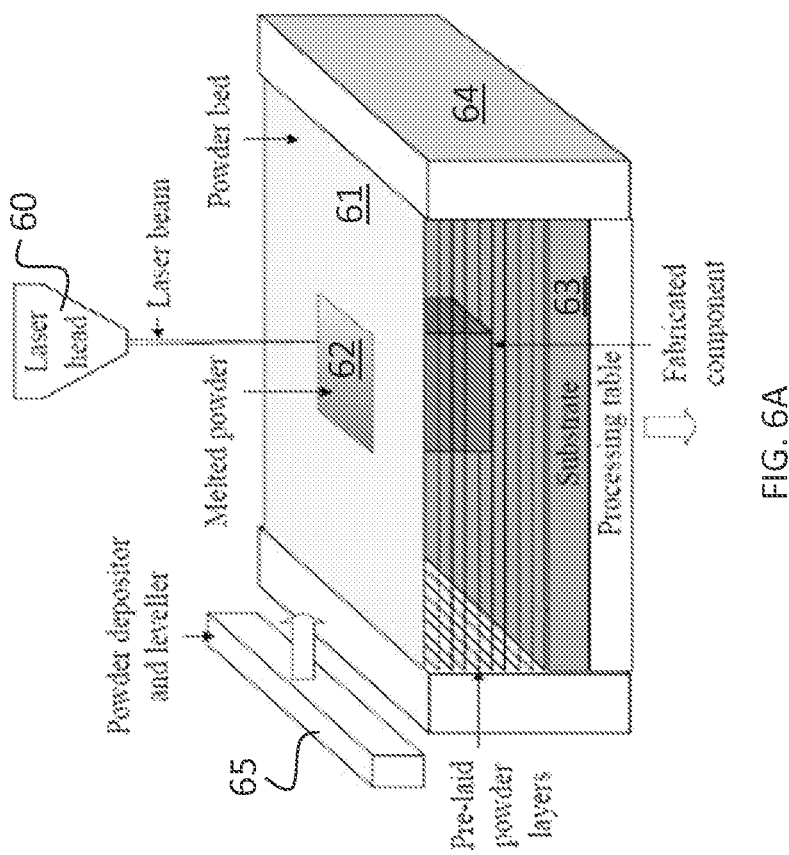

Metal laser sintering is an additive manufacturing process in which the surface of a powder bed is melted layer by layer to create a 3D part with complex geometry. A preferred embodiment is illustrated with respect to all metal, non-metal, ceramic and composite powder processing with selective laser melting or sintering process. In FIGS. 6A and 6B, a laser 60 applies a Gaussian laser beam to a powder bed 61 to create a melt, with the laser beam moving to create a layer 62 of a component being manufactured. The component is supported by a substrate 63 and powder is contained by a frame 64. A depositor and leveler 65 provides additional metal powder material layers for the additive process. FIG. 6A illustrates the metal laser sintering system that is controlled with a simulator and controller of the invention.

A thermally non-linear, homogenous and isotropic material behavior can be assumed for the any material under processing. The powder and solidified regions can be assumed to be distinct homogenous or inhomogeneous entities. An example geometry of the problem is a solid substrate 63 of thickness 25.4 mm and a powder layer of thickness 30 µm. The temperature dependent non-linearity in thermal parameters for powder material can be assumed as that of a bulk of the same powder material. The material must be characterized mathematically or experimentally with respect to nonlinear thermal and mechanical material behavior for laser sintering. The correct powder density determination is also required, which is available from published sources. Gu, H., Gong, H., Pal, D., Rafi, K., Starr, T., & Stucker, B. Influences of Energy Density on Porosity and Microstructure of Selective Laser Melted 17-4PH Stainless Steel.

Forced argon in the chamber causes convection, which is also considered as a boundary condition by the controller, though is not illustrated in FIG. 6B. The basic PDE and FEM formulation required to solve thermal behavior during metal laser sintering is given in the next subsection. FIG. 6B illustrates boundary conditions for modeling and control of the sintering operation.

Governing Equations and Boundary Conditions

The 3 dimensional counterpart of the governing equation is generalized as follows:

$$\frac{\partial T(\vec{r},t)}{\partial t} = \frac{1}{c\rho} (\vec{\vec{k}} \vec{\nabla}) \cdot (\vec{\nabla} T(\vec{r},t)) + Q(\vec{r},t)$$

where $T(\vec{r},t)$=Temperature at a position vector $\vec{r}$ in 3 dimensional space and time t.

$\vec{\vec{k}}$ =Three dimensional material conductivity tensor of order 2 and rank 3 at a position vector $\vec{r}$ c=Three dimensional specific heat of the material at a position vector $\rho$=Density of the powder bed at a position vector $\vec{r}$ $Q(\vec{r},t)$=Inner heat generation at point x and time t.

Similarly, the three dimensional counterpart of flux is modified as $$\vec{q}(\vec{r},t) = -\vec{\vec{k}} (\vec{\nabla} T(\vec{r},t)) \quad (19)$$

where $\vec{q}(\vec{r},t)$=Flux at a position vector $\vec{r}$ and time t.

The spatio-temporal periodicity of the flux boundary condition in 3 dimensions is modified as:

$$\vec{q}(\vec{r}+\vec{v}(dt),t+dt) = \vec{q}(\vec{r},t) \quad (20)$$

The Dirichlet boundary condition considered here is constant temperature at the bottom surface of the substrate 63 (FIG. 6A and FIG. 6B).

$T(0, t) = T_0$ = Substrate 63 Temperature Setpoint

The time-periodic Neumann boundary condition considered here is the laser flux distribution in one dimension:

$$\vec{q}(\vec{r})|_{\vec{r} \cdot \vec{e}_z = zmax}, t) = \left(\frac{2P}{\pi r_{laser}^2}\right) \exp\left(\frac{-2|(\vec{r} - \vec{v}t - \vec{r}_0)|_{\vec{r} \cdot \vec{e}_z = zmax}|}{r_{laser}^2}\right)$$

where P=Laser beam power $r_{laser}$=Laser beam spot size incident perpendicular to the length $\vec{v}t$=Displacement by the laser beam from the left end of the bar at time instant t $\vec{r}_0$=Initial position vector of the laser spot on the exposed powder surface $|\vec{r}, \vec{e}_z = zmax$=Condition for the laser flux to always hit the top surface of the powder bed $||$=$2^{nd}$ norm of the included vector The initial condition for the bar considered here is constant temperature $T_0$.

$$T(\vec{r}, 0) = T_0$$

Figure 7:
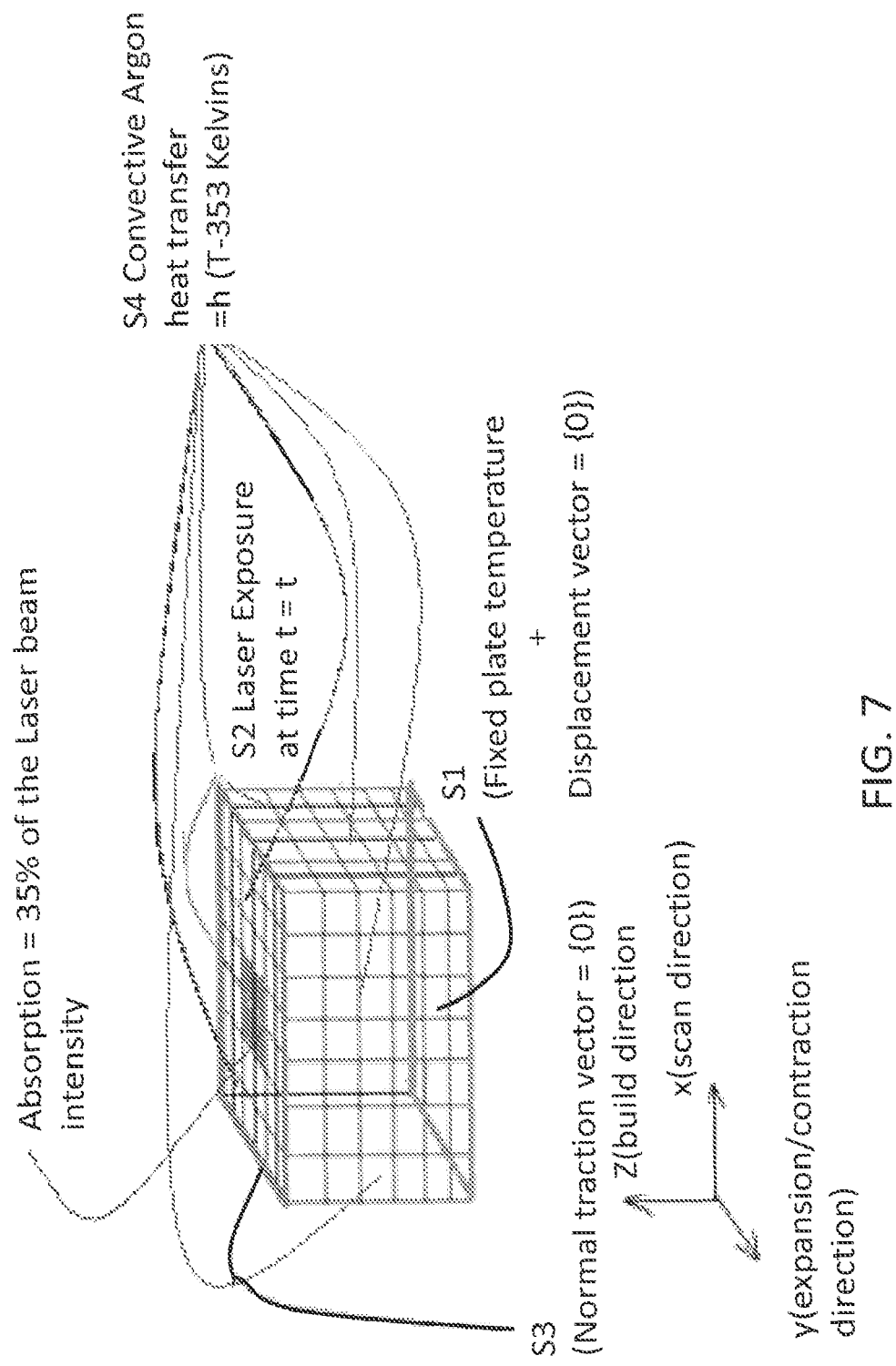
FIG. 7 shows the surface boundary conditions for the laser sintering operation of FIGS. 6A and 6B.

FIG. 7 shows the surface boundary conditions, which includes convection, laser flux and fixed temperature boundary conditions.

Element Formulations

Equation 4 can be decomposed into a weak form as equation 21.

$$[C_{thermal}]\{\dot{T}\} + [K_{Thermal}]\{T\} = \{R_Q\} \quad (21)$$

The three matrices in equation 21 are given below.

(i) Thermal Stiffness Formulation

The thermal stiffness matrix $K_{Thermal}$ is expressed as follows:

$$K_{Thermal} = \int_V B_{Thermal}^T \vec{\vec{k}} B_{Thermal} dV + \int_S hN^T N dS \quad (22)$$

where $B_{Thermal}$ is known as the flux-temperature matrix. The size of this matrix is 3×8. For a brick element comprised of 8 integration points, equation 22 is cumulatively repeated for all the integration points leading to $K_{Thermal}$ of size 8×8. dV denotes the volume of the element. The surface integral is valid when the bulk is exposed to a convection boundary condition. The surface integral is employed at the exposed surface with 2 dimensional shape functions and then transformed to three dimensional space. h in the above mentioned case is the convective heat transfer coefficient which is set as 12.5 W/(m²K) for Argon, but is both gas and flow rate dependent and thus would change for different machines. Argon fills the chamber atmosphere for reactive materials processed using metal laser sintering.

(ii) Thermal Specific Heat Matrix Formulation

The thermal specific heat matrix $C_{thermal}$ is expressed as follows:

$$C_{thermal} = \int_V \rho N^T c N dV \quad (23)$$

where $[N] = [N_1 \, N_2 \, N_3 \ldots N_8]$ are the 3 dimensional nodal shape functions of size 1×8. $C_{thermal}$ is computed once and it has a size of 8×8.

(iii) Thermal Flux Vector Formulation

The thermal flux vector $R_Q$ of size 8×1 is evaluated as follows:

$$\{R_Q\} = \int_S (\vec{q}(\vec{r}, t) \cdot \hat{n}) N^T dS + \int_S hT_e N^T dS \quad (24)$$

where $\vec{q}$ is the input heat flux. dS denotes the surface area of the element. The second surface integral in equation (24) is valid only when the convection boundary conditions operate and hence should be employed on those boundaries only. In this scenario, $T_e$ denotes the temperature of the ambient environment.

Inclusion of Latent Heat and Veperization

The latent heats have been added to traditional brick element formulations as follows. Metallic alloys such as Ti6Al4V have a range of temperatures at which the solid to liquid transition takes place. These temperatures for Ti6Al4V are in the range of 1877K to 1933K. Hence, the global thermal flux vector $\{R_Q\}_p$ is modified in the range of these temperatures:

$$\{R_Q\}_p = \{R_Q\}_p - \rho L_{fusion} \frac{\{M\}_p}{\Delta t} \cdot * \frac{(\{T\}_p - T_S)}{(T_L - T_S)}$$

where $\{T\}_p$=Temperature vector for 'p' DOFs $T_s$=Solidus temperature of the material=1877K $T_L$=Liquidus temperature of the material=1923K $$\{M\}_p = \text{sign}\left(\text{sign}\frac{(\{T\}_p - T_S)}{(T_L - T_S)} + \text{sign}\left(\frac{(T_L - \{T\}_p)}{(T_L - T_S)}\right)\right)$$

where sign denotes the signum function such that $$\text{sign}(x) = \begin{cases} 1 & \text{for } x > 0 \\ 0 & \text{for } x = 0 \\ -1 & \text{for } x < 0 \end{cases}$$

* denotes the direct product (one to one product) vector of two vectors of equal length.

$L_{fusion}$ denotes the latent heat of fusion and $\Delta t$ denotes the time increment per time step.

Vaporization on the other hand occurs at a unique temperature of 3533K for Ti6Al4V and is very significant in modeling situations where the energy intensity of the laser is high and the speed of the beam motion is low causing a huge amount of energy to be pumped at the beam focal spot. The energy is large enough to cause the material to vaporize but not large enough to cause a breakdown in thermal continua. $L_{fusion}$ in equation 6 is replaced by $L_{vaporization}$ in this scenario. Density($\rho$) has been used as the density of the liquid at the vaporization temperature.

Asymptotic approximation for localized spatio-temporally periodic boundary condition problems.

The generalized finite element discretized equation is as follows:

$$[C_{thermal}(T)]_{p \times p}\{\dot{T}\}_p + [K_{Thermal}(T)]_{p \times p}\{T\}_p = \{R_Q\}_p$$

The thermal parameters (specific heat, c, density, $\rho$ and thermal conductivity, k are treated as piecewise linear functions of temperature. The matrices $[C_{thermal}(T)]_{p \times p}$ and $[K_{Thermal}(T)]_{p \times p}$ can be expanded in the convergent Taylor series as.

$$[C_{thermal}]_{p \times p} = ([C_{thermal}]_{p \times p})_{T=353 Kelvins} + \frac{d[C_{thermal}]_{p \times p}}{d\{T\}}(\{T\}_p - 353) +$$

-continued $$\frac{d^2[C_{thermal}]_{pxp}}{d(d\{T\})^2}(\{T\}_p - 353)^2 + O\left(\frac{d^3[C_{thermal}]_{pxp}}{6(d\{T\})^3}(\{T\}_p - 353)^3\right)$$

$$[K_{thermal}]_{pxp} = ([K_{thermal}]_{pxp})_{T=353 Kelvins} + \frac{d[K_{thermal}]_{pxp}}{d\{T\}}(\{T\}_p - 353) +$$

$$O\left(\frac{d^2[K_{thermal}]_{pxp}}{2(d\{T\})^2}(\{T\}_p - 353)^2\right)$$

where $$O\left(\frac{d^3[C_{thermal}]_{pxp}}{6(d\{T\})^3}(\{T\}_p - 353)^3\right) \to 0$$

$$O\left(\frac{d^2[K_{thermal}]_{pxp}}{2(d\{T\})^2}(\{T\}_p - 353)^2\right) \to 0$$

Back substituting equations we get $$([C_{thermal}]_{pxp})_{T=353 Kelvins}\{\dot{T}\}_p + \frac{d[C_{thermal}]_{pxp}}{d\{T\}}(\{T\}_p - 353)\{\dot{T}\}_p +$$

$$\frac{d^2[C_{thermal}]_{pxp}}{d(d\{T\})^2}(\{T\}_p - 353)^2\{\dot{T}\}_p + ([K_{thermal}]_{pxp})_{T=353 Kelvins}\{T\}_p +$$

$$\frac{d[K_{thermal}]_{pxp}}{d\{T\}}(\{T\}_p - 353)\{T\}_p = \{R_Q\}_p$$

The prescribed flux vector is:

$$\{R_Q\}_p = \{R_Q\}_p \delta_{\left(\frac{r_{laser}}{\sqrt{2}}\right)}(\vec{r} - \vec{r}_q - \vec{v}t)$$

This can be further grouped for zeroth and higher order terms as follows:

$$\Big(([C_{thermal}]_{pxp})_{T=353 Kelvins}\{\dot{T}\}_p + ([K_{thermal}]_{pxp})_{T=353 Kelvins}\{T\}_p\Big) +$$

$$\left(\frac{d[C_{thermal}]_{pxp}}{d\{T\}}\{\dot{T}\}_p + \frac{d^2[C_{thermal}]_{pxp}}{2(d\{T\})^2}(\{T\}_p - 353)\{\dot{T}\}_p +$$

$$\frac{d[K_{thermal}]_{pxp}}{d\{T\}}\{T\}_p\right)(\{T\}_p - 353) - \{R_Q\}_p = \{0\}_p$$

The zeroth order problem can be first solved for the entire domain as follows:

$$([C_{thermal}_{pxp}])_{T=353\,Kelvins}\{\dot{T}\}_p + ([K_{thermal}_{pxp}])_{T=353\,Kelvins}\{T\}_p = \{R_Q\}_p$$

Once the temperature vector $\{T\}_p$ is obtained then the problem is re-solved with a higher order corrector for selective $\{T\}_p \gg 353$ since $(\{T\}_p - 353) \to \{0\}_p$ for those $\{T\}_p > 353$ K.

By using the one dimensional analog of the problem, the non-linear thermal behavior is constricted to the region $\vec{r} = \vec{r}_q + \vec{v}t + 4r_{laser}\vec{r}$ where $\vec{r}$ is the superficial arbitrary radial unit vector with origin at the center of the laser spot. The present feed forward dynamic mesh methods can be followed with refinement enwrapping the region in the near neighborhood of the laser spot centered at $\vec{r} = \vec{r}_q + \vec{v}t$.

Locally Enriched Dynamic Mesh (FFD-AMRD Framework).

Figures 8A, 8B:
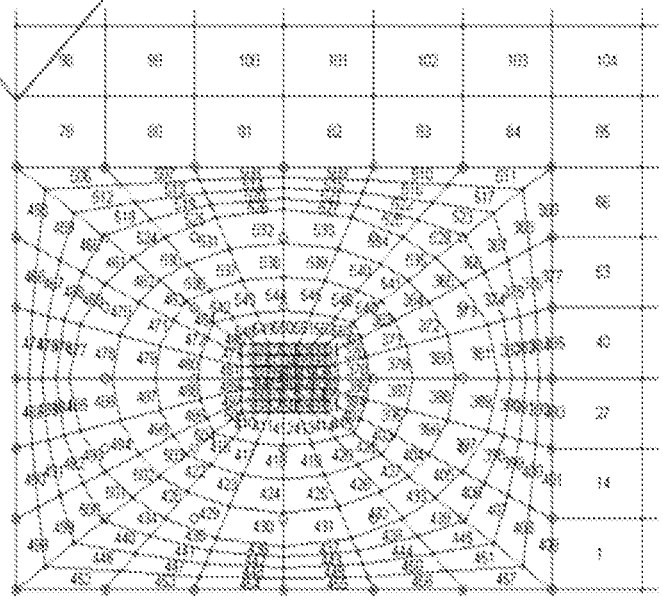
FIGS. 8A and 8B repectively illustrate a dynamically enriched mesh at an arbitrary initiation co-ordinate (3,3) with its blown-up fine mesh.

FIGS. 8A and 8B respectively illustrate a dynamically enriched mesh at an arbitrary initiation co-ordinate (3,3) with its blown-up fine mesh. The fine mesh can move in arbitrary x-y directions with the movement of the laser.

FFD-AMRD Framework for Applications in Spatio-Temporally Periodic Localized Boundary Conditions.

First a mathematical rationality for using a refined moving fine mesh is established. The thermal behavior in the case of metal laser sintering can be decomposed into local and global problems in terms of thermal curvature. It can be approximately estimated using a cylindrical coordinate system in 2D. Here thermal flow is assumed to be 2-dimensional and the Gaussian heat flux from the laser is assumed to be an external heat input as h(r).

$$k\frac{d^2T}{dr^2} = \frac{dT}{dt} - k\frac{1}{2}\frac{dT}{dr} - h(r) \qquad (25)$$

The laser is centered at r=0 with Gaussian flux. The $$\frac{dT}{dr}$$

term in the above equation has a magnitude on the order of $$\left(\frac{1}{r^2}\right)$$

provided the integral of the radial flux is maintained constant. The assumption that laser flux is equal to direct heat input h(r) with Gaussian distribution can be described as:

$$h(r) = ce^{-\frac{r^2}{2\sigma^2}} \qquad (26)$$

Substituting equation 26 into equation 25 and using an order of magnitude analysis along with equations 7 and 10 results in equation 27.

$$\vartheta\left(k\frac{d^2T}{dr^2}\right) = -\vartheta\left(\frac{1}{r^2}\right) - \vartheta\left(cd^{-\frac{r^2}{2\sigma^2}}\right) \approx \vartheta(h^2) \qquad (27)$$

This asymptotic behavior can be further exploited to increase efficiency of otherwise computationally expensive spatiotemporally periodic problems. The algorithm for achieving the increased efficiency is described in the next two sub-sections.

FFD-AMRD Thermal FEM Algorithm.

In the FFD-AMRD algorithm, the refinement zone is expected to refine and de-refine itself as the external spatiotemporal stimulus or response moves. The steps for generation and refinement below efficiently perform such refinement and de-refinement in negligible time overhead for FEM mesh regeneration and renumbering along with recalculation of FEM matrices Step 1: Mesh Generation:

1. Fixed coarse mesh generation a × b × c size prism
   $div_x$, $div_y$ and $div_z$ ; 2D element connectivity (Matrix: # of
   Coarse Elements (Coarse_el_length) × 8)
   $node_x$, $node_y$ and $node_z$ -continued

Figure 8C:
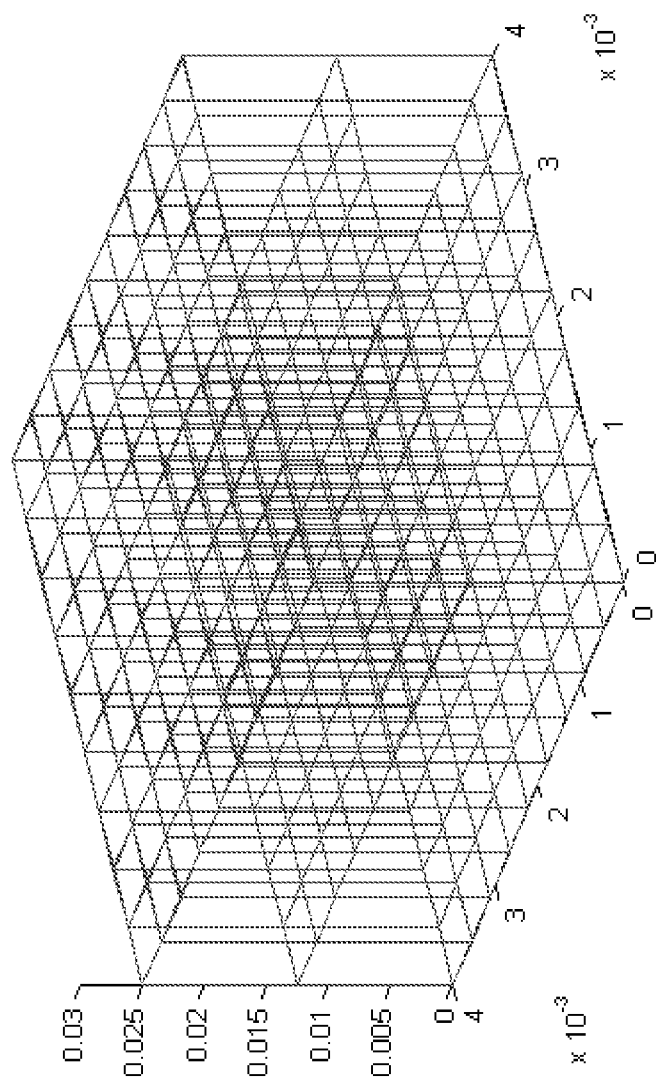
FIG. 8C illustrates extruded fixed coarse mesh generation.
Figure 8D:
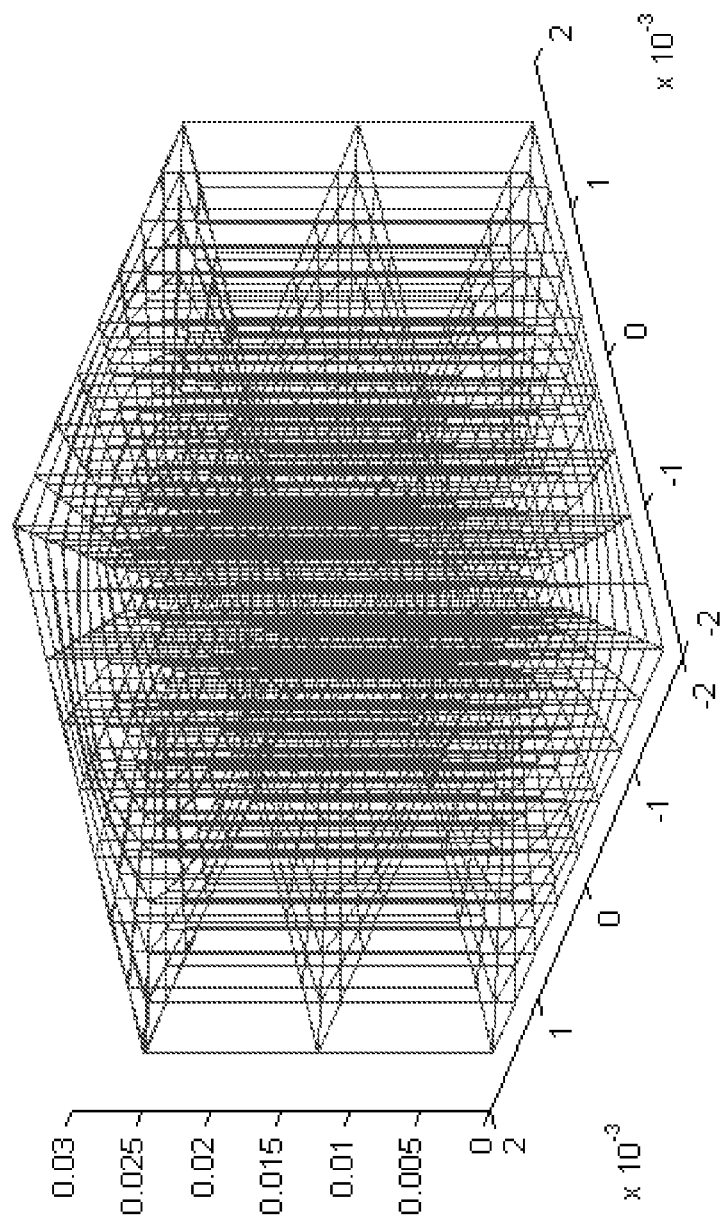
FIG. 8D illustrates extruded fixed coarse mesh generation.
Figure 8E:
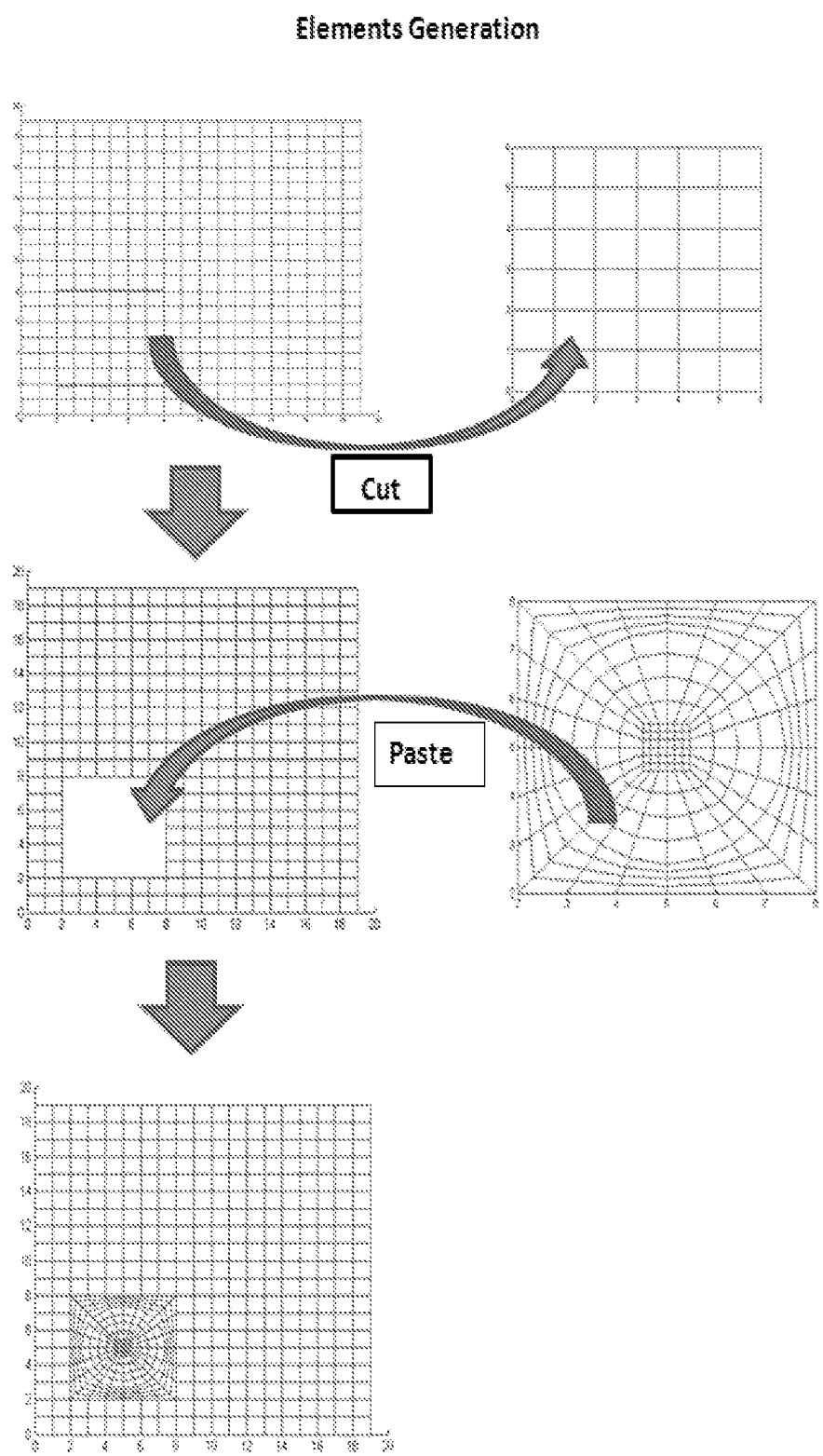
FIG. 8E illustrate FFD-AMRD mesh, stiffness and specific heat matrix generation.

```
    2D mesh for bottom surface: 2D connectivity (elem) and
    coordinate (coord) arrays
    Extrude to make 3D mesh : 3D elem and coord arrays (FIG.
8C)
2. Dynamic fine mesh block Sd × Sd size prism
    Decide mesh divisions
    Generate bottom surface mesh :
            i. nodes for the central square box
            ii. nodes for radial boxes
            iii. element connectivity for each block
    Extrude in z direction
    elem and coord (FIG. 8D)
3. Combined Adaptive Mesh for laser beam at location $\vec{r} = \vec{r}_q + \vec{v}t$
    Cut elements cut_list(Vector: Evac × 1 ) from coarse mesh
    Paste finemesh
    GlobalConnectivity (Matrix: Numelem × 8) array (FIG. 8E)
    GlobalCoord (Matrix: tlnodes× 3) array (FIG. 8E)
4. Scan Pattern Generation
    time $t_i$
    key turning points OR Trajectory Points $Kturn_i$ $(x_i, y_i)$
    Time step $dt_i$
    $\vec{dx_i} = \vec{v}$ dti
    Discretization between all $Kturn_i$ and $Kturn_{i+1}$
    Final array : Laser_loc (Matrix: (tsteps+1)×3)
    Laser_loc (i, : ) = $[t_i\ x_i\ y_i]$
```

Step 2: Finite Element Simulation with Feed Forward Dynamic Adaptive Meshing

```
FOR layer = 1 to #layers (Number of layers)
    Modify: elem and coord for added layer
    Decide: dimensions of all arrays like K and C
    Generate $K_{coarse}$, $K_{fine}$, $C_{coarse}$, $C_{fine}$
    Generate $K_{vac}$ and $C_{vac}$
    FOR offset =1 to #finemesh movements
        from last mesh to new mesh: isoparametric interpolation
            i.   DOF Transfer
            ii.  State variable
        FOR timestep: $t_i$ to $t_{i+n}$
            Generate Nonlinear K and C matrices
            $K_{pred}$ = $f(K_{coarse})$ + $A[K_{fine-norm}]B$ +
                g(T, state variables)
            Simplify in the form of $K_{pred}$ = K + ΔK
            $T_{(i+1)pred}$ = cholesky$(K_{pred})T_i$
            $K_{corrected}$ = $f(K_{coarse})$ + $A[K_{fine-norm-corrected}]B$ +
                g(T, state variables)
            $T_{(i+1)corrected}$ = $f(K_{corrected})$
            Interpolation to simple regular base grid: For input
                to DDCP
FEM
                DOF Transfer
                State Variable Transfer
        END timesteps
    END offsets
    FOR 1 to # cooling time steps
        Generate Nonlinear K and C matrices for the fine mesh
            region
        $K_{pred}$ = $f(K_{coarse})$ + $A[K_{fine-norm}]B$ + g(T, state variables)
            Simplify in the form of $K_{pred}$ = K + ΔK
            $T_{(i+1)pred}$ = cholesky$(K_{pred})T_i$
            $K_{corrected}$ = $f(K_{coarse})$ + $A[K_{fine-norm-correctd}]B$ +
                g(T, state variables)
            $T_{(i+1)correctd}$ = $f(K_{corrected})$
    END time steps
END Layers
```

Finemesh Generation.

Figure 9B:
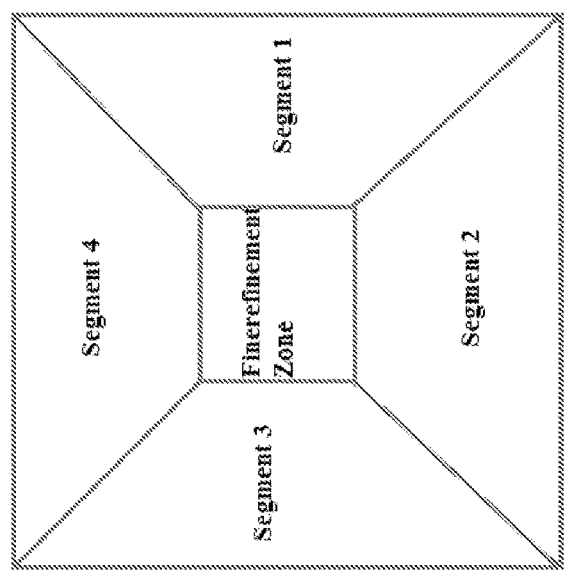
FIGS. 9A and 9B illustrate a fine mesh box with the refinement zone.
Figure 9A:
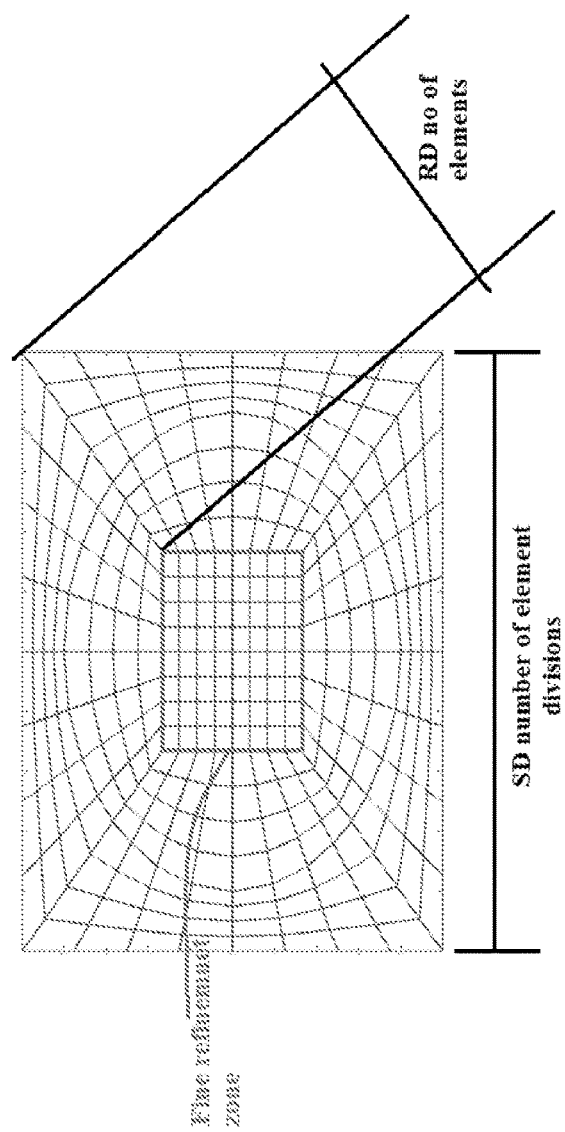

The finemesh is generated in a way that no hanging nodes are present in the transition zone between the coarse and fine refinement zones. FIG. 9A illustrates a fine mesh box with the refinement zone. The fine mesh is developed in accordance with FIG. 9B.

Intact Coarse Mesh.

An intact coarse mesh is defined by variables xnodes and ynodes, which respectively correspond to nodes in an x and y plane. Operations conducted include node generation in the fine refinement zone and four segments surrounding as in FIGS. 9A and 9B. An ordered list of nodes in each subdomain of the fine mesh box is created. The order is defined as a map of nodes from a perfect rectangular grid to a particular segment of the fine refinement zone. A connectivity array which has each row associated with one element is created. It includes an ordered list of nodes associated with one element.

Add fine mesh to coarse mesh at laser spot.

This process is completed in two steps. The first step is to remove the elements from the coarse mesh to create space for fine mesh insertion and the second step is to insert the finemesh box. Both steps require node renumbering and updating of the connectivity array.

The coarse mesh elements corresponding to the required location of the fine mesh box are removed with the following operation on the list of nodes and connectivity array.

$cut_{coord}$={(x,y,z):node coordinates that are connected only to elements that need to be removed} coarse_remind=coarse_node_coordinates∩$cut_{coords}$ cut_map:$cut_{coords}$→coarse_remind Connectivity_cut=connectivity(cut_map)

Fine Mesh Appending operation to generate mesh for particular fine mesh location. The fine mesh nodes are appended to the coarse_remind.

offset_coords={coarse_remind;fine_coord} offset_connectivity={Connectivity_cut;fine_connectivity}

Figure 10:
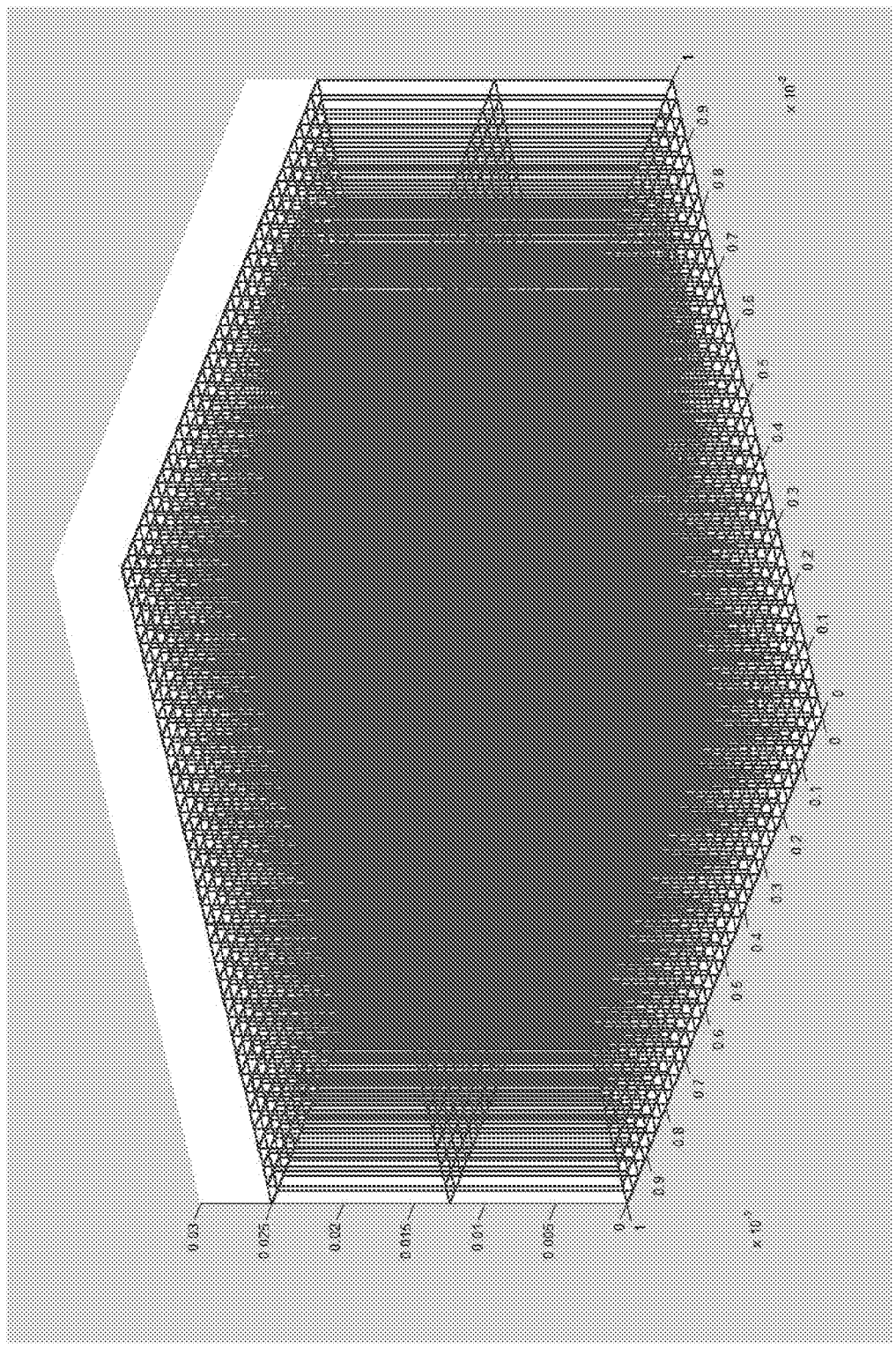
FIG. 10 illustrates a combined coarse and fine mesh in three-dimensions.

This produces the combined mesh shown in a two dimensional representation in FIGS. 3 and 8A. A three-dimensional representation is shown in FIG. 10.

FEM Matrices Calculations.

Stiffness matrices are assembled differently than the mesh generation. One benefit is faster stiffness matrix calculation at the same time the final configuration mesh is also available for the purpose of calculating various matrices of interest like flux boundary, application of convection boundary conditions and plotting geometry and deformation.

Efficient Stiffness Matrix Assembly.

The stiffness matrix of the dynamic moving mesh for a particular offset mesh configuration is generated from the intact coarse mesh and fine mesh stiffness matrices. This will reduce the computational time required to assemble stiffness matrices. In this section following standard mathematical notations are used to describe submatrices. The α and β are index sets of the rows and the columns of A.

A(α, β): submatrix of A, obtained by choosing the elements of A which do not lie in rows α and columns β

A[α, β]: submatrix of A(n×n), obtained by choosing the elements of A which lie in rows α and columns β

The stiffness matrix of the intact coarse mesh is denoted by $K_{intact}$. The first step in stiffness matrix generation is deducting components of stiffness that will be lost due to cutting the coarse mesh.

This component will be denoted as $K_{vac}$. The elements of $K_{vac}$ will be subjected to rigid translation when the finemesh configuration will be moved in to the location (offset+1). The Vac_constant is a function of local temperature dependent material properties in the coarse mesh.

$K_{vac}[\alpha,\beta]$=Vac_constant($f(\alpha,\beta)$))

$K_{vac}(\alpha,\beta)$=0

Where $\alpha \in \{[\text{mesh}_{cut_1} \cap \text{mesh}_{cut_2} \cap \text{mesh}_{cut_3} \cap \ldots \text{mesh}_{cut_m}] \cap N\}$ $\beta \in \{[\text{mesh}_{cut_1} \cap \text{mesh}_{cut_2} \cap \text{mesh}_{cut_3} \cap \ldots \text{mesh}_{cut_m}] \cap N\}$ Where mesh_cut$_i$ is a connectivity vector for the $i^{th}$ element in the mesh that is needed to be cut from the coarse mesh. Similarly $K_{fine}$ will be defined with the following definition of $(\alpha,\beta)$.

(coarse nodes–cut nodes)>$\alpha$>(coarse nodes–cut nodes+fine mesh nodes)

(coarse nodes–cut nodes)>$\beta$>(coarse nodes–cut nodes+fine mesh nodes)

$K_{fine}[\alpha,\beta]$=Fine_constant.

$K_{fine}(\alpha,\beta)$=0

The final assembly of stiffness for a particular configuration of the mesh will be the following $K_{global}$=Perm($K_{intact}$–$K_{vac}$)Perm$^T$+$K_{fine}$ The Perm is a row and column permutation matrix operator that assembles pieces of fragmented stiffness matrices together.

Fast fine mesh box FEM matrix ($K_{fine}$) generation for non-linear calculations.

Element stiffness for each matrix is stored diagonally in a large matrix K_unassembled and a perm_fine map is applied to it to get the matrix in the assembled configuration. The benefit of this process is that if only a few elements need to be changed for non-linear calculations then only those element matrices in K_unassembled need to be tweaked and assembled again to get the final $K_{fine}$. In the present work since element sizes are quite small, thermal properties inside one element have been assumed to be uniform. This leads to simplified calculations for $K_{unassembled}$, where each element matrix can be directly updated by scalar operation. $K_{unassembled}$ has the following form.

$$K_{unassembled} = \begin{bmatrix} E_1 & & & & & & \\ & E_2 & & & & & \\ & & E_3 & & & & \\ & & & E_4 & & & \\ & & & & E_5 & & \\ & & & & & \ddots & \\ & & & & & & E_n \end{bmatrix}$$

Where $E_i$ is the element stiffness matrix of the $i^{th}$ element. A simpler reconstruction of $K_{unassembled}$ for updated material properties involve scalar value multiplication as follows.

$E\_updated_i = c(i)E_i$

The $K_{fine}$ is calculated as follows $K_{fine} = perm_{fine}(K_{unassembled})perm\_fine^T$ perm_fine($i, j$) = 1 if $(i, j) \in$ fine_paires $$fine_{paires} = \left\{ \begin{array}{l} (a, b): b^{th} \text{ row in } K_{unassembled} \text{ corresponds to} \\ a^{th} \text{ degree of freedom in final configuration} \end{array} \right\}$$

Alternatively this can be written as $$fine_{paires} = \left\{ \begin{array}{c} (a, b): \text{ if } a = \text{fine\_connectivity}(i, j) \\ \text{then} \\ b = 8*(i-1)+j \end{array} \right\}$$

Fast Sorting Methodologies to Increase Data Transfer Between Meshes.

Figure 11:
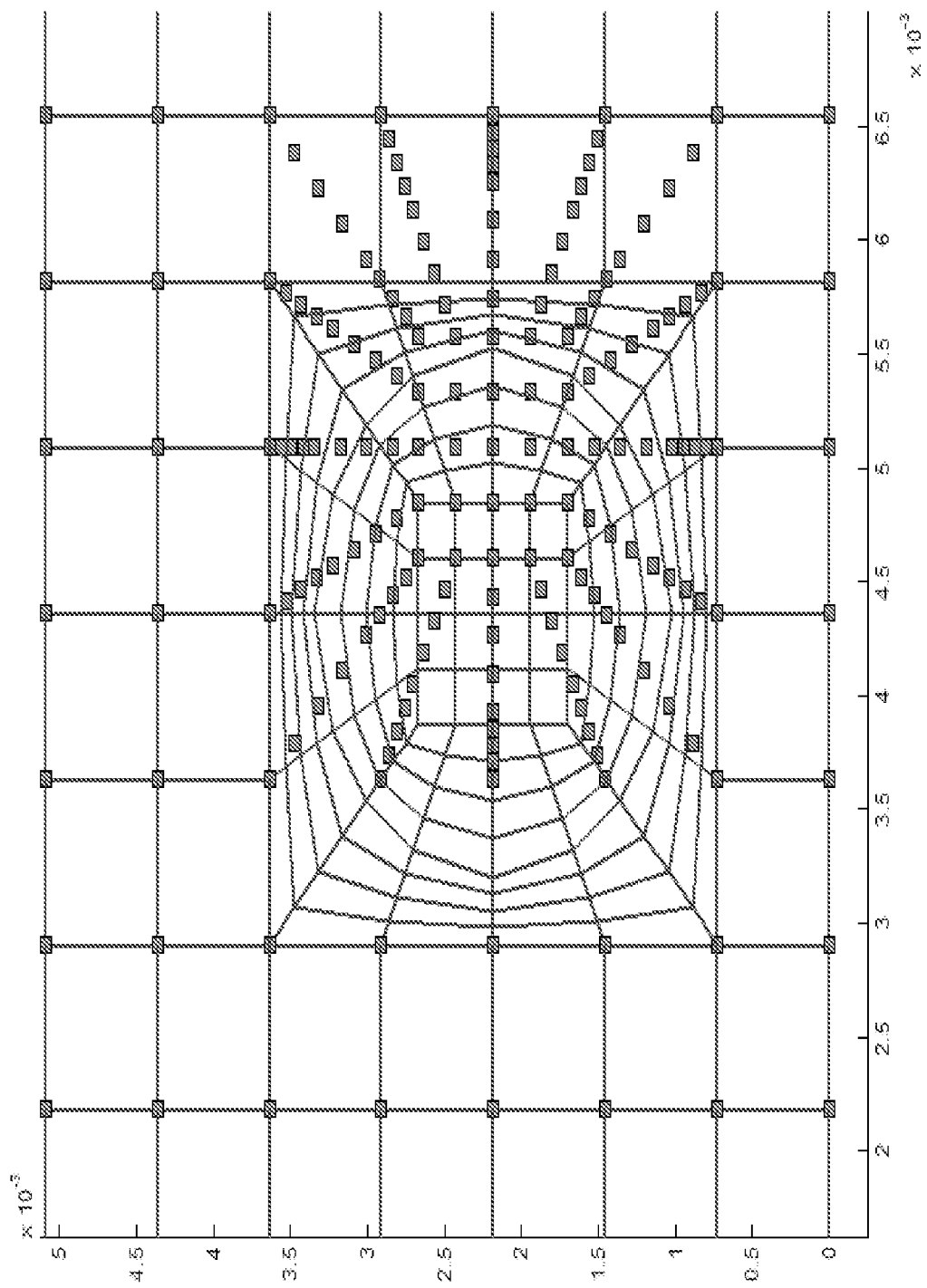
FIG. 11 illustrates updating of a fine mesh within a coarse mesh.

The algorithm for interpolation of DOF information from a node in a previous spatial mesh configuration to the next spatial mesh configuration depends on the implemented method. In the preferred embodiment, an inverse isoparametric interpolation strategy has been used. This strategy searches a target element in the next spatial mesh configuration in close proximity to the nodes present in the previous spatial mesh configuration. This search is expensive to perform though most of the nodes in the coarse mesh have a one-to-one correspondence between the present spatial mesh configuration and the next one. Henceforth, the number of calls for searching a target element in the next mesh configuration is largely reduced. Moreover, the search is not exhaustive in nature. The element in the next mesh configuration has defined bounds and the nodes falling between those bounds are used for interpolation as shown in the schematic in FIG. 11. In FIG. 11 old elements are lines and next elements are illustrated with points that will connect to define a new mesh.

Figure 12:
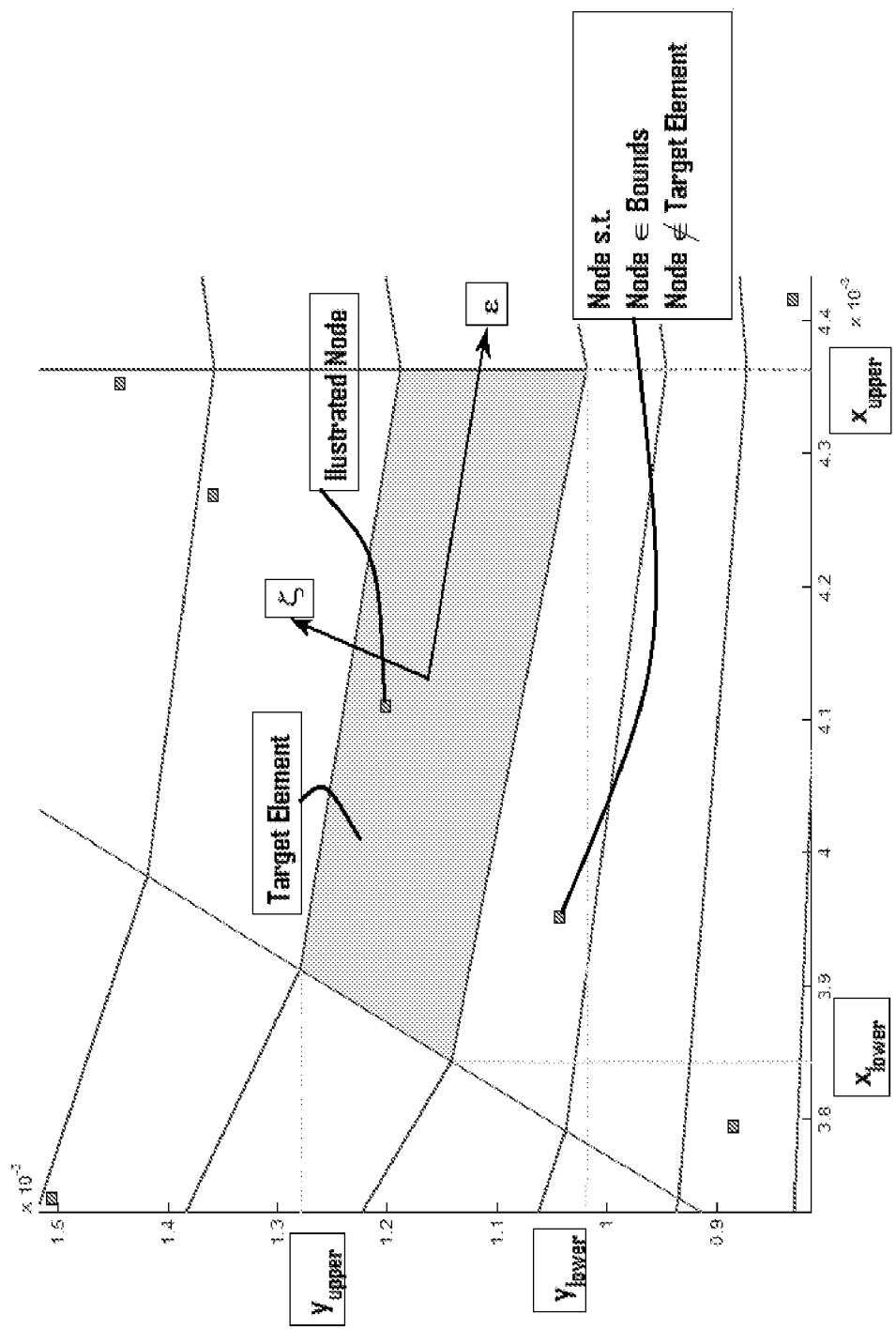
FIG. 12 shows boundaries for target elements in an old mesh with new mesh points.
Figure 13A:
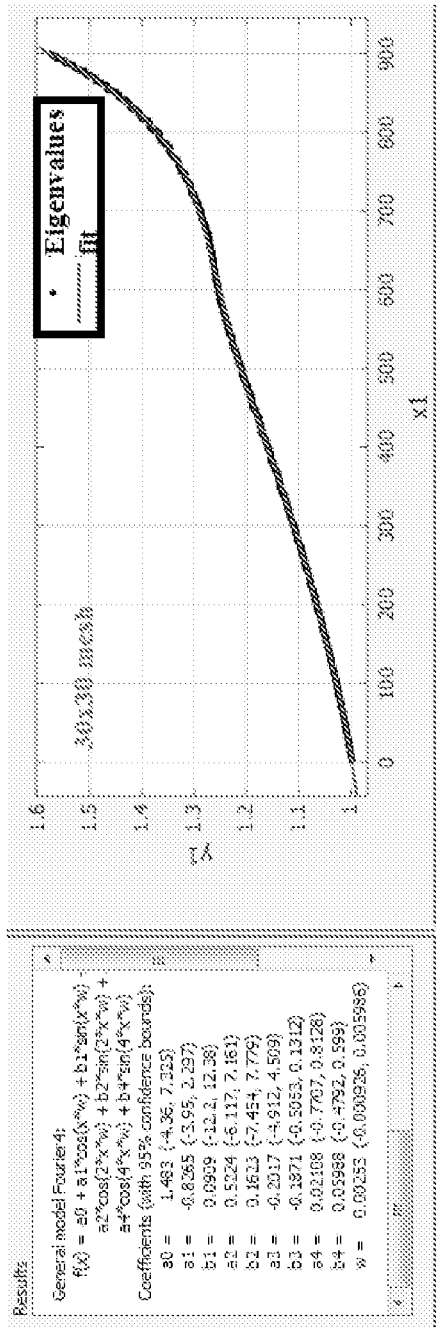
FIGS. 13A-13D illustrate Eigenvalue fitting as a function of a seven parameter Fourier Expansion.
Figure 13B:
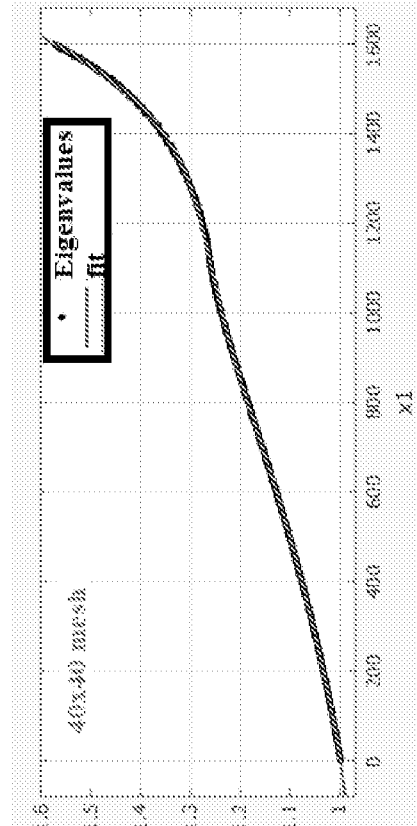
Figure 13B:
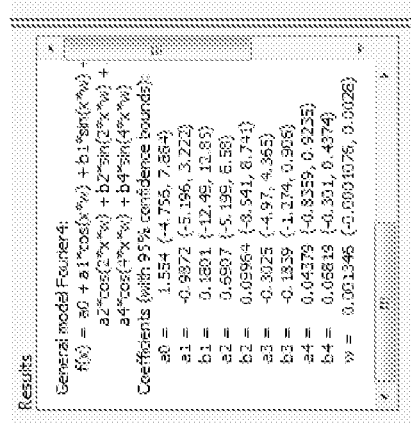
Figure 13C:
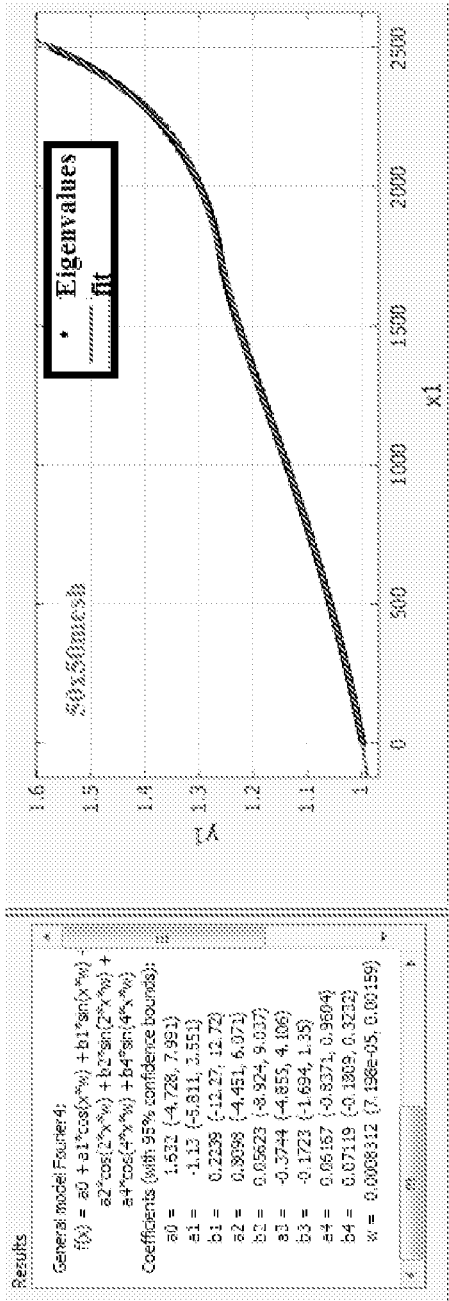
Figure 13D:
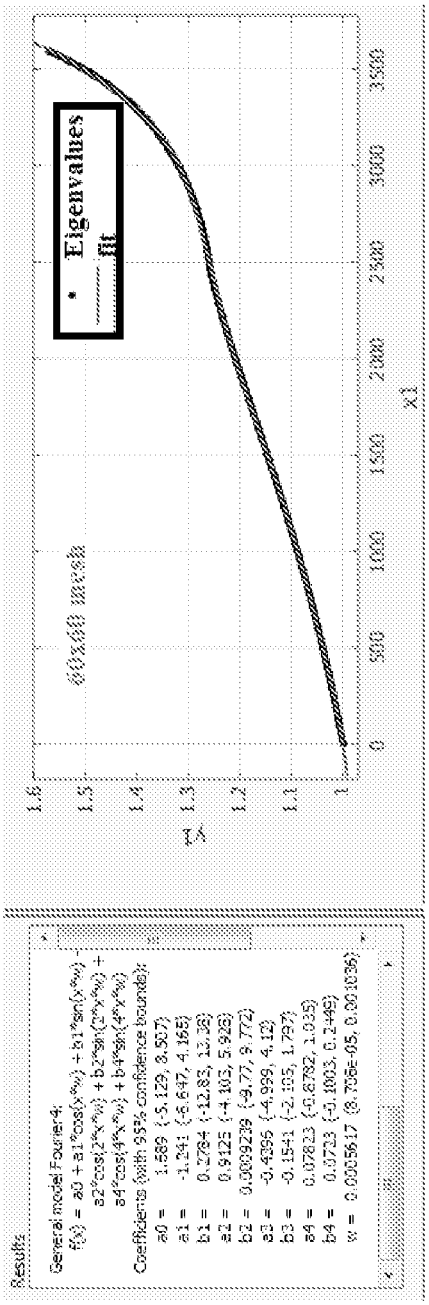

FIG. 12 shows boundaries for target elements in an old mesh with new mesh points. Target Element (old mesh configuration) for illustrated nodes (next mesh configuration). x and y bounds are shown with local isoparametric target element axes $\zeta$ and $\varepsilon$.

The fast sorting strategy is described using set theory based mathematical equations from equations 28 to 37.

$$\text{Mesh}_o = f(N_o, E_o) \tag{28}$$

$$\text{Mesh}_N = f(N_N, E_N)$$

where subscript O denotes the previous (old) mesh configuration and subscript N denotes the next (new) mesh configuration. Mesh denotes the connectivity of node (N) and element (E) respectively. Each component of the mesh array (Mesh) consists of 1 element number and 8 node numbers in a strictly positive triple product sequence.

$$\text{cord}(N) = [X_N, Y_N, Z_N] \tag{29}$$

where the cord (N) function denotes the 3 dimensional location of a particular node (N) consisting of a position vector triplet $[X_N, Y_N, Z_N]^T$.

$$\text{cord}(N_O) \cap \text{cord}(N_N) = G \tag{30}$$

$$N_C = \text{cord}^{-1}(G) \tag{31}$$

where node ($N_C$) denotes the common nodes between the previous and next mesh configurations.

$$f(N_C, E_o) = f(N_C, E_N) \tag{32}$$

which solves for the elements $E_C$, common to both previous and next mesh configurations $$E_o - E_C = E_{NCO} \tag{33}$$

where element ($E_{NCO}$) denotes the uncommon nodes present in the previous mesh configuration.

$$N_N - N_C = N_{NCN} \quad (34)$$

where node ($N_{NCN}$) denotes the uncommon nodes present in the next mesh configuration.

Bound($E_{NCO}$)=[$X_{ini,NCO}, X_{ini,NCO}, Y_{ini,NCO}, Y_{ini,NCO}, Z_{ini,NCO}, Z_{ini,NCO}$]

$$\forall \text{cord}(N_{NCN}) \in \text{Bound}(E_{NCO}): \quad (35)$$

There exists a pair s.t.

$$\text{Pair}(NCN, NCO) = [N_{NCN}, T(N_{NCN})] \quad (36)$$

where $$T(N_{NCN}) \subset E_{NCO} \quad (37)$$

Run-Time Geometry and Material Updates

A controller and simulator (not shown) control operations according to the invention. During the course of a simulation, the geometry and material is updated as a function of boundary conditions and subsequent solidification. In the case of the laser exposing the nth layer, (n−1) layers have been solidified at the regions of laser exposure in the previous layers whereas the nth layer is partially solidified from the laser initiation location to its current location based on its melt pool formation and solidification history. This dynamically captures physical variables such as thermal histories, cooling rates and phase evolutions in the part along with deviation of the part dimensions from its desired design geometry.

Eigenmode Based Finite Element Solver

Further benefits and speed for closed loop control are provided in preferred embodiments by methods for solving finite element meshes and providing the solutions of the simulation to a controller. The Eigenmode simulators are particularly applicable to the preferred embodiment additive manufacturing processes. In the preferred additive manufacturing processes, Eigenmodes determined as an outcome of implementation of this technique will help to reduce the time necessary for optimization of process parameters and closed loop control. In addition to thermal simulations in the context of selective laser melting processes described above, preferred Eigenmode solvers and controllers can be applied to other problems, e.g., simulation of lattice structures, layered materials such as ultrasonically consolidated laminates, thin walled coatings and development of high fidelity beam and plate theories for parts made using additive manufacturing as well as other manufacturing processes.

The solvers will be illustrated with respect to the preferred embodiment laser sintering methods and systems discussed above. First, the governing equations and boundary conditions are defined.

Governing Equations and Boundary Conditions.

Heat transfer in a material with isotropic thermal properties has the following governing equation, $$-\left(\frac{\partial q_x}{\partial x} + \frac{\partial q_y}{\partial y} + \frac{\partial q_z}{\partial z}\right) + Q = \rho c \frac{\partial T}{\partial t} \quad (38)$$

where $q_x$, $q_y$, $q_z$ are components of heat flow through a unit area. According to Fourier's law $$q_x = -k\frac{\partial T}{\partial x} \quad (39)$$

$$q_x = -k\frac{\partial T}{\partial x}$$

$$q_z = -k\frac{\partial T}{\partial z}$$

where:
K=thermal conductivity coefficient of media.
Q=Q(x, y, x)inner heat generation rate per unit volume.
ρ=material density
c=heat capacity The boundaries are Specified Temperature: $T_s = T_1(x, y, x)$ on area $S_1$. Specified Heat Flow: $q_x n_x + q_y n_y + q_z n_z = -q_s$ The temperature distribution inside an element is approximated using shape functions.

$$T=[N]\{T\} \quad (40)$$

$$[N]=[N_1 N_2 N_3 \ldots N_n] \quad (41)$$

$$T=\{T_1 T_2 T_3 \ldots T_8\} \quad (42)$$

Where $T_i$=temperature at the ith node of the element. Temperature gradient can be written as $$\begin{Bmatrix} \frac{\partial T}{\partial x} \\ \frac{\partial T}{\partial y} \\ \frac{\partial T}{\partial y} \end{Bmatrix} = \begin{bmatrix} \frac{\partial N_1}{\partial x} & \frac{\partial N_2}{\partial x} & \cdots \\ \frac{\partial N_1}{\partial y} & \frac{\partial N_2}{\partial y} & \cdots \\ \frac{\partial N_1}{\partial z} & \frac{\partial N_2}{\partial z} & \cdots \end{bmatrix} \{T\} \quad (43)$$

The global linear FEM equation for the transient linear problem is:

$$[C]\{\dot{T}\} + [K_C]\{T\} = \{R_Q\} \quad (44)$$

where $$C = \int_V \rho N^T c N \, dV$$

$$[K_C] = \int_V B^T k B \, dV \quad (45)$$

$$R_Q = \int_V Q N^T \, dV$$

$\dot{T}$ is a nodal vector of temperature derivatives with respect to time.

The Crank Nicolson integration scheme or generalized trapezoidal rule is used to integrate equation (44). This rule is:

$$\{T_{n+1}\} = \{T_n\} + \Delta t \{(1-\beta)\{\dot{T}_n\} + \beta\{\dot{T}_{n+1}\}\} \quad (46)$$

Where
β=½ is a integration parameter for the Crank Nicolson integration scheme $\Delta t = t_{n+1} - t_n$ $T_n$=known nodal temperature at time $t_n$
$T_{n+1}$=temperature at time $t_{n+1}$
Substituting equation (7) into above equation (9) gives the following equation:

$$\left(\frac{1}{\beta \Delta t}[C] + [K]\right)\{T_{n+1}\} = R_Q + [C]\left(\frac{1}{\beta \Delta t}\{T_n\} + \frac{1-\beta}{\beta}\{f_{n+1}\}\right) \quad (47)$$

Prediction of Thermo-Mechanical Variables with Eigenvalues.

Preferred embodiments determine modal contributions (Eigenmodes) in terms of orthogonal functions. The typical approach for determination of modes using sine or cosine functions is extended to fit a finite element framework where an Eigenvalue problem of the thermomechanical propagator matrices is computed in order to determine the orthogonal basis functions (Eigenvectors) for thermomechanical fields. These matrices compute the propagation of the thermomechanical field through the finite element mesh (e.g. in additive manufacturing from one cross-sectional layer to another along the −z direction. The inventors have noted that very near to the point of laser exposure the number of modes required to reconstruct the solutions is very high (the number of modes is limited by the number of number of degrees of freedom in each cross-section. For thermal problems, there is only a degree of freedom per node and for structural problems, there are 3 degrees of freedom per node) and as the distance from the point of laser exposure or energy input in the material medium increases, the number of modes required to accurately predict the solution drops very quickly.

Testing has shown that in the example case of mLS of Ti6Al4V, accurate thermomechanical solutions can be calculated almost instantaneously 4 or more layers away from the point of laser exposure where thermal gradients are low using a limited number of modes. The error introduction using this approach is negligibly small while the speed improvement is substantial. For cases of line energy sources, the match is also good, but slightly less so than for a point energy source. For cases of an area source, due to unrefined orthogonal modes the trend of solutions is replicated but the error is much worse when compared to a point energy-source solution.

For focused energy and line sources, the present approach completely eliminates the need to re-compute thermomechanical fields using fine-scale finite element solutions for the problem domains that are more than a few layers away from the energy source. This eliminates the vast majority of the computational time necessary to simulate real parts (which are typically made up of thousands or tens of thousands of layers).

Eigenvalues have been identified and reconstructed for the thermal case. A parallel architecture can be used to solve for deformation problem using a dislocation density based crystal plasticity (DDCP) finite element solver. For DDCP, the Eigenvalue problem has orders of magnitude higher complexity than for the thermal problem. A very fine refinement can be used to compute the dispersion matrix (B) and self-containment (A) matrices correctly in order to obtain the propagator matrix ($B^{-1}A$) for its Eigenvalue determination.

Computation of Thermal Eigenmodes

The basic approach in preferred embodiments, is to calculate modes of the effect of out of plane diffusion of the thermal field on in plane diffusion of the same. Modes are truncated to balance speed and accuracy. During the truncation, in plane and out of plane modes have an inverse relationship, and are more concentrated higher in plane. The preferred computation of thermal Eigenmodes can be described as follows:

I. Compute the Stiffness matrix for at least 3 layers.

II. Identify B (dispersion) and A (self-containment) as $K_n$=[[B A/2 0]; [B A B]$_{n-2}$; [0 A B]] where $K_n$ denotes the stiffness matrix comprising of 'n' layers.

III. Compute the B and A matrices involved in [B A B] format of one section of the stiffness matrix.

IV. Compute $P = B^{-1}A$.

V. Compute $P_{symm}$=symm (P).

VI. Compute [V, D]=eig($P_{symm}$).

After mode computation, the contribution of the computed Eigenmodes on applied force/flux vectors has been computed as follows:

VII. Compute the force (flux) field free of dispersion using $\{f_{new}\}=0.5*\{B^{-1} \{f_{old}\}+\text{trans}(\text{trans}(\{f_{old}\})*B^{-1}\}$.

VIII. Compute the contribution of each mode on the new force/flux using $\{\text{Contri}\}=\text{trans}(V)*\{f_{new}\}$.

Once the Eigenmodes and contributions are computed, the nodal degrees of freedom (in this case temperatures) can be reconstructed as follows:

IX. Compute size_V=size(V)

X. For i=1:size_V(2)

a. Compute $\lambda(1)=-D(i,i)$ b. Compute Const=$2*\lambda$ c. Compute Contri_factor(1)=Contri(i)

d. For j=2: # of cross-sectional layers i. Compute Contri_factor(j)=−Contri_factor(j−1)/$\lambda$(j−1)

ii. Compute $\lambda(j)$=Const−1/$\lambda$(j−1)

iii. End e. For j=# of cross-sectional layers-1:−1:1 i. Compute

Contri_factor(j)=Contri_factor(j)−Contri_factor(j+1)/$\lambda$(j+1)

ii. End

XI. Compute {Contri_factor}={Contri_factor}./$\lambda$ f. End

XII. Store Modal_part(i,:)={Contri_factor}

XIII. Compute Temperature, {T}=V*Modal_part.

Modal Space Derivations

A stiffness matrix for the FEM discretization will have a particular pattern of sparsity. FIGS. 13A-13D illustrate Eigenvalue fitting as a function of a seven parameter Fourier Expansion. It can be described as shown below with $A_i$ being a square matrix with a size corresponding to the number of degrees of freedom in one particular cross-section.

$$\begin{bmatrix} A_1 & B_1 & & & & & & \\ B_1 & A_2 & B_2 & & & & & \\ & B_2 & A_3 & B_3 & & & & \\ & & B_3 & A_4 & B_4 & & & \\ & & & B_4 & A_5 & B_5 & & \\ & & & & & \vdots & & \\ & & & & & & \vdots & \\ & & & & & B_{n-1} & A_n & B_n \\ & & & & & & B_n & A_{n+1} \end{bmatrix} \vec{T} = \vec{\text{Flux}} \quad (48)$$

$$\begin{bmatrix} \vec{f_1} \\ \vec{f_2} \\ \vec{f_3} \\ \vec{f_4} \\ \vec{f_5} \\ \vdots \\ \vec{f_n} \\ \vec{f_{n+1}} \end{bmatrix}$$

In the case of perfectly prismatic geometry and material like a perfect beam, $A_i$ and $B_i$ will follow the following relation except at the free end.

$$A_i = A$$

$$B_i = B$$

$$A_1 = A/2 \text{(Free edge stiffness)} \quad (49)$$

Permutations to make the matrix upper triangle will be $$P_1 = B(A/2)^{-1}$$

$$P_2 = B(A - P_1 B)^{-1}$$

$$P_i = B(A - P_{i-1} B)^{-1} \quad (50)$$

These permutations will be operated on both sides of the equation and will create a forward wave in the right hand side and an upper triangulation on the left hand side.

$$\vec{f}_{i\,i+1} = \vec{f}_{i\,i+1} - P_i \vec{f}_{i\,i} \quad (51)$$

These equations have no closed form explicit solution or any straight forward modal space solution. This difficulty can be overcome by pre-multiplying the whole equation by $B^{-1}$. The permutations for the modified system of equations will look like $$Pm_1 = (B^{-1}A/2)^{-1}$$

$$Pm_2 = (B^{-1}A - P_1)^{-1}$$

$$Pm_i = (B^{-}A - P_{i-1})^{-1} \quad (52)$$

This series of permutations have the same Eigenmodes for any $Pm_i$. These modes are the same as the modes of $B^{-1}A$. This is based on the property of Eigenmodes that is The inverse of a matrix has the same Eigenmodes as that of the original matrix Linear equations of matrices with the same vectors have the same Eigenvectors but different Eigenvalues.

Writing $Pm_i$ and $B^{-1}A$ in the form of modes will lead to the following equations.

$$Pm_i = \emptyset^T D_i \emptyset$$

$$B^{-1}A = \emptyset^T K \emptyset$$

$$Pm_{i+1} = \emptyset^T D_{i+1} \emptyset \quad (53)$$

$$\emptyset^T D_{i+1} \emptyset = (\emptyset^T K \emptyset - \emptyset^T D_i \emptyset)^{-1} \quad (54)$$

$$\emptyset^T D_{i+1} \emptyset = (\emptyset^T (K - D_i) \emptyset)^{-1} \quad (55)$$

$$D_{i+1} = (K - D_i)^{-1} \quad (56)$$

The last equation describes the evolution of Eigenvalues for the cross-section modes.

The Eigenvalues will converge asymptotically at some particular value as the permutation wave moves towards the bulk. Converged Eigenvalues will have the following governing equation.

$$D_{cov} = (K - D_{cov})^{-1}$$

$$D_{cov}^2 - K D_{cov} + I = [0]$$

This equation has an explicit solution because each matrix in it is diagonal.

$$D_{cov} = \frac{(K \pm \sqrt{K^2 - 4})}{2}$$

This proves that the minimum value for an individual value in the diagonal of K for obtaining a real solution of the above equation is equal to 2. This is also supported by the physics of the problem.

The assumption in the above formulation was that successive layers have material property variation across a cross-section. This assumption can be easily removed by evaluation of coupling between successive layers. Considering the number of modes that are of interest and the weak coupling between distant modes in the spectrum leads to small sized and sparse coupling matrices which need to be solved.

Semi-Analytical Eigen-Approaches.

The above embodiment provides an Eigenmode solution for a finite element framework. An alternate approach is to compute thermomechanical fields using non-polynomial basis functions (polynomials require discretized points for fitting a field) such as wavelets. Wavelets can be localized both in time and frequency domains, whereas Fourier transforms can only be localized in the frequency domain.

The inventors have developed a technique for computing 2 Dimensional analogs of 3 Dimensional problems. New algorithms and mathematical formulations can accurately predict thermomechanical fields in metal power bed fusion AM processes without the use of finite element discretization. These methods fall outside of conventional ways for solving thermo-mechanical fields, but their initial feasibility as a robust solution technique can be obtained in terms of derivation of Cauchy Green's heat function with efforts to obtain its space-time analog and derivation of the Eigenvalue problem for triband and pentaband matrices. These three new approaches to simulation of thermo-mechanical fields include: (1) analytical Eigenmodal decomposition, (2) Eigenwavelet formulation and development and (3) Bayesian statistical methods.

Analytical Eigenmodal decompositions are of interest since they enable analytical near closed form computations of dispersion of a forcing stimulus across a domain. Since the stiffness matrices, by the virtue of their spreading characteristics and symmetry, form banded [B A B] matrices, their analytical Eigenvalues can be computed using rigorous mathematical formulations. One simple triband [B A B] matrix results in an Eigenvalue set, $$U_{i=1}^n eig\left(A + 2B\cos\left(\frac{2\pi j}{2n+1}\right)\right)$$

where n=Number of points and j=0, 1, 2 . . . n. From a 3 Dimensional Additive Manufacturing perspective, n denotes the number of cross-sections (layers) in the geometry, solved using the FEM technique. For correlations between a point in the FEM mesh and the entire 3 Dimensional FEM stiffness matrix, many banded and nested tribanded matrices must be considered, which makes it difficult to compute Eigenvalues. For the thermal problem for moving point energy sources, this difficulty is reduced due to the scalar character of temperature; hence it is possible to compute the banded 3 spectra Eigenvalues for the thermal stiffness matrices, and using recursive and asymptotic analysis, the deformation Eigenvalues can also be computed.

Eigenwavelets provide a technique for solving wave equations using complex space-time variables. Since the wave equation equates the curvature in time with the curvature in space, a complex transfer function predicting the future and adjusting the past behavior in 3 Dimensional space can be derived provided a source. The application of this technique is of importance provided the causal paradigm in the future is ready as an input ahead of time (i.e., as long as we know what the upcoming layer details and laser scan vectors will be). The reasons for faster solutions using the Eigenwavelets approach (in fields such as electromagnetic wave analysis) is due to the fact that the solutions are not for a point in space and time but essentially a prediction of a smooth wave-like entity in these two dimensions subject to boundary conditions in time and space. Extensions of this strategy from a wave equation to a heat transfer equation is not straightforward since the heat equation equates the first derivative of the thermal response in time with its curvature in space. One of the approaches is the Cauchy heat integral in this regard. In this formulation, the space and time variables are not represented in a combined complex form. This method has been demonstrated for solving linear one dimensional static heat problems in textbooks and linear one-dimensional dynamic problems in research texts. But a new approach is required to extend Eigenwavelets to the heat equation in 3 dimensions, necessitating remarkable enhancements in the Cauchy heat integral for solving space time problems.

Banded Vectorization—Psude or Intelligent Cholesky Decomposition

Preferred embodiments use different algorithms to construct scarcity of the psudo-Cholesky decomposition matrix. The psude-Cholesky decomposition matrix has to be generated for a given stiffness matrix. The psudo-Cholesky matrix helps in faster solution of simulations equations required in linear and nonlinear analysis presented in the present innovation.

Applications include fast simulation of linear and nonlinear problems with sparse symmetric positive definite matrices. Another application is fast simulation of transient dynamic problems involving repeated inversion and multiplication of matrices. A preferred application is efficient storage and retrieval of decomposition matrices or corresponding inverses. Efficient algorithms for Eigen decompositions of matrices are provided, such as $B^{-1}A$ where B is a symmetric positive definite matrix whereas A does not share the positive definite property of its matrix structure with B.

Physics Behind the Algorithm

The Cholesky decomposition can be viewed as forward substitution wave followed by backward substitution wave. These waves decay significantly and effects die down rapidly away from the point of application. The Cholesky matrix includes lot many smaller and negligible numbers corresponding to far field effect and can be developed into Psudo-Cholesky matrix which has same decomposition form but requires less computational time to compute it.

The Cholesky decomposition has the standard form shown $$A=CC^T$$

Values in C are determined using the formula shown in $$C_{ij} = \frac{1}{L_{ij}}\left(A_{ij} - FL_{ijm}\sum_{m=1}^{j-1} C_{im}C_{jm}\right) \text{ for } i>j \quad \text{Equation (581)}$$

The psudo-Cholesky matrix is defined as $$A=LL^T+\varepsilon$$

Where $\varepsilon$ is small and negligible error.

Algorithm to Determine Pseudo-Cholesky

The preferred embodiment is a pseudo-Cholesky or intelligent Cholesky decomposition. This preferred method is quite general and could be used for most decomposition of any positive definite stiffness matrix. The algorithm requires computation of matrix E which defines sparsity pattern of the expected C matrix and once E is determined algorithm proceeds to computation of C. The E matrix is defined as $$E_{ij}=1 \text{ if } C_{ij}\neq 0$$

The $FL_{ijm}$ matrix is defined as $$FL_{ijm} = 1 \text{ if the } mth \text{ computation of } C_{ij} \text{ in Equation 2 is desired}$$
$$= 0 \text{ else}$$

Computation Steps to Compute E:
1. Calculate Stiffness matrix for initial material properties.
2. Decide an approximate initial algorithm parameters (tolerance or neighborhood distance as required by different criterion used as defined in this section ahead) based on existing values in the stiffness matrix.
3. The tensor values $FL_{ijm}$ will be determined through the sparsit algorithm below. It is indirectly list of FLOPS performed. In certain criterions it is not required to be stored.
4. A matrix E will be computed based on output of Pseudo-Cholesky generated after the algorithm based on definition of E provided above.
5. The information provided by E for future pseudo-cholesky decompositions can be used to compute pseudo-Cholesky for same mesh. This is simply using the definition of pseudo-Cholesky.
6. Record the number of FLOPS required with the algorithm parameters used.
7. Change algorithm parameters and repeat the above-mentioned procedure 1-6 until the error $\varepsilon$ is within an acceptable limit in addition to the total number of FLOPS which is at its optimally lowest value.
8. Use the information in the E matrix and FL tensor the information stored about significant numerical operations for the next iteration for the same or different stiffness matrices for the same mesh with different material properties in case of any nonlinearity.

Sparse Algorithm

Algorithm/procedure to compute sparsity pattern (E) of the pseudo-Cholesky decomposition matrix as well as the pseudo-Cholesky decomposition matrix itself. The initialization procedure comprises of the optimization of E matrix. Once E is known the same or other variants of E will be used to speed up the computation of pseudo-Cholesky decomposition matrix in future iterations.

```
For i=1 to DOFs
For j=1 to i−1
    For m = 1 to j − 1
        Sum = 0
        Compute Var a parameter of interest for the criterion being used. It
could be described mathematically as follows.
            Var = f (L_{im}, L_{jm},
parameters of interest for criterion as defined in the verbiage)
        If (Var satisfies the criterion)
            FL_{ijm} = 1
            sum = sum + FL_{ijm}L_{im}L_{jm}
        End
    End
```

$$L_{ij} = \frac{1}{L_{jj}}(A_{ij} - \text{sum}) \quad \text{for } i > j$$

```
If(abs(L_{ij}) > 0)
    E_{ij} = 1
    end
End
```

$$L_{ii} = \left(K_{ii} - \sum_{m=1}^{i-1} L_{im}L_{jm}\right)^{1/2} \text{ (similar criterions can be used here as well)}$$

$$E_{ii} = 1$$

End

Different criteria which can be used to calculate the E matrix. Significant numerical operations involved in these computations are provided.

Criterion 1: Calculate the exact Cholesky decomposition and filter numbers for a particular tolerance to determine E matrix.

Criterion 2: Neighborhood heuristics (computes $FL_{ijm}$) where $L_{im}L_{jm}$ multiplications for a particular value of m are computed only if m is within a particular distance away from non-zero values in the corresponding row of the stiffness matrix. Application of these criteria is provided in Table 1.

TABLE 2

Algorithm for Criterion 2 for number filtering.

```
For i=1 to DOFs
For j=1 to i−1
    For m = 1 to j − 1
        Sum = 0
            Var = minimum (index distance between non −
zero value of i^{th}
            row of K matrix and K_{im})
        If (Var < tolerance)
            FL_{ijm} = 1
            sum = sum + FL_{ijm}L_{im}L_{jm}
        End
    End
```

$$L_{ij} = \frac{1}{L_{jj}}(A_{ij} - \text{sum}) \quad \text{for } i > j$$

```
End
L_{ii} = (K_{ii} − FL_{ijm} Σ_{m=1}^{i−1} L_{im}L_{jm})^{1/2} (similar criterions can be used here
as well)
End
```

Criterion 3: Multiplication criterion (computes $FL_{ijm}$): $L_{im}L_{jm}$ multiplications in are computed only if the absolute value of the multiplication is above a certain tolerance value. Variation of this criterion includes following the criterion on numerical computations in equation 1 in order to consider a particular $L_{im}L_{jm}$ multiplication.

$$\frac{L_{im}L_{jm}}{L_{jj}} > \text{tolerance}$$

Criterion 4 (computes $FL_{ijm}$): $L_{im}L_{jm}$ multiplications in equation 1 are computed only if the individual values $L_{im}$ and $L_{jm}$ are both above a certain tolerance.

Criterion 5: Neighborhood heuristics (uses $FL_{ijm}$ but do not keep it in the memory) where $L_{im}L_{jm}$ multiplications for a particular value of m are computed only if m is within a particular distance from any non-zero values in the $i^{th}$ or $i^{th}$ row of the stiffness matrix.

Transform Based Decomposition and Patterned Based Storage

Figure 15:
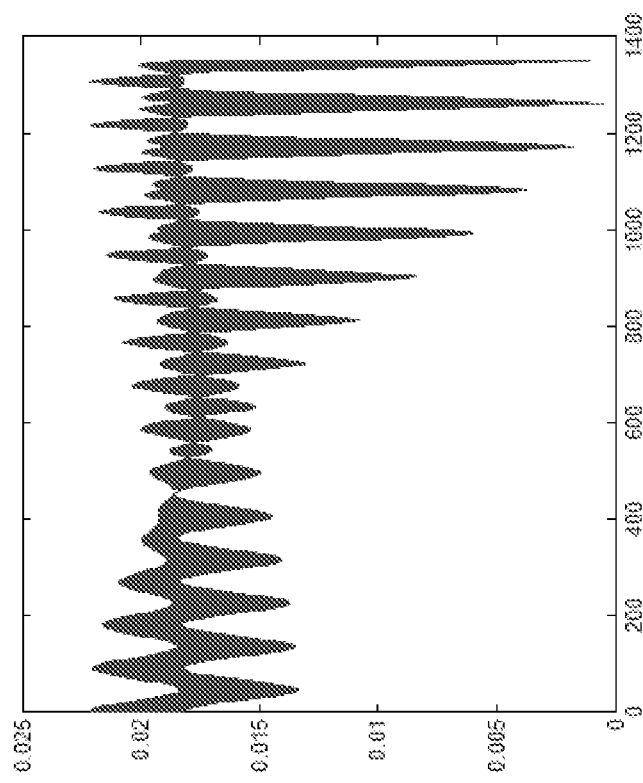
FIGS. 14 and 15 respectively plot a typical row of a Cholesky decomposition matrix and its Fourier transform.
Figure 14:
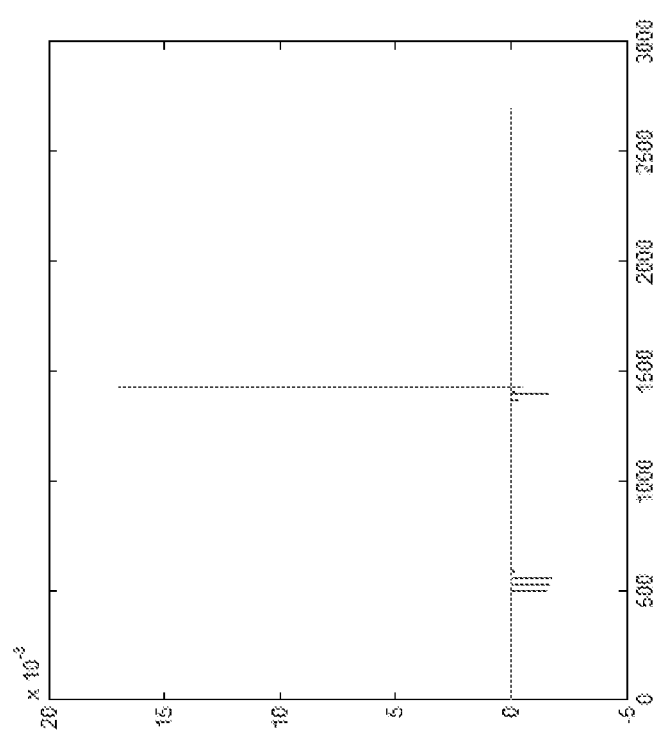

The inventors have recognized that a transform of a decomposition matrix provides patterns that can be used for efficient memory operations. A sample Fourier transform of a typical row of a Cholesky decomposition of pseudo-Cholesky decomposition matrix has been illustrated in FIGS. 14 and 15. The Fourier transform of other rows reveals a strikingly similar pattern. In preferred embodiments, this pattern is leveraged for matrix data storage along with fast and computationally efficient inner products of any two rows of the lower triangulated Cholesky matrix. This can also be applied to row and column operations involved in general matrix algebra computations. This involves numerical experiments with various transforms such as wavelet decomposition (involves localizations in both frequency and time domains) along with traditional Fourier transforms (involves localizations explicitly in the frequency domain). A pattern is leveraged in each case.

A new modified Cholesky Decomposition algorithm has been developed. The computational cost to compute Cholesky decomposition is found to be reduced with the proposed Pseudo-Cholesky or Intelligent Cholesky Decomposition involving filtering of small values and numerical operations below a certain numerical threshold.

Multi-Scale Simulation and Control of Manufacturing Processes

A laser sintering system and controller have been discussed. Embodiments of the invention are more generally applicable. Preferred embodiments provide computational time and memory efficient simulation of various other additive manufacturing processes. In addition, metal working processes such as rolling, forming, wire drawing and deep drawing along with other manufacturing processes such as fusion welding, casting and friction stir welding involving spatiotemporal or pseudo-spatiotemporal multi-scale phenomena can be modeled and controlled with the invention.

A preferred embodiment generalized manufacturing simulator computing the macroscopic thermomechanical variations at a coarser length scale of the full process environment using high fidelity dimensional reduction based on the preferred Eigensolver, which provides periodic and higher order boundary conditions (PHOBCs) for analyzing the fine length scale using the preferred Feed-forward Dynamic Adaptive Mesh Refinement and De-refinement (FFD-AMRD) methods. The coarser Eigensolver and the fine-scale FFD-AMRD approaches are connected through an interface which exchanges information about changes in boundary conditions, material properties and phases. Preferably, finite element simulations are accelerated at finer length scales with the banded intelligent Cholesky decomposition solver for simultaneous equations at the finer scale.

Figure 16:
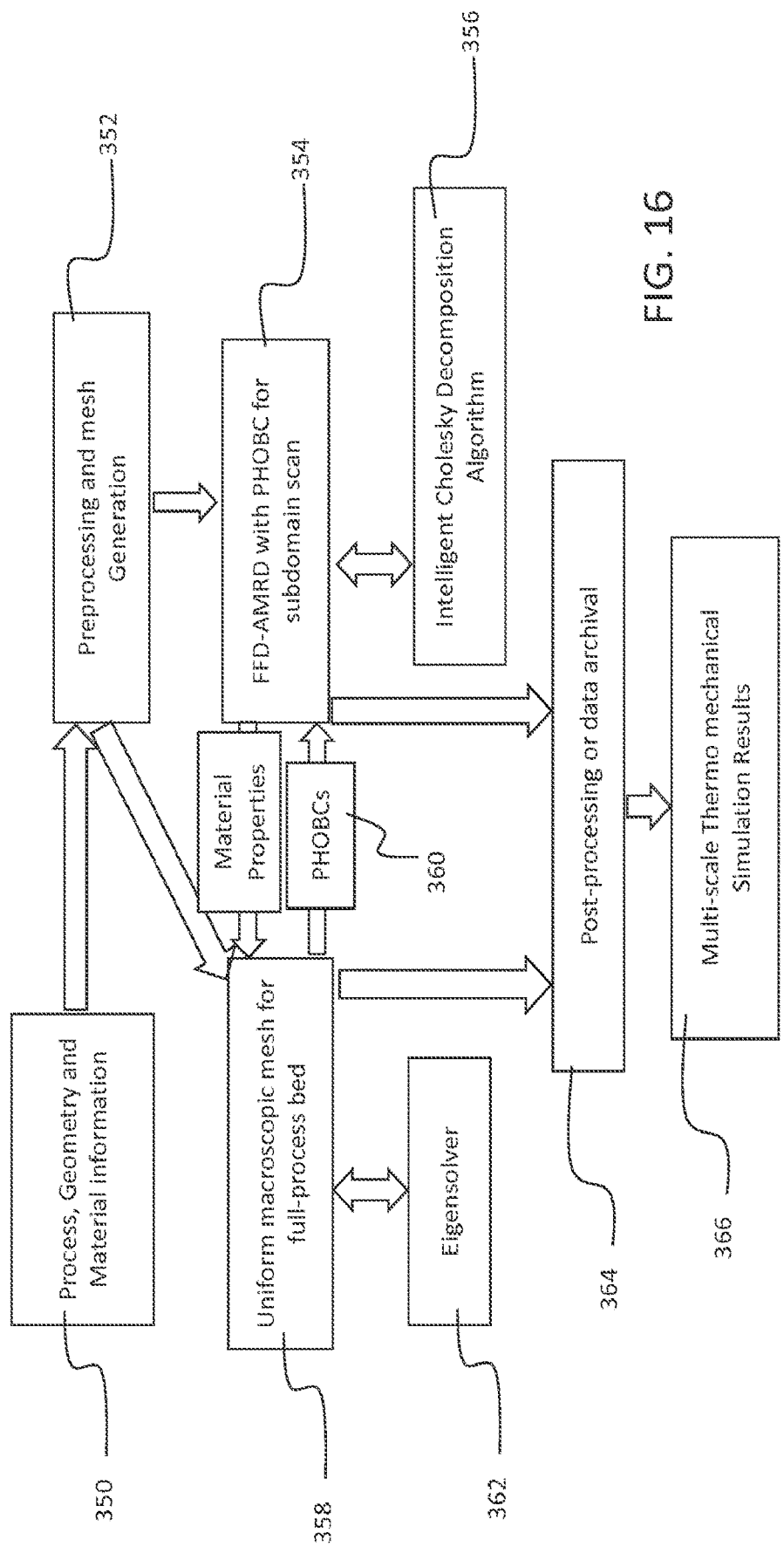
FIG. 16 is a block diagram of a preferred embodiment generalized manufacturing simulator and controller.

FIG. 16 illustrates the generalized manufacturing simulation and controller. The controller receives 350 material and process parameters. The parameters can include, for example, material parameters that have been discussed above. In addition, process parameters and system feedback such as optical images and data from pyrometers, IR cameras, temperature sensors, gas sensors, etc. can be received. The system will then separate two or more scales with different simulation models and then combine them through an interface passing information from one model to the other. At the macroscopic scale, these structures are a collection of cells (periodic or aperiodic) and at the microscopic length scale they may have a representative volume microstructure. The macroscopic scale is significantly coarser than the fine scale model and the evolution of physical parameters are much slower in the spatiotemporal domain. Benefits of such slow variations are taken through preferred modal decomposition based dimensional reduction. The significant modes with higher flux/force contributions are further used to provide information in terms of different types of periodic and higher order boundary conditions to the simulation model at finer length scales. The finer length scale is solved using purely nonlinear finite element based simulation tools such as the FFD-AMRD continuum thermomechanical solver and/or the homogenized Dislocation Density based crystal plasticity solver in conjunction with a novel technique to reduce the order of complexity of involved simultaneous equations using the banded Intelligent Cholesky decomposition, which is an order of magnitude faster compared to traditional solvers.

Pre-Processing and Mesh Generation 352

The preprocessing 352 involves discretization of a continuous domain to create an array of nodes and elements such that a continuous phenomenon in terms of spatiotemporal partial differential equations can be approximated using polynomial basis functions in the discretized space. Basic infrastructure is used to mesh a general geometry along with advanced features to generate a mesh with multi-resolution for multi-scale simulations. The meshes are configured to completely eliminate irregular hanging nodes in meshing a general geometry.

Figure 17B:
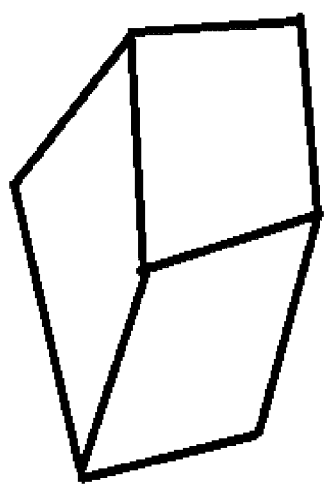
FIGS. 17A-17C illustrate respective perfect lattice, generalized basic and three dimensional motifs that can be used to mesh complex geometries.
Figure 17A:
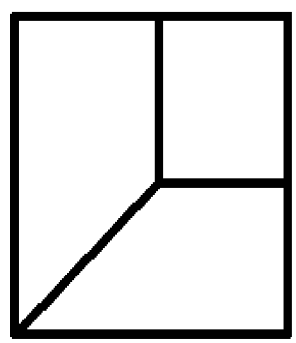
Figure 17C:
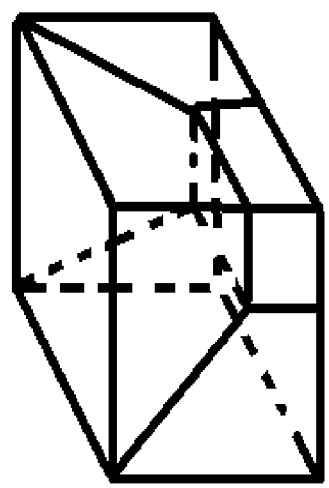
Figure 18:
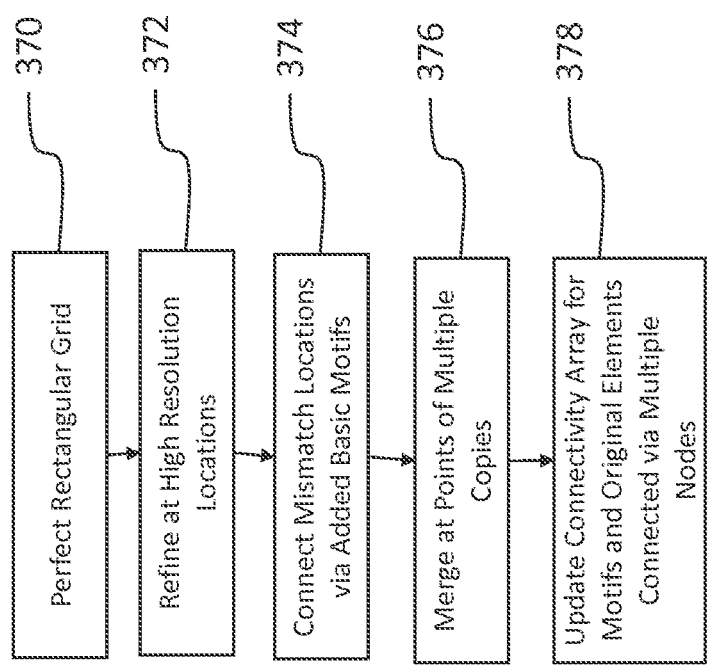
FIG. 18 is a block diagram concerned a preferred mesh generation method used in the simulator and controller of FIG. 16.
Figure 19A:
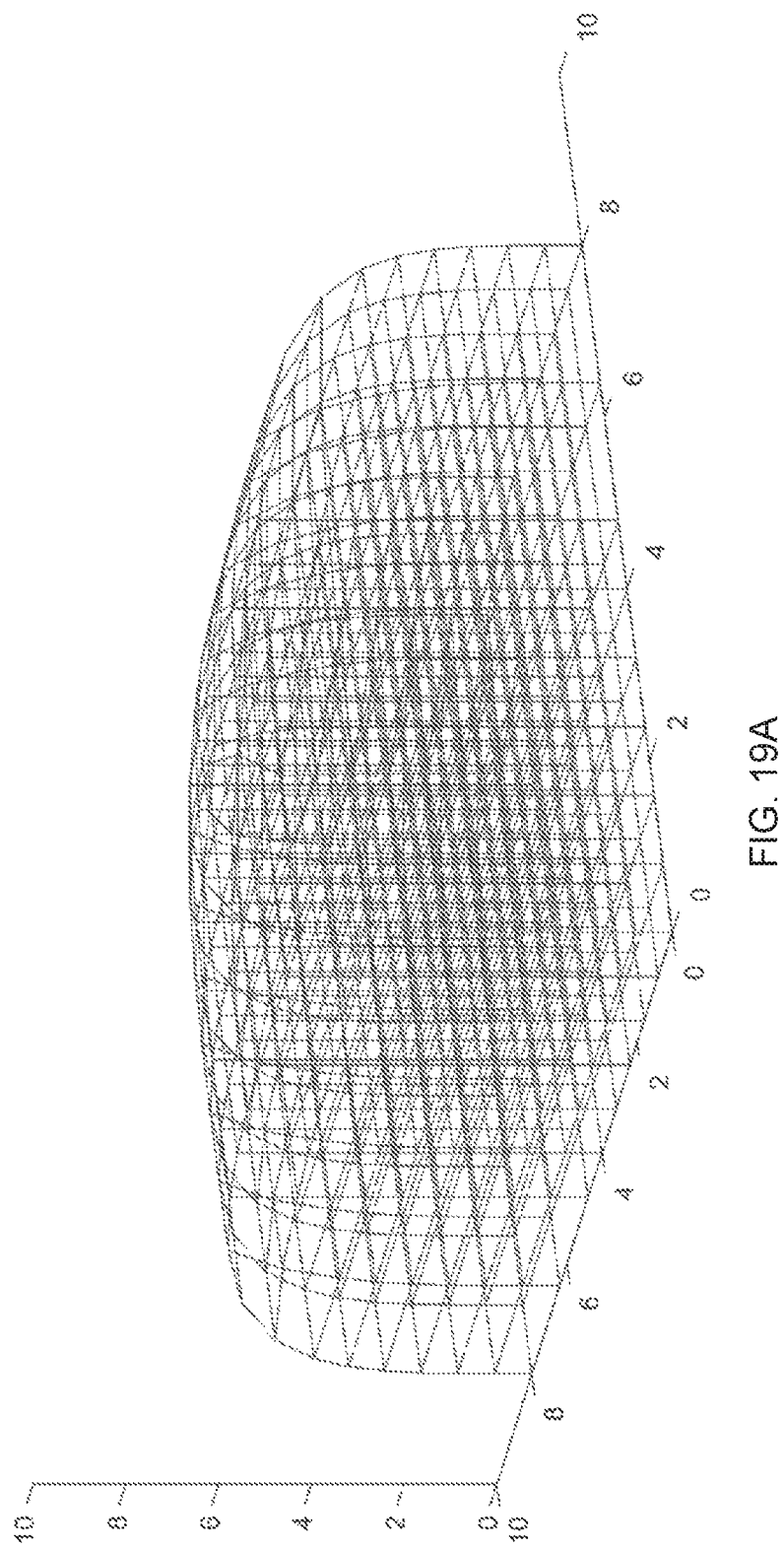
FIGS. 19A-19D respectively illustrate a refined mesh of a Inconel alloy precipitate with curvature, the precipitate plus the matrix, a 2D section of the precipitate with matrix and a full 3D mesh.
Figure 19B:
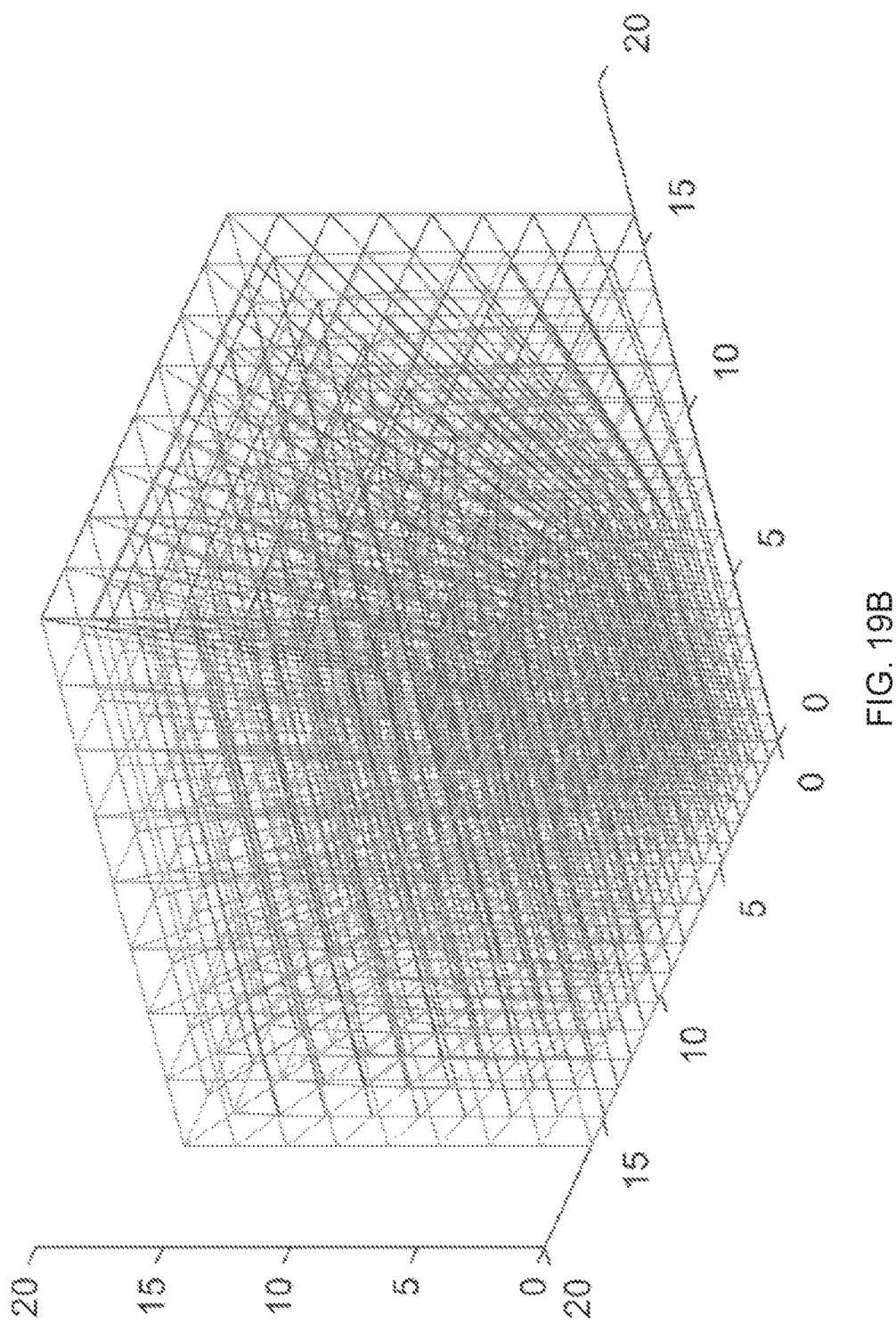
Figure 19C:
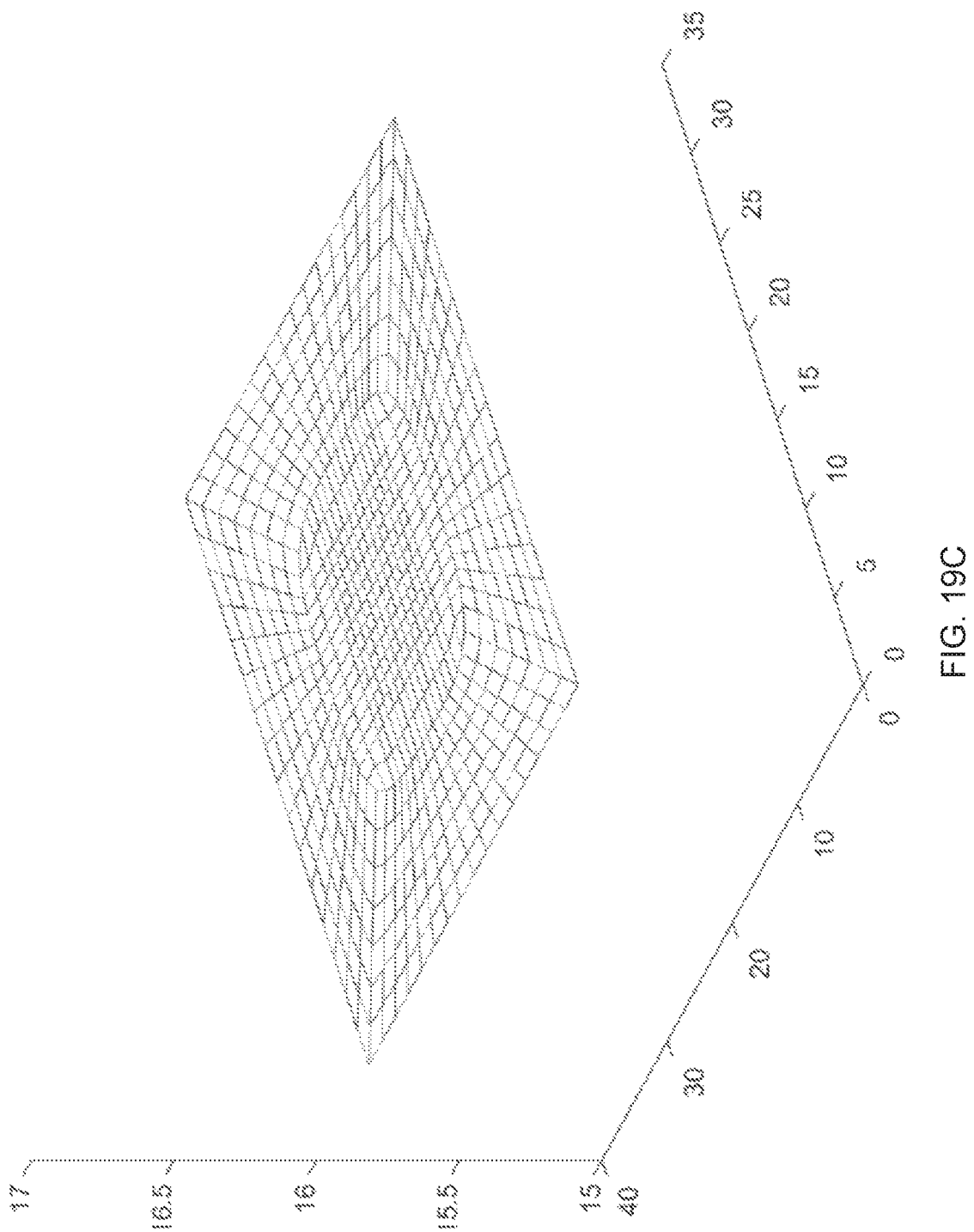
Figure 19D:
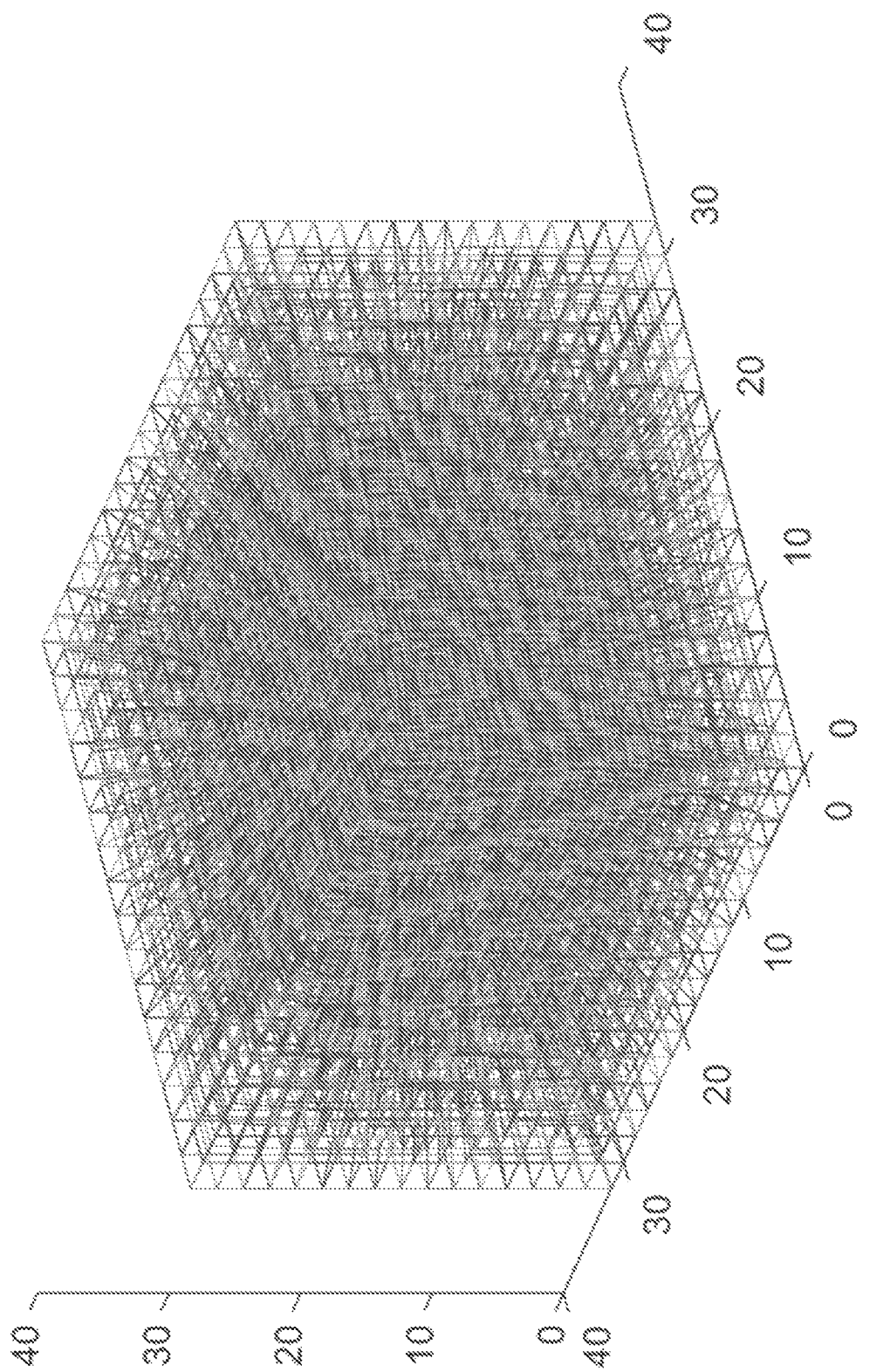

FIGS. 17A-C illustrate respective perfect lattice, generalized basic and three dimensional motifs that can be used to mesh complex geometries. With the motifs, a complex grid can be developed as illustrated in FIG. 18. First, develop 370 a perfect rectangular grid. Grid refinement 372 is conducted at locations where high resolution is required with a higher resolution regular grid. After refining, regions of mismatch are connected 374 through addition of basic motifs in one or multiple stages based on the mismatch in mesh refinement. This will create multiple copies of nodes at the same point. Nodes are merged 376 at each point if multiple copies exist at that point. After merging, the connectivity array is updated 378 for all motifs and original elements connected through multiple nodes that are combined into a single node.

FFA Dynamic Meshing 354 and Adaptive Decomposition 356

With reference again to FIG. 16, the dynamic meshing 354 and decomposition is conducted as described above. The adaptive meshing can follow a moving point energy source such as the laser/electron beams or friction surfacing metrodes etc. locally to simulate thermomechanical effects in the entire domain. Periodic and other higher order boundary conditions are applied during the adaptive meshing to avoid unnecessary updates in the coarse mesh.

The decomposition 356 has been described above. The major operations are based upon a recognition that the finite element stiffness matrices are significantly sparse in most cases whereas the corresponding lower triangulated Cholesky matrices are significantly populated. The inventors have found that the lower triangulated matrix is composed of values that are very small in order of magnitude compared to a few significant numbers. As explained above, the decomposition can predetermine insignificant numbers in the Cholesky matrix for iterative nonlinear simulations as well as single linear finite element simulation. The predetermination of insignificant numbers avoids their computation while using the Cholesky algorithm to reduce the computational costs and memory involved.

A particular additional example to illustrate the meshing and decomposition provides volume based refinements for the modeling of Inconel alloys. Inconel contains secondary and tertiary precipitates, as illustrated in FIGS. 19A-19D, which respond differently than the bulk when exposed to various thermal and deformation fields (similar to the fields experienced in metal based additive manufacturing processes). These refinement boxes can also be used as fine mesh boxes for point or volume based energy sources or moving features along with dynamic meshing capability described in the above section. The refinement works with different curvatures and it is parametric with parameters as follows:

$$\left(\frac{x}{a}\right)^p + \left(\frac{y}{b}\right)^q + \left(\frac{z}{c}\right)^r = k \qquad \text{Equation (59)}$$

If the values of p, a and r in $$xa\boxed{?}\boxed{?}p\boxed{?}\boxed{?} + \left(\frac{y}{b}\right)^q + \left(\frac{z}{c}\right)^r = k \qquad \text{Equation (59)}$$

approach infinity the surface enclosing the precipitate volume shown in FIGS. 19A-19D approaches a perfect prismatic geometry.

Figure 20:
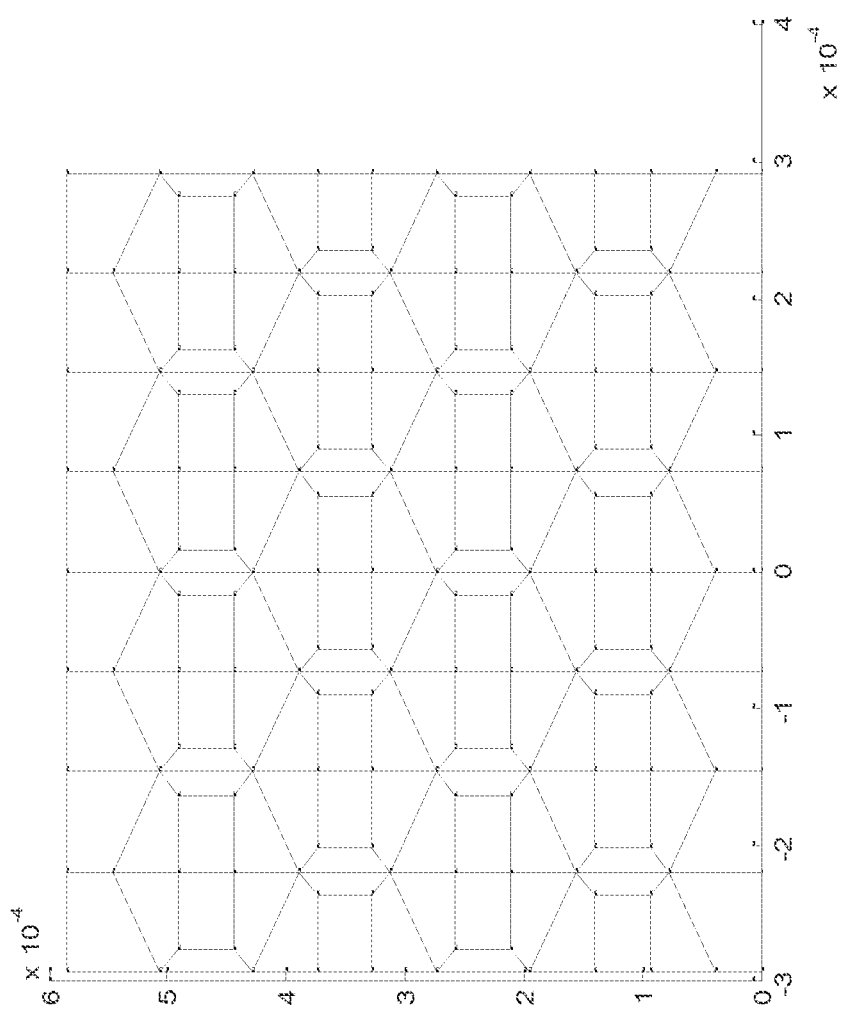
FIG. 20 illustrates a polygonal mesh element for meshing complicated material microstructure.
Figure 21:
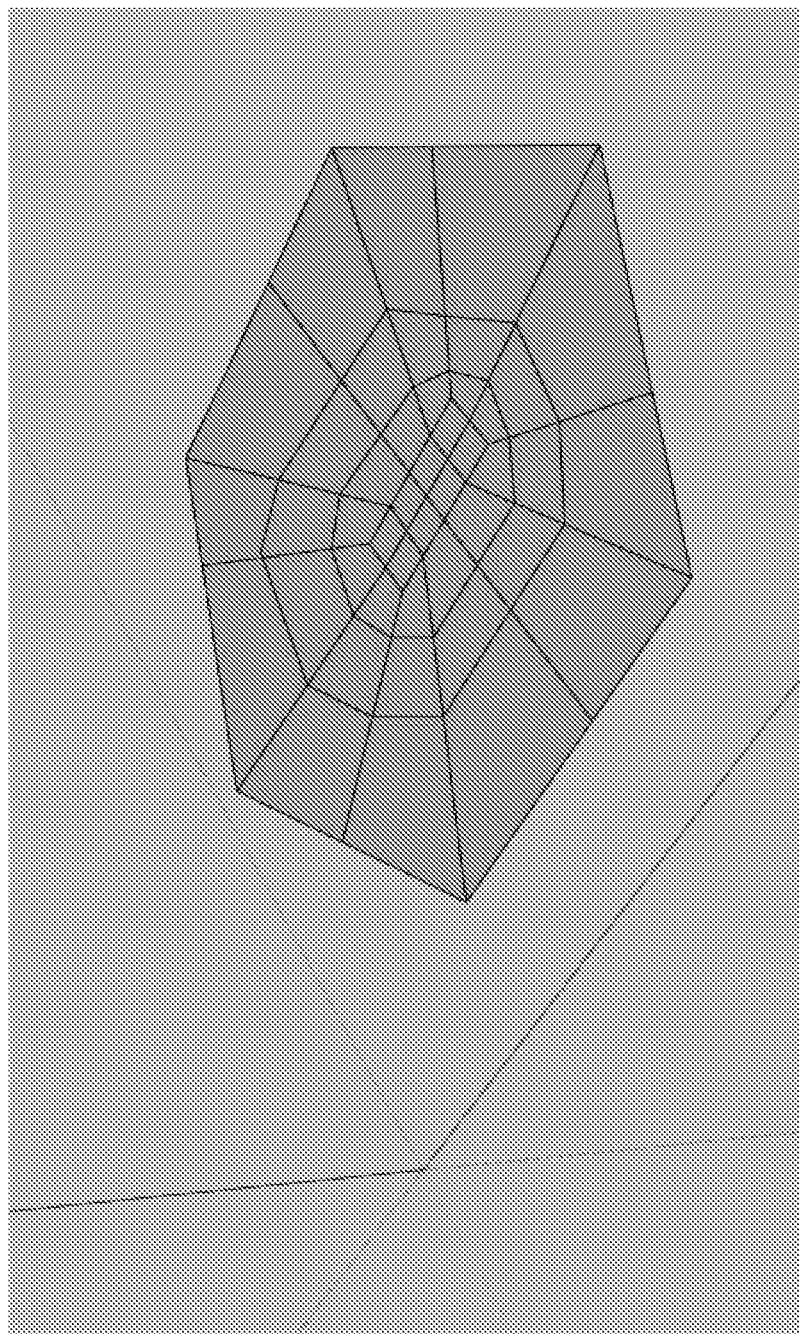
FIG. 21 illustrates a discretized n-sided polygon for meshing generalized polygonal grains.
Figure 22:
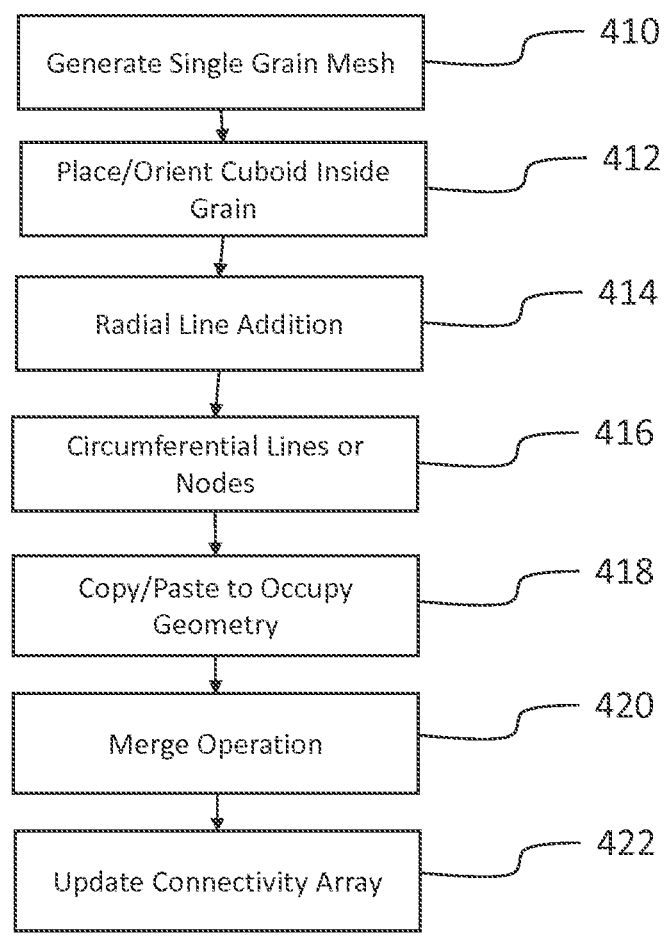
FIG. 22 is a block diagram illustrating preferred steps for generating the n-sided polygon mesh of FIG. 21.

Another example is a mesh for periodic n-sided polygonal grains, as shown in FIG. 20. Many materials have complicated grain geometries. As in FIG. 21, a more complicated grain geometry without any pattern can also be meshed by constructing a simple cuboid at the centroid with radiating lines. This algorithm can mesh any n-sided polygonal grain. This generalized mesh can be generated according to the steps in FIG. 22. A mesh is generated for a single grain 410. A cuboid is placed 412 inside the grain and oriented to a direction suitable for meshing. Radial lines are added 414 toward the boundaries of the grain. Circumferential lines or nodes 416 are added. Copy and paste 418 the same mesh or different grains having different meshes with successive node numbers to occupy the given geometry. A node merging operation is conducted 420 to combine the mesh with connectivity. The connectivity array 422 is updated considering nodes merged in the previous step. This can be simply achieved using a forward map generated in the previous step while merging nodes.

Periodic Higher Order Boundary Conditions 360

The boundary conditions used in the adaptive meshing 354 and full bed meshing 358 can simplify and speed calculations, as described generally above. With respect to this example, the periodic and higher order boundary constraint should provide equations to address mismatching meshes on opposite sides of the geometry. A traditional approach would fail to address this situation of applying periodic boundary conditions when opposite faces do not have matching mesh geometry and nodes. A present preferred approach works as the first interpolation of one face to the other face and formulating an equation between DOFs of opposite faces with the following form.

$$\vec{Y} =_A \vec{X} =_{B\nabla} \vec{X} +C \quad \text{Equation (60)}$$

A linear first order version of $Y=A\vec{X}+B\nabla\vec{X}+C$
Equation (60) can be written as $$\vec{Y} =_A \vec{X} \quad \text{Equation (61)}$$

The inverse isoparametric interpolation is performed to formulate $Y=A\vec{X}$ Equation (61) in case of mismatching nodes. The following steps formulate the equations:
Name faces as p and q
For i=1 to number of nodes on face p
  Pick $i^{th}$ node on face p
  Find in which element $i^{th}$ node is on face q, if a particular dimension is collapsed.
  Calculate isoparametric element coordinates ($N_i$) for the $i^{th}$ node inside the target element found on face q
  $q_t=N_1q_1+N_2q_2+N_3q_3+N_4q_4$ (This is one possible constraint equation)
End
These $qt=Npqp+Nmqm+Nrqr+Nsqs$ Equation (64).

$$q_t = N_p q_p + N_m q_m + N_r q_r + N_s q_s \quad \text{Equation (64)}$$

Figures 23A, 23B, 23C:
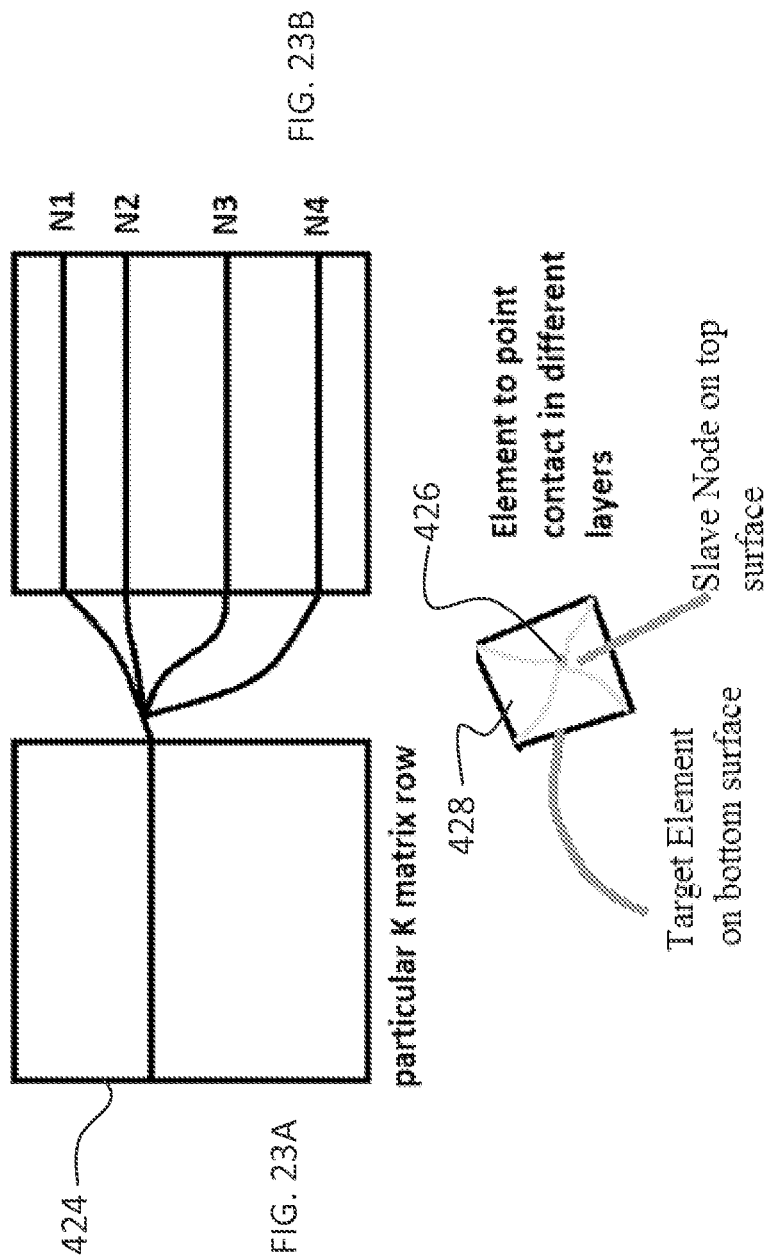
FIGS. 23A-23C illustrate a slave node constraint on a contact surface and a solution methodology achieved by splitting the slave node stiffness as per the constraint equation.

Constraint equations are solved by splitting the slave node stiffness matrix row into different rows. Each split row can be added to the master Degree of Freedom 120 (DOF) row based on its shape function contribution $N_i$ in the constraint equation for the master DOF. FIGS. 23A-23C illustrate the operation. A row from stiffness array 424 in FIG. 23A is split into multiple rows N1-N4 in FIG. 23B. FIG. 23C illustrates that a slave node 426 makes point to point contact with a target element on another layer, such as a bottom surface 428. A preferred sequence of steps to arrive at a solution procedure for these linear constraint equations follows.
For i=1: # of constraints
  Pick a constraint equation: $q_t = N_p q_p + N_m q_m + N_r q_r + N_s q_s$ $i^{th}$ row of stiffness matrix =

$(N_p)p^{th}$ row of stiffness matrix + $(N_m)m^{th}$ row of stiffness matrix +

$(N_r)r^{th}$ row of stiffness matrix$(N_s)s^{th}$ row of stiffness matrix

End

A spatio-temporally periodic function can be defined as a function which repeats itself over time with rigid translation in space. It can be expressed in the following form.

$$f(x,t)=f(x+vT,t+T) \quad \text{Equation (64)}$$

where v represents the scan rate and T represents the time-period of the problem. Spatio-temporal periodicity in terms of boundary conditions can be observed in various problems including metal laser sintering, wave propagations, welding, various manufacturing processes such as sheet metal rolling, and dynamic tire road surface contact. It is applicable to the feed forward dynamic meshing.

The incorporation of these boundary conditions enables correlations between the coarse scale thermo-mechanical descriptions with their finer scale counterparts. The involved strategy is used to inform and update the thermomechanical properties at coarser length scales using detailed simulations at finer length scales based on appropriately informing the fine scale initial and boundary conditions using coarse scale Eigenmodes.

Eigensolver 362 and Uniform Macroscopic Mesh 358

Figure 24:
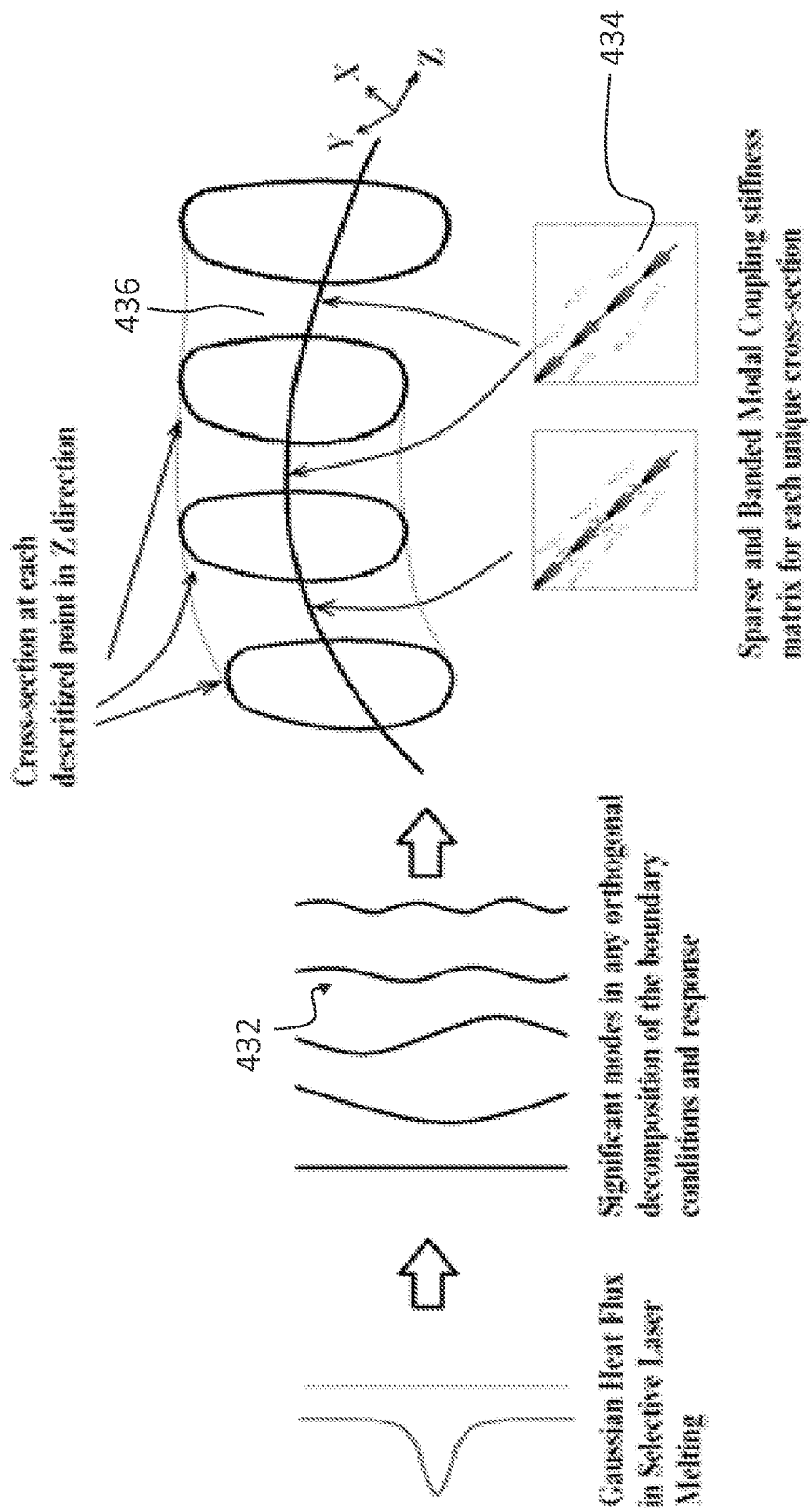
FIG. 24 illustrates steps performed by the Eigensolver for the uniform mesh generation and updating of FIG. 18.

This mesh is the coarse mesh that has been described above. The Eigensolver can provide for efficient simulation of material variations at a macroscopic level and the uniformity at the coarse level greatly simplifies solution of such a three dimensional uniformly distributed mesh, which can be reconstructed using the Eigensolver 362. The Eigensolver was discussed above, and provides a high fidelity dimensional reduction technique. The technique is summarized in FIG. 24. A thermal event is propagated as a collection of orthogonal forward waves 432 (synonymously waves with 90 phase difference w.r.t. each other) from the source towards the fixed boundary (temperature/displacement) which distributes the flux/traction force to maintain equilibrium in the entire 3 Dimensional domain, interacts with the boundary and reflects back from it as a collection of orthogonal backward waves which integrates the dependent variable such as temperature/displacement throughout the domain such that compatibility/curvature of the field is maintained throughout the domain. The sparse banded modal coupling stiffness matrices 434 are computed for each unique cross-section 436. Each wave is a significant mode composed of the coarse scale variations derived based on modal decomposition of a particular configuration of interest. If these modes are not orthogonal for a given configuration, then the simulation can be performed by calculating the coupling among different modes as the wave is moving ahead from one cross-section to the next. Further decoupling can be achieved by Eigen decomposition of coupling matrices and operating previous Eigenmodes on the Eigenmodes of the coupling matrix can provide decoupled Eigenmodes for a general structure.

Update—Mesh Movement—Pre-Processing 352 Update

Figure 25:
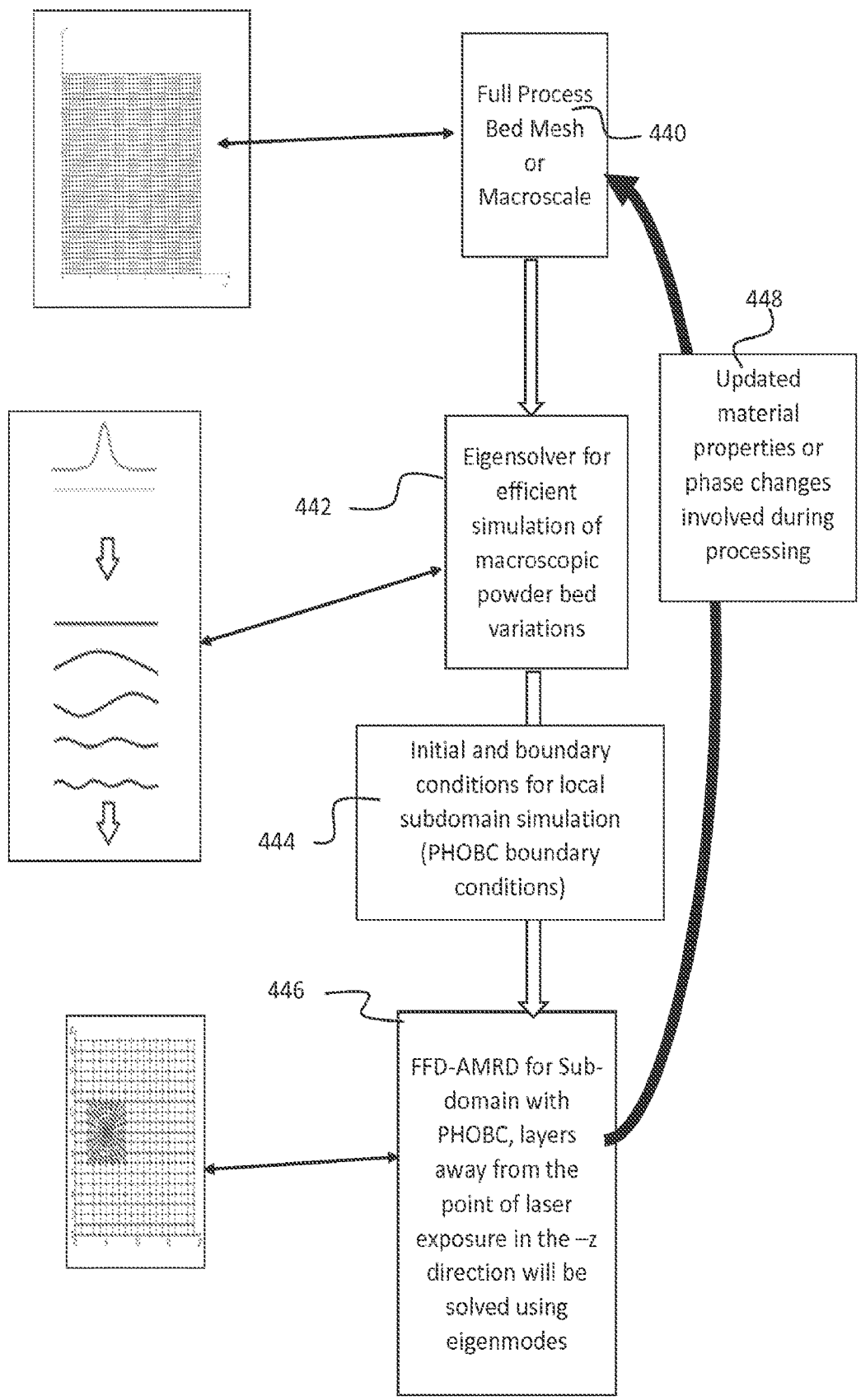
FIG. 25 illustrates an update operation for the feed forward dynamic meshing in FIG. 16.

The movement of the thermal source results in the movement of the fine mesh as discussed above. In terms of the overall multi-level process in FIG. 16, this provides the operations shown in FIG. 25. The uniform mesh is generated 444. The Eigensolver updates 442 the macroscopic effects. Boundary conditions are simulated for the feed forward dynamic meshing 446 and Eigenmodes are used to solve the z direction. Updated homogenized material properties 448 such as the homogenized thermal conductivity, specific heat and density are returned to the full mesh.

Figure 26:
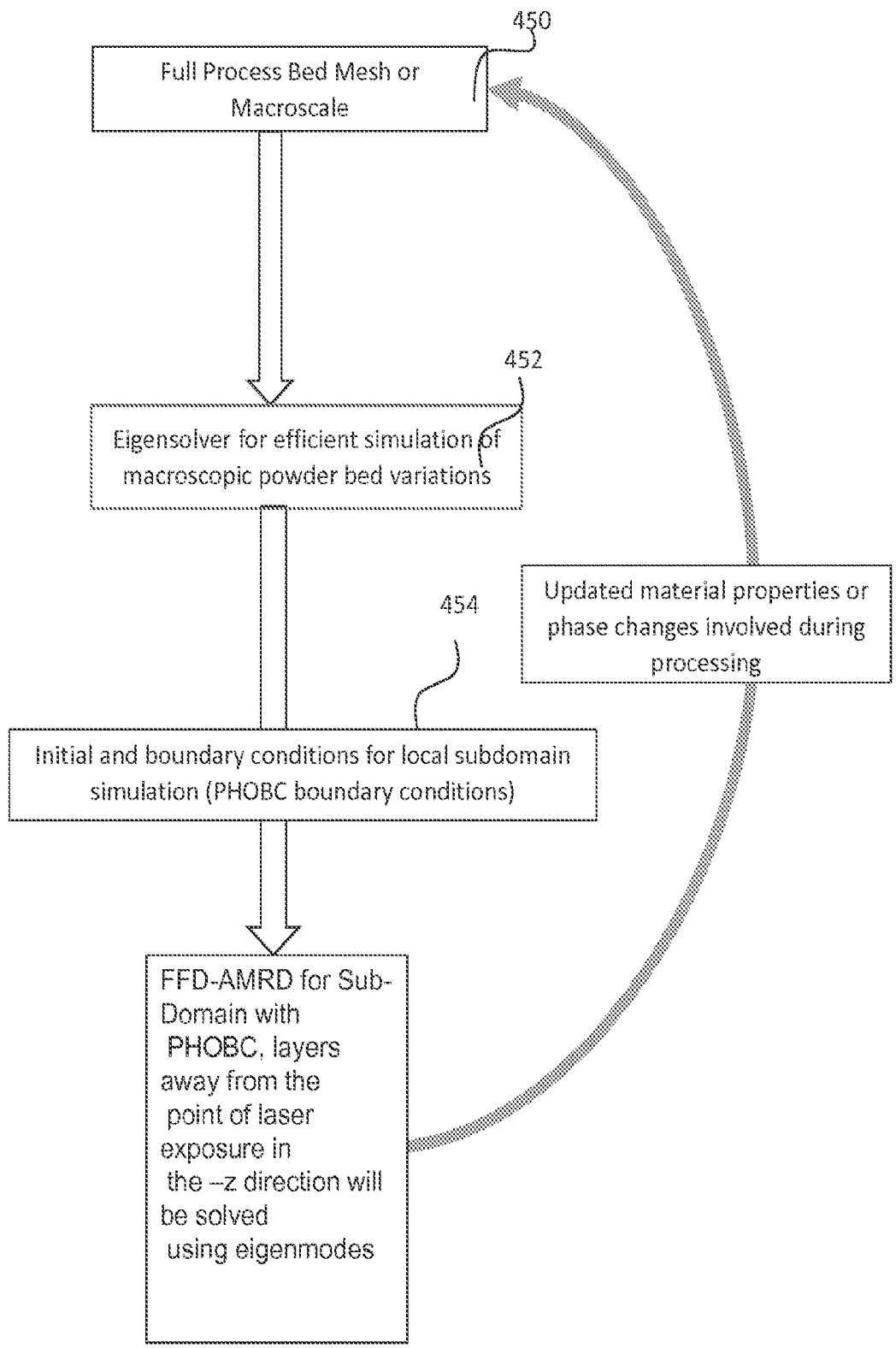
FIG. 26 illustrates a preferred method for bridging data between a coarse mesh and fine mesh during updating.

Bridge Between Coarse and Fine Mesh FIG. 26

The higher order boundary conditions at finer length scale arise from the fact that the force/flux contribution of higher order modes in the local domain does not asymptotically decrease to a stable and low enough value very near to the heat source. In addition, the multi-scale decoupling of thermomechanical variables is harder to establish by simply assuming periodic boundary conditions based on high Eigenmodal contributions for cross-sections which are present near and/or intermediate distance(s) away from the heat source. The methods of the invention provide coarse-fine scale transition of information such as computation of effective thermomechanical properties at coarser length scales and prescription of accurate boundary conditions at finer length scales using a recursive coarse Eigenmode-fine periodic and higher order boundary conditions approach.

The bridging during updating is illustrated in FIG. 26. The full mesh at macroscale is provided 450. The macroscale is simulated 450 with Eigenmodes.

Post Process and Storage 364 and Result Output 366

With reference again to FIG. 16, data can be archived and processed with each update 364. Output 366 can be used to control the process in a feedback loop in real time. Movement and behavior of the thermal or thermal-mechanical tool conducting work can be adjusted, materials can be added, environment changed, etc. In a preferred embodiment, the process provides the following steps during execution in real time for control of the manufacture of a part:
1. Process parameters as a function of time provided by input files to the machine.
2. Mesh generation for the uniform macroscopic simulation
3. Mesh Generation for all adaptive configurations required as a function of time.
4. Calculate Eigenmodes for the uniform macroscale model mesh.
5. Time Stepping
   For t=1 to timesteps
      Solve the Eigensolver based full process bed simulation model for the time step
      Generate boundary condition for FFDAMRD using PHOBCs
      Solve the FFD-AMRD with PHOBC boundary conditions for the time step
      Data archival for both scale models
      End
6. Postprocessing Efficient ID and Utilization of the PHOBC for Multi-Scale Data The use of the decoupled meshes with the higher order boundary conditions can provide an efficient way to share data between the coarse and fine meshes during updating and the feed forward adaptive dynamic meshing. Preferred methods for efficient identification and utilization of periodic and higher order boundary conditions are presented here.

The numerical Eigensolver formulation provides that the Eigenmodes of the thermo-mechanical problem range from axial to higher order bending modes. The force contribution of these higher modes do not asymptotically go to a low and stabilized value with increasing number of consolidated layers in the z direction, which can be solved using periodic boundary conditions and their higher order analogues.

In order to approximate a dependent field (such as a dependent y variable as a function of an independent x variable) around its corresponding non-zero independent values, a Taylor's approximation formula can be used. With increasing orders of non-linearity, the terms required to express the field will increase. As an example, for a linear field the addition of a mean (zero$^{th}$ order) and distance times the slope of the field ($\vec{\nabla}y$) (first order variations) provides appropriate parameters for approximating the field whereas a uniform field can be expressed using the zero$^{th}$ order term only. Similarly, in order to approximate a field with quadratic variations, it is required to include the curvature ($\vec{\nabla}^2 y$) along with the above-mentioned lower order variations of the field.

Depending on whether the field is a scalar, vector or a 2$^{nd}$ or higher order tensor, the equations to describe the above-mentioned phenomenon must change from a mathematical standpoint, even though the physics required to address the complexity of the field remains the same. In order to approximate the thermo-mechanical field, a Taylor's approximation methodology has been chosen as mentioned above and mathematically T0+r·∇T+12!r·∇2T+ . . . Equation (. The field has been approximated as a function of space with $\vec{\nabla}T$ denoting the first order gradient which directly correlates to thermal gradient for thermal fields and small strain for deformation fields. The higher order terms have also been introduced, such as $\sim\vec{\nabla}^2$, which represents the spatial thermal curvature/strain gradient terms.

$$T = T_0 + \vec{r}\cdot\vec{\nabla}T + \frac{1}{2!}[\vec{r}\cdot\vec{\nabla}]^2 T + \ldots \qquad \text{Equation (65)}$$

The $T_0$ term will serve as the zero$^{th}$ order approximation of the field and can be computed using numerical/analytical Eigenvalue formulations and reconstructing the macroscopic thermal field. If the variations in the Eigenvalues contributing to the solution are not spatially significant or flat, such as the first Eigenmode, then the only boundary condition translating from the coarser length scale to the finer length scale for solving the thermal field variables using the FFD-AMRD approach will be a periodic boundary condition.

For cases involving higher Eigenvalues such as Eigenmodes 2-4 and other higher Eigenmodes for which there are ample force contributions, the higher order boundary contributions with linear, quadratic and other higher order offsets will be activated. The objective of these local boundary condition determinations is to solve the fine spatial scales subject to those boundary conditions with increasing domain sizes such that an average converged thermal conductivity could be obtained and updated in the course of a dynamic solution by reconstructing the Eigenmodes in the coarser domain.

The strategy for computation of global-local field variables using Eigenmodes at a coarser full-powder bed scale and finer regions ~2-10 mm (prescribed by the machine while using the checkerboard pattern or good for any general scan-pattern) can be described as follows (the algorithm stepping is for the thermal case but could be easily extended to the deformation case):

Periodic and Higher Order Boundary Conditions
   I. Compute the FFD-AMRD response using periodic and higher order boundary conditions
   II. Compute the average effective thermal conductivity (periodic and higher order depending upon the boundary conditions) of the finer box as a function of input process parameters, powder bed density (pbd), macroscopic temperature along with thermal gradients and material parameters (material parameter such as fine scale thermal conductivity and specific heat could be dependent on pbd).

Coarse Eigenvalue Problem

The strategy for computation of coarse thermal Eigenmodes can be described as follows:
   I. Compute Stiffness matrix for at least 3 layers.
   II. Identify B (dispersion) and A (self-containment) as $K_n$=[[B A/2 0]; [B A B]$_{n-2}$; [0 A B]]
   III. Compute the B and A matrices involved in [B A B] format of one section of the stiffness matrix.
   IV. Compute P=B$^{-1}$A.
   V. Compute P$_{symm}$=symm (P).
   VI. Compute [V, D]=eig(symm (P)).

After mode computation, the contribution of the computed Eigenmodes on applied force/flux vectors has been computed as follows:

VII. Compute the force (flux) field free of dispersion using $\{f_{new}\}=0.5*\{B^{-1} \{f_{old}\}+\text{trans}(\text{trans}(\{f_{old}\})*B^{-1}\}$.

VIII. Compute the contribution of each mode on the new force/flux using $\{Contri\}=\text{trans}(V)*\{f_{new}\}$.

Once the Eigenmodes and contributions are computed, the nodal degrees of freedom (in this case temperatures) can be reconstructed as follows:

IX. Compute size_V=size(V)
X. For i=1:size_V(2)
   g. Compute $\lambda(1)=-D(i,i)$
   h. Compute Const=2*$\lambda$
   i. Compute Contri_factor(1)=Contri(i)
   j. For j=2: # of cross-sectional layers
     i. Compute Contri_factor(j)=−Contri_factor(j−1)/$\lambda$(j−1)
     ii. Compute $\lambda$(j)=Const−1/$\lambda$(j−1)
     iii. End
   k. For j=# of cross-sectional layers−1:−1:1
     i. Compute Contri_factor(j)=Contri_factor(j)−Contri_factor(j+1)/$\lambda$(j+1)
     ii. End
XI. Compute {Contri_factor}={Contri_factor}./$\lambda$
   l. End
XII. Store Modal_part(i,:)={Contri_factor}
XIII. Compute Temperature, {T}=V*Modal_part.

Recursive Implementation for Each Layer
I. Precompute periodic and higher boundary conditions.
II. For time=1: laser scan Current Layer
   a. Compute effective thermal conductivity (periodic and higher order) from A with reconstructed temperature from previous time step from Coarse scale Eigenvalue problem.
   b. Obtain equivalent thermal conductivity by suitable agglomeration of these terms (periodic and higher order).
   c. Obtain equivalent force/flux using flux and double flux tensors etc. Agglomerate them to formulate effective flux.
   d. Compute new Eigenvalues (identify the parameter which gets changed in the Eigenvalue evolution and fit the evolution for those extra parameters) using Coarse scale Eigenvalue problem.
   End
III. Use coarse scale Eigenvalues to reconstruct cooling.

Equations are next provided for the macroscopic problem. The higher the order of the boundary condition for the microscopic problem, the higher the order of continuity of the elements in the coarser domain. For example if a $C^0$ continuity (8 nodes brick-trilinear shape functions) has been assumed at the microscopic scale with periodic and second order periodic boundary conditions then the macroscopic element will be comprised of $C^1$ continuity (20 nodes brick-triquadratic shape functions). The following derivation has been provided for only the periodic and second order periodic boundary conditions to demonstrate the concept. Similarly, even higher order boundary conditions (if required) could be applied in order to obtain accurate thermal evolutions both at macro and micro spatiotemporal scales.

The macroscopic weak form for the thermal field problem can be written as:

$$[K_{Thermal}]\{\Delta T\}=\{\Delta R_Q\} \quad \text{Equation (66)}$$

where $K_{Thermal}$ of size n×n (n=total number of degrees of freedom (dofs) in the domain and there is 1 dof per node). dV denotes the volume of the element.

$$\{\nabla T\}^T=\{\nabla_x T \nabla_y T \nabla_z T\}=\{[B_\nabla]_{3\times 8}T_{8\times 1}\}^T$$

and $$\{\nabla^2 T\}^T=\{\nabla_x\nabla_x T \nabla_y\nabla_y T \nabla_z\nabla_z T 2\nabla_x\nabla_y T 2\nabla_y\nabla_z T 2\nabla_z\nabla_x T\}=\{[B_{\nabla\nabla}]_{6\times 8}T_{8\times 1}\}^T \quad \text{Equation (67)}$$

where $[B_\nabla]_{3\times 8}$ and $[B_{\nabla\nabla}]_{6\times 8}$ are the matrices containing corresponding first and second derivatives of the interpolation functions $N_{8\times 8}$, and $T_{8\times 1}$ represents the vector of nodal degrees of freedom. The incremental internal flux ($\vec{q}_{internal}$) and double flux vectors ($\vec{\vec{q}}_{internal}$) can be written as:

$$\Delta\vec{q}_{internal}=-(k\vec{q}_{\nabla T}\Delta\{\nabla T\}+k\vec{q}_{\nabla^2 T}\Delta\{\nabla^2 T\}) \quad \text{Equation (68)}$$

$$\Delta\vec{\vec{q}}_{internal}=-(k\vec{\vec{q}}_{\nabla T}\Delta\{\nabla T\}+k\vec{\vec{q}}_{\nabla^2 T}\Delta\{\nabla^2 T\}) \quad \text{Equation (69)}$$

where $k_{\vec{x}\,y}$ represents effects of gradient y on the flux vector (or double flux vector tensor) in terms of continuum thermal conductivity $\vec{x}y$.

The agglomerated thermal stiffness and flux vector formulations are next provided.

KThermal has been expressed in KThermal=Kq∇T+Kq∇2T+Kq∇T+Kq∇2T+ShNTNdS Equation (with expanded stiffness terms illustrated in Kq ∇T=$\int_V$[$B_{\nabla\nabla}$]$_{6\times 8}^T k\vec{q}_{\nabla T}$[$B_\nabla$]$_{3\times 8}dV$, K$\vec{q}_{\nabla^2 T}$=$\int_V$[$B_{\nabla\nabla}$]$_{6\times 8}^T k\vec{q}_{\nabla^2 T}$[$B_{\nabla\nabla}$]$_{6\times 8}dV$ Equation (.

$$K_{Thermal}=K_{\vec{q}\nabla T}+K_{\vec{q}\nabla^2 T}+K_{\vec{\vec{q}}\nabla T}+K_{\vec{\vec{q}}\nabla^2 T}+\int_S hN^T N\, dS \quad \text{Equation (70)}$$

$$K_{\vec{q}\nabla T}=\int_V [B_\nabla]_{3\times 8}^T k_{\vec{q}\nabla T}[B_\nabla]_{3\times 8}dV, \quad \text{Equation (71)}$$

$$K_{\vec{q}\nabla^2 T}=\int_V [B_\nabla]_{3\times 8}^T k_{\vec{q}\nabla^2 T}[B_{\nabla\nabla}]_{6\times 8}dV$$

$$K_{\vec{\vec{q}}\nabla T}=\int_V [B_{\nabla\nabla}]_{6\times 8}^T k_{\vec{\vec{q}}\nabla T}[B_\nabla]_{3\times 8}dV,$$

$$K_{\vec{\vec{q}}\nabla^2 T}=\int_V [B_{\nabla\nabla}]_{6\times 8}^T k_{\vec{\vec{q}}\nabla^2 T}[B_{\nabla\nabla}]_{6\times 8}dV$$

ShNTNdS in KThermal=Kq∇T+Kq∇2T+kq∇T+Kq∇2T+ShNTNdS Equation (is valid when the bulk is exposed to a convection boundary condition. The surface integral is employed at the exposed surface with 2 dimensional shape functions and then transformed to three dimensional space. h in the above mentioned case is the convective heat transfer coefficient of the purging gas such as Argon in mLS for reactive materials.

The thermal flux vector $\{R_Q\}$ of size 8×1 has been evaluated in this section by calculating the external flux first followed by the internal flux which needs to be subtracted from the external flux for computing the $\{\Delta R_Q\}$ in $$K_{Thermal}\{\Delta T\}=\{\Delta R_Q\} \quad \text{Equation (.}$$

First, the formulation for determining the external flux, $\{R_Q\}_e$ is computed in Equation (72).

$$\{R_Q\}_e=\int_S N^T(\vec{q}(\vec{r},t)\cdot\hat{n})dS+ \quad \text{Equation (72)}$$

$$\int_S \nabla N^T(\hat{n}\cdot\vec{\vec{q}}(\vec{r},t)\hat{n})dS+\int_S hT_e N^T dS$$

where $\vec{q}$ is the input heat flux vector and $\overleftrightarrow{q}$ denotes the input flux heat double tensor. dS denotes the surface area of the element. The second surface integral in Equation (72) is valid only when the convection boundary conditions operate and hence should be employed on those boundaries only. In this scenario, $T_e$ denotes the temperature of the ambient environment.

Next, the internal flux vectors are computed as shown in $\{RQ\}\text{int}=\int_V([B_\nabla]_{3\times 8}{}^T\vec{q}_{internal}+[B_{\nabla\nabla}]_{6\times 8}{}^T\overleftrightarrow{q}_{internal})dV$ Equation (. The $\{\Delta R_Q\}$ mentioned in KThermal $\{\Delta T\}=\{\Delta R_Q\}$ Equation (has been computed by subtracting $\{RQ\}\text{int}=\int_V([B_\nabla]_{3\times 8}{}^T\vec{q}_{internal}+[B_{\nabla\nabla}]_{6\times 8}{}^T\overleftrightarrow{q}_{internal})dV$ Equation (from Equation (72).

$$\{R_Q\}_{int}=\int_V([B_\nabla]_{3\times 8}{}^T\vec{q}_{internal}+[B_{\nabla\nabla}]_{6\times 8}{}^T\overleftrightarrow{q}_{internal})dV$$

After obtaining essential parameters in KThermal $\{\Delta T\}=\{\Delta R_Q\}$ Equation (, the change in temperature as a function of spatiotemporal variations can be computed using Eigenmodal reconstruction algorithms.

After obtaining essential parameters in KThermal $\{\Delta T\}=\{\Delta R_Q\}$ Equation (, the change in temperature as a function of spatiotemporal variations can be computed using Eigenmodal reconstruction algorithms.

Local-global transitions and boundary conditions are provided next. The $T0+r\cdot\nabla T+12!r\cdot\nabla 2T+\ldots$ Equation (form the basis for applying boundary conditions for the cells to be solved using FFD-AMRD in conjunction with banded vectorization and the −z direction Eigensolver approach.

The finer scale boundary conditions can be extracted in terms of gradient $T0+r\cdot\nabla T+12!r\cdot\nabla 2T+\ldots$ Equation (as shown in Tfine−scale(r)=r·∇T+12!r·∇2T+ϑ(∇3)T Equation (74.

$$T_{fine-scale}(\vec{r})=\vec{r}\cdot\vec{\nabla}T+\frac{1}{2!}\left[\vec{r}\cdot\vec{\nabla}\right]^2 T+\vartheta(\vec{\nabla}^3)T \quad \text{Equation (74)}$$

For variations up to second order periodic boundary conditions, the fine scale volume integral of $\vartheta(\vec{\nabla}^3)$ goes to 0 ($\int_V \vartheta(\vec{\nabla}^3)T\,dV=0$). This indicates that $\vartheta(\vec{\nabla}^3)$ is just a fluctuation and will not necessarily be affecting the coarse-scale solutions. For these simulations, the macroscopic thermal gradients such as $\vec{\nabla}T_{coarse-scale}$ and $(\vec{\nabla}\cdot\vec{\nabla})T_{coarse-scale}$ will be assumed to be constant for the entire domain. Macroscopic $T_0$ will serve as the initial temperature condition for this domain. Therefore the boundary T fine-scale(rboundary with no direct flux)=r(∇T)+12!r·∇2T Equation (75 fine-scalerboundary with direct flux=2PπRL2exp−2R(r)−R02RL2

$$T_{fine-scale}(\vec{r}_{boundary\ with\ no\ direct\ flux})=\vec{r}(\vec{\nabla}T)+\frac{1}{2!}\left[\vec{r}\cdot\vec{\nabla}\right]^2 T \quad \text{Equation (75)}$$

$$\overleftrightarrow{q}_{fine-scale}(\vec{r}_{boundary\ with\ direct\ flux})=\frac{2P}{\pi R_L^2}\exp\left(-\frac{2(R(\vec{r})-R_0)^2}{R_L^2}\right)$$

$$\overleftrightarrow{q}_{fine-scale}(\vec{r}_{boundary\ with\ direct\ flux})=0 \quad \text{Equation (76)}$$

T fine-scale(rboundry with no direct flux) = $r(\nabla T)+12!r\cdot\nabla 2T$ Equation (75)

fine-scalerboundary with direct flux = $2P\pi RL2\exp-2R(r)-R02RL2$ $$\overleftrightarrow{q}_{fine-scale}(\vec{r}_{boundary\ with\ direct\ flux})=0 \quad \text{Equation (76)}$$

are comprised of $\vec{r}$ in the fine-scale domain and $\vec{R}$ in the coarse-scale domain. $R_L$ denotes the laser radius and P is the laser power. The direct flux boundary condition for the fine scale domain needs to be extracted from the corresponding point R in the coarse-scale domain.

After implementing the variations up to second order periodic Δqinternal=−(kq∇TΔ{∇T}+kq∇2TΔ{∇2T}) Equation (qinternal=−(k$\vec{q}_{\nabla T}$Δ{∇T}+k$\vec{q}_{\nabla^2 T}$Δ{∇2T}) Equation (are as follows:

$$k_{\vec{q}\nabla T}=\frac{1}{V}QK_{fine}Q^T \quad k_{\vec{q}\nabla^2 T}=\frac{1}{V}QK_{fine}R^T \quad \text{Equation (77)}$$

$$\frac{1}{V}RK_{fine}Q^T \quad k_{\vec{q}\nabla^2 T}=\frac{1}{V}RK_{fine}R^T$$

where Q and R denote the coordinate vector and inner product matrix of the coordinate vectors.

The periodic boundary condition has been implemented using a unique permutation matrix. This method in conjunction with a unique nodal interpolation methodology can be used for any general periodicity condition with dissimilar number of nodes and locations in their respective planes. The explanation of this method has been only provided for the case where first and subsequent spatial gradients of the thermal field are zero (initial moments of powder consolidation every layer may see this type of boundary condition which is followed by the activation of first and other higher order spatial gradients of the thermal field).

The algorithm for this method is as follows:

Step 1: Initialization of periodic permutations to an Identity matrix of size $I_{(n-m)\times(n-m)}$ where n equals the total number of degrees of freedom and m equals the total number of degrees of freedom on which direct thermal boundary conditions have been applied (the diagonal matrix will consist of numbers corresponding to first and higher order coarse-scale gradients if they are present, otherwise it will be unity).

Periodicperm=sparse $I_{(n-m)\times(n-m)}$;

Step

Pair

The first two entries suggest these are opposite surface node pairs without edges (nodes of opposite planes without any nodes on the intersecting edges) with their normal in the x and y directions. These same surface node pairs will be constrained to have equal temperatures in the course of simulation. The next three entries show three node edge pairs each with two sets of edges present at the intersection of red and green surfaces. In the case of the presence of first or second order coarse scale gradients those can be mentioned and boundary conditions could be implemented using the terms shown in Tfine−scale(rboundary with no direct flux)=r(∇T)+12!r.E2T Equation (75 if other higher order terms are not present, otherwise the equation can be extended to accommodate those terms.

Step 3: The periodic permutations are obtained by permuting the rows in the periodicperm matrix which are the degrees of freedom contained in the pair vector after reshuffling them in an ascending order using the first and second column of the pair vector respectively. Once the rows are permuted, the reshuffled rows (containing the periodic boundary conditions) need to be added.

reshuffle=sortrows(sortrows(pair,1),2);
for ii=1:length(reshuffle(:,1))
periodicperm(reshuffle(ii,1),:)=periodicperm(reshuffle(ii,1),:)+periodicperm(reshuffle(ii,2),:);
end
periodicperm(reshuffle(:,2),:)=[ ];

In this manner, the periodic boundary conditions are solved in an exact fashion without applying penalty methods which are numerical in nature and may result in a wrong output if the penalty is not carefully controlled.

The steps for solving the local FFD-AMRD algorithm subject to a periodic or higher order boundary can then be solved in three easy steps that are in addition to other necessary steps without having to change the entire construct of the algorithm.

Step 1: Compute $C_{fine}$ (specific heat matrix will be active at the fine-scale due to high cooling rates not at the coarse-scale as shown in KThermal $\boxed{?}$ $\{\Delta T\}=\{\Delta R_Q\}$ Equation( ),$K_{fine}$ and $\{\Delta R_Q\}_{fine}$ Step 2: Compute equivalent lhs matrix by combining $C_{fine}$ and $K_{fine}$ using the Crank-Nicholson scheme. Similarly, $\{\Delta R_Q\}_{fine}$ is updated.

Step 3: Pre and post-multiply the lhs matrix with periodicperm and pre-multiply the $\{\Delta R_Q\}_{fine,updated}$ with periodicperm and solve for the thermal or mechanical field (similar approach but only structural $K_{fine}$ and $Force_{fine}$ are required).

With this approach a thermal periodic boundary condition can be solved for a simple case without first and higher order gradients. The coarse-scale can be solved using a coarse finite element method. A macroscopic and microscopic thermal evolution in the x-y plane can be computed without working thermal Eigenmodes as success with reconstruction of Finite element results using Eigenmodes was been obtained only in the recent past).

Prediction of Thermo-Mechanical Variables Away from the Point of Laser Exposure.

Figure 27:
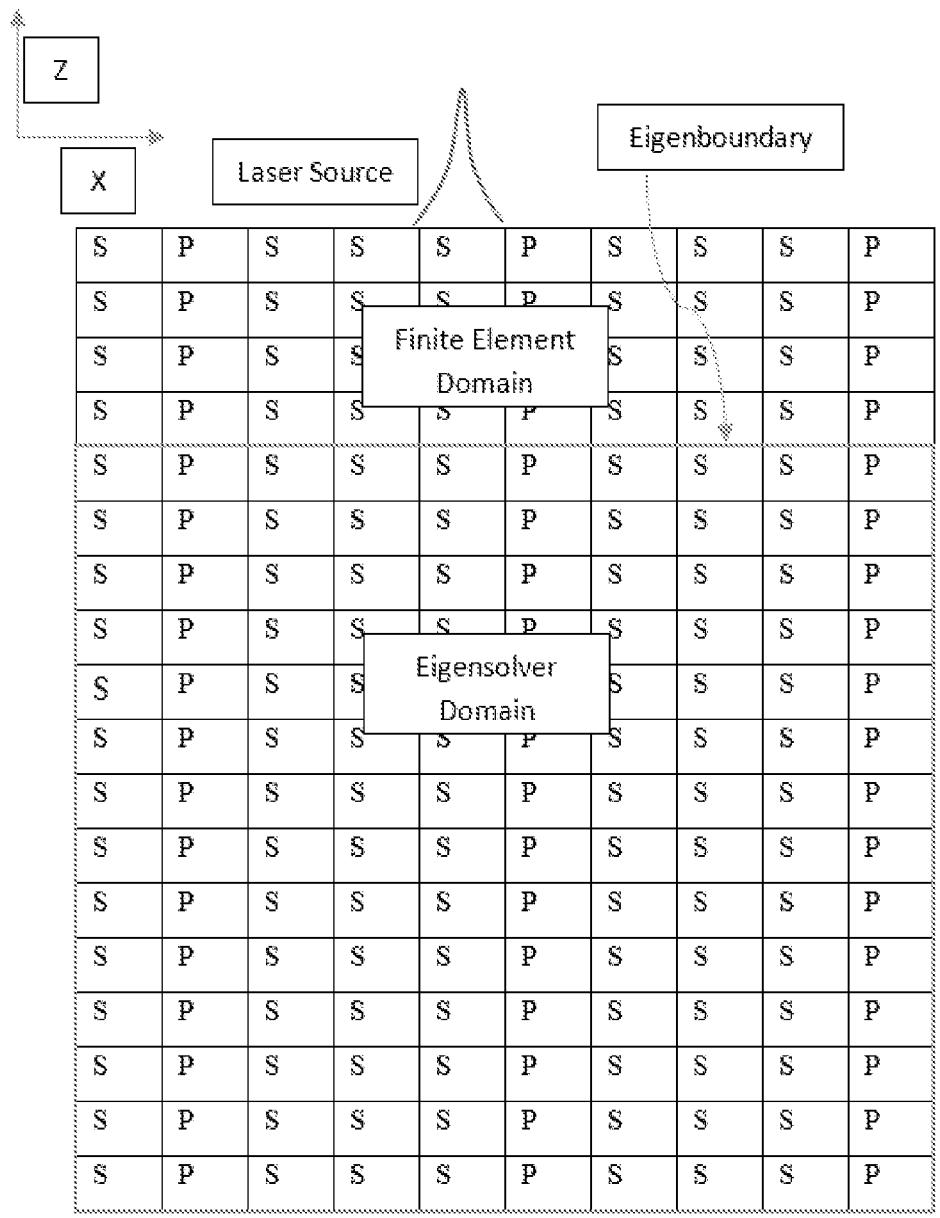
FIG. 27 illustrates a preferred method for prediction of thermo-mechanical values away from a stimulus.

The typical approach for determination of modes using sine or cosine functions has been extended to fit a finite element framework where an eigenvalue problem of the thermomechanical propagator matrices (these matrices compute the propagation of the thermomechanical field from one cross-sectional layer to another along the −z direction) is computed in order to determine the orthogonal basis functions (eigenvectors) for thermomechanical fields. We observed that very near to the point of laser exposure the number of modes required to reconstruct the solutions is very high (the number of modes is limited by the number of nodal points in each cross-section) and as the distance from the point of laser exposure increases, the number of modes required to accurately predict the solution drops very quickly. For performing these calculations, therefore the region very close to the point of laser exposure in the −z direction where non-linear thermal conductivity relations and melt pools are active is solved using the in-depth FFDAMRD finite element method whereas sufficient 4-9 layers down the top surface is solved using the thermal eigensolver approach FIG. 27. FIG. 27 shows XZ plane cross-section elements viewed from the −Y direction. The Solid-Powder pattern in the +X direction is repeated and extruded in the −Z direction providing the part with 2.5 dimension extrusion. S denotes the portion of the powder bed which has converted from powder to solid and P denotes the portion of the powder bed which didn't change its state and remained powder. For performing the calculations on the current time step, first the thermal evolutions in the first 4-9 layers are calculated by the FFDAMRD finite element method using the thermal distribution of the deeper layers as a boundary condition followed by the thermal distribution on the 4th to 9th layers from the top as flux boundary condition to solve for the deeper layers in the current time step.

Figure 28:
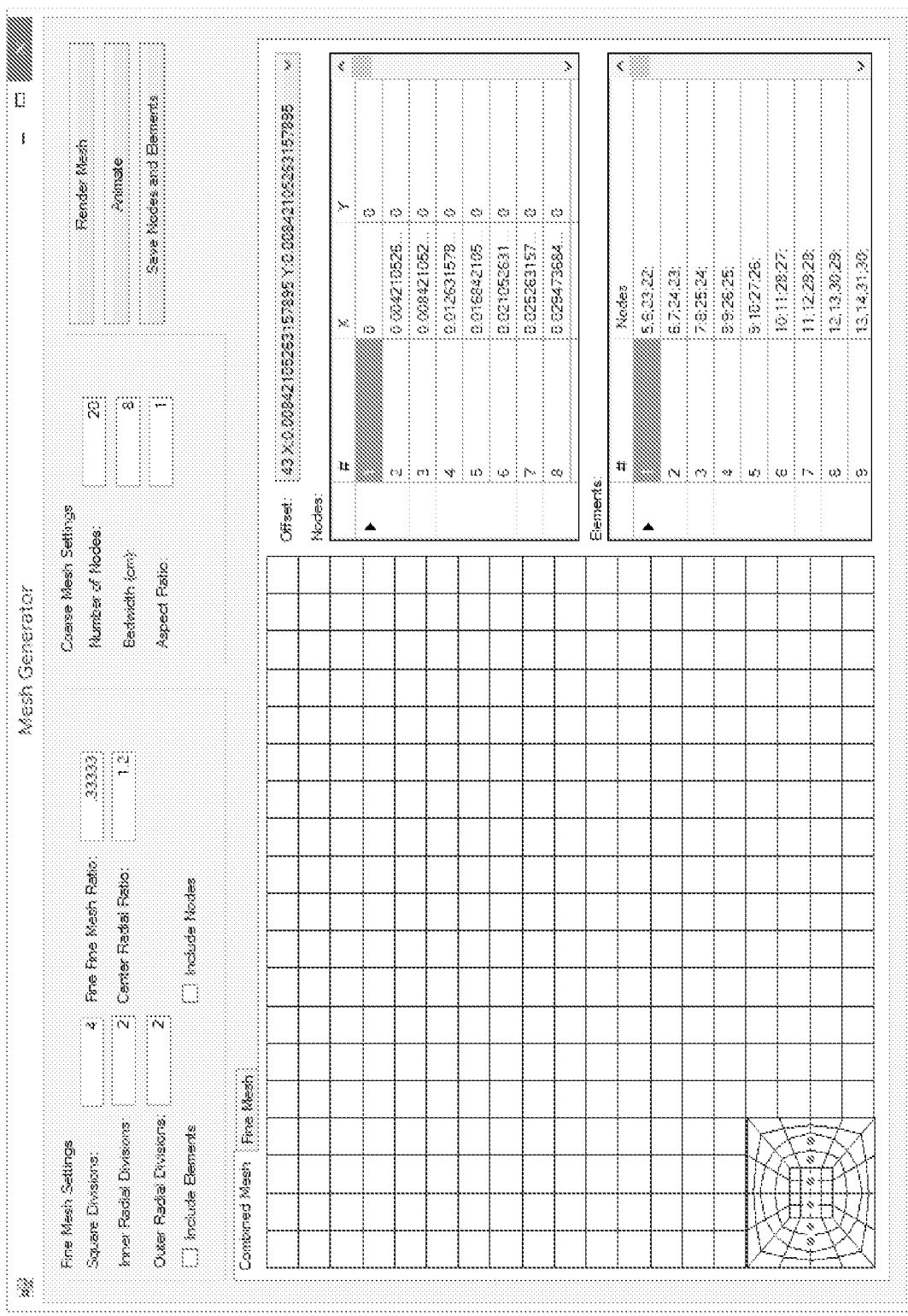
FIG. 28 illustrates a combined fine and coarse mesh at offset 1 with dots showing the time stepping.
Figure 29:
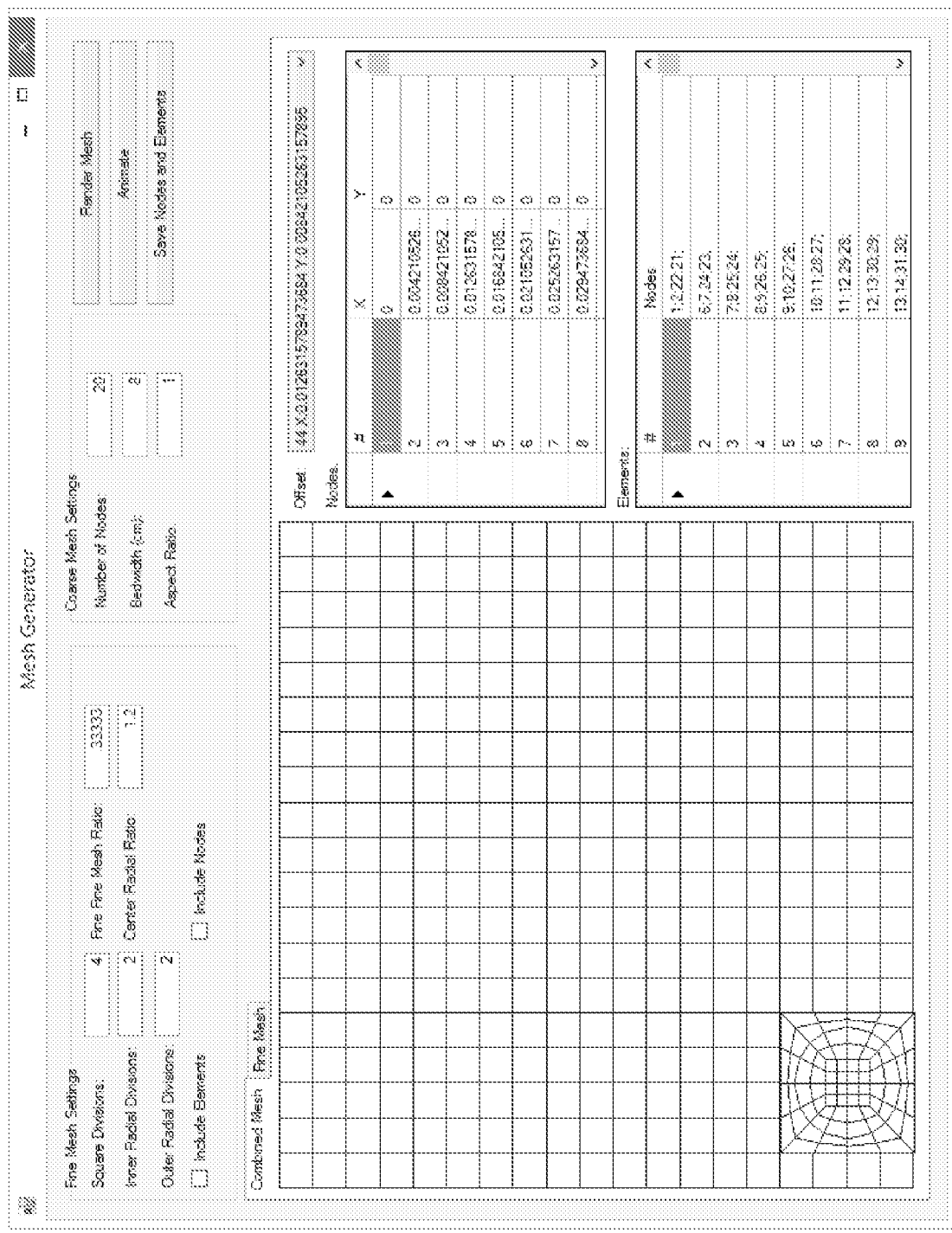
FIG. 29 illustrates a fine mesh move to offset 2.

A preferred methodology has been formulated such that the thermal solution using the FFDAMRD algorithm can be updated in a manner that the LU factorization need not be calculated over again and again in order to obtain thermal distribution for every time step (shown by dots) in FIG. 28 and every offset (FIGS. 28 and 29 showing fine mesh offset by one coarse mesh division). The preferred method used for this development is a multi-rank/order update for changing thermal stiffness as a function of time step/offset.

Thermal Eigensolver

Figure 30:
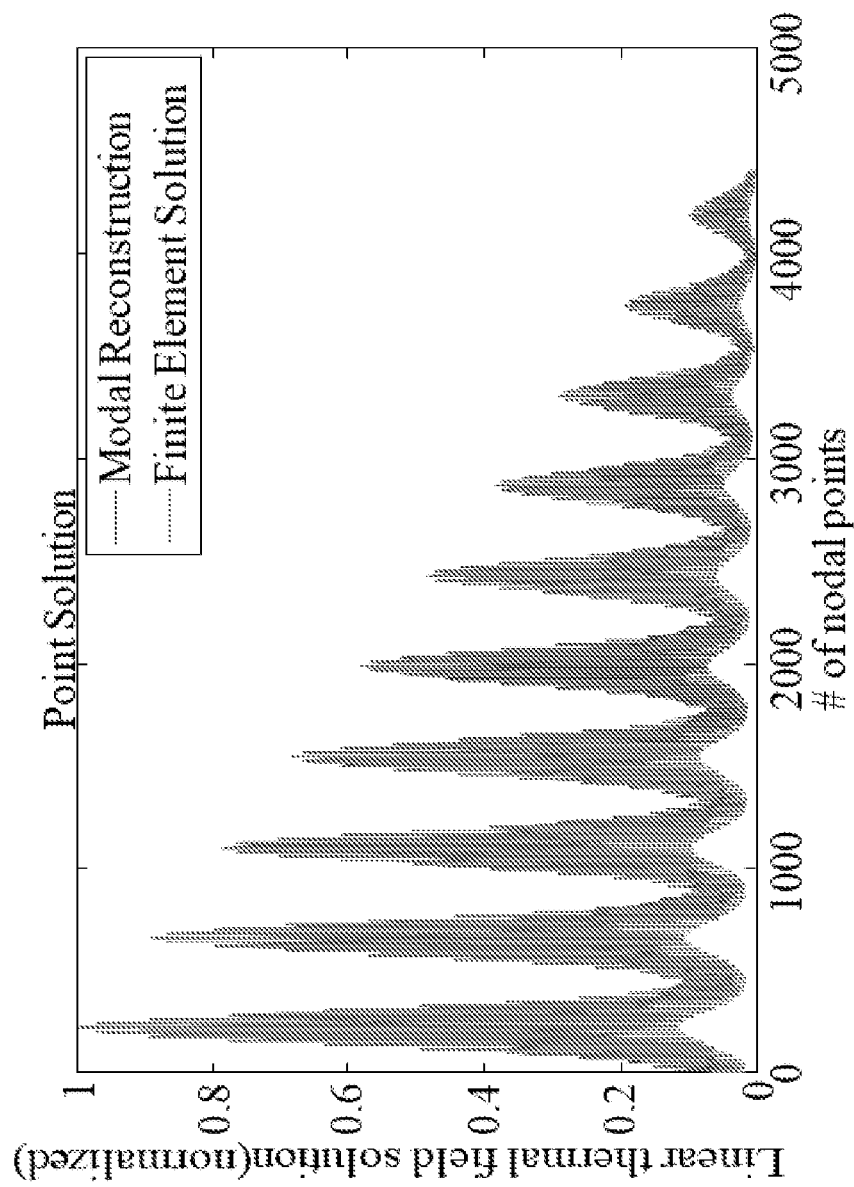
FIG. 30 illustrates nodal point by point match of a finite element solution for a thermal field with a Modal reconstructed (eigensolver) solution for a Gaussian point energy source; error is negligibly small (<0.1%) and the results lie right on top of each other.
Figure 31:
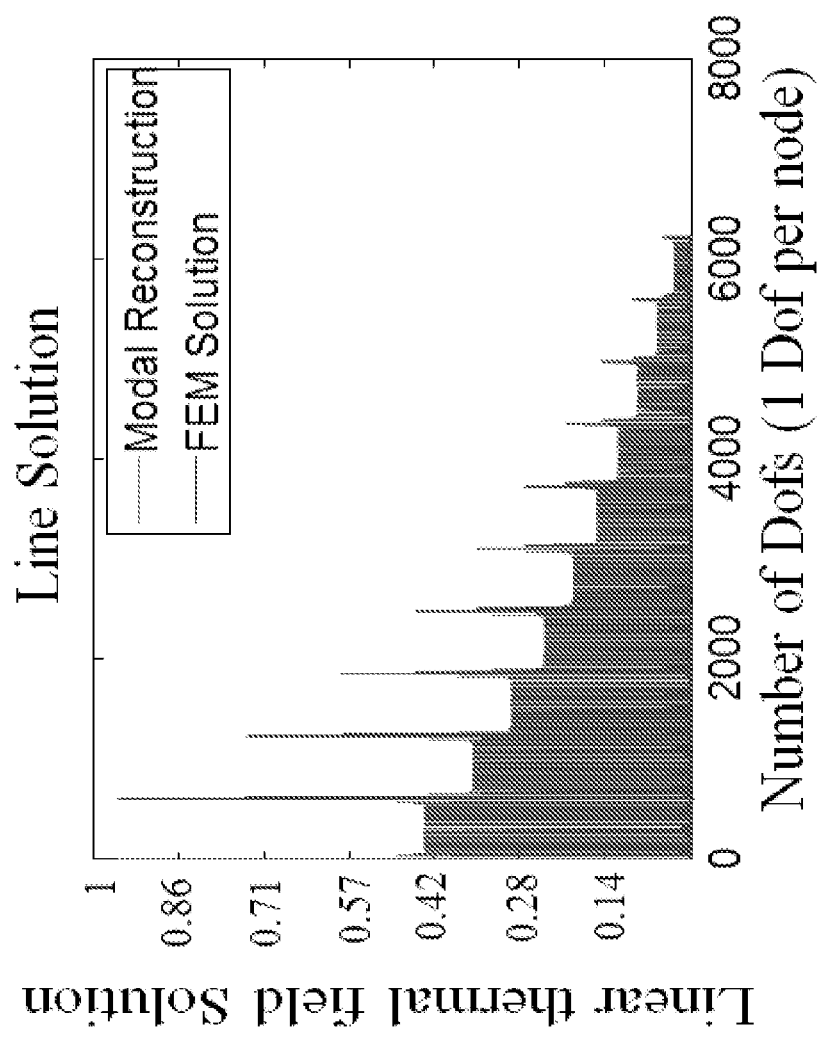
FIG. 31 illustrates error for a line source, which is still good.
Figure 32:
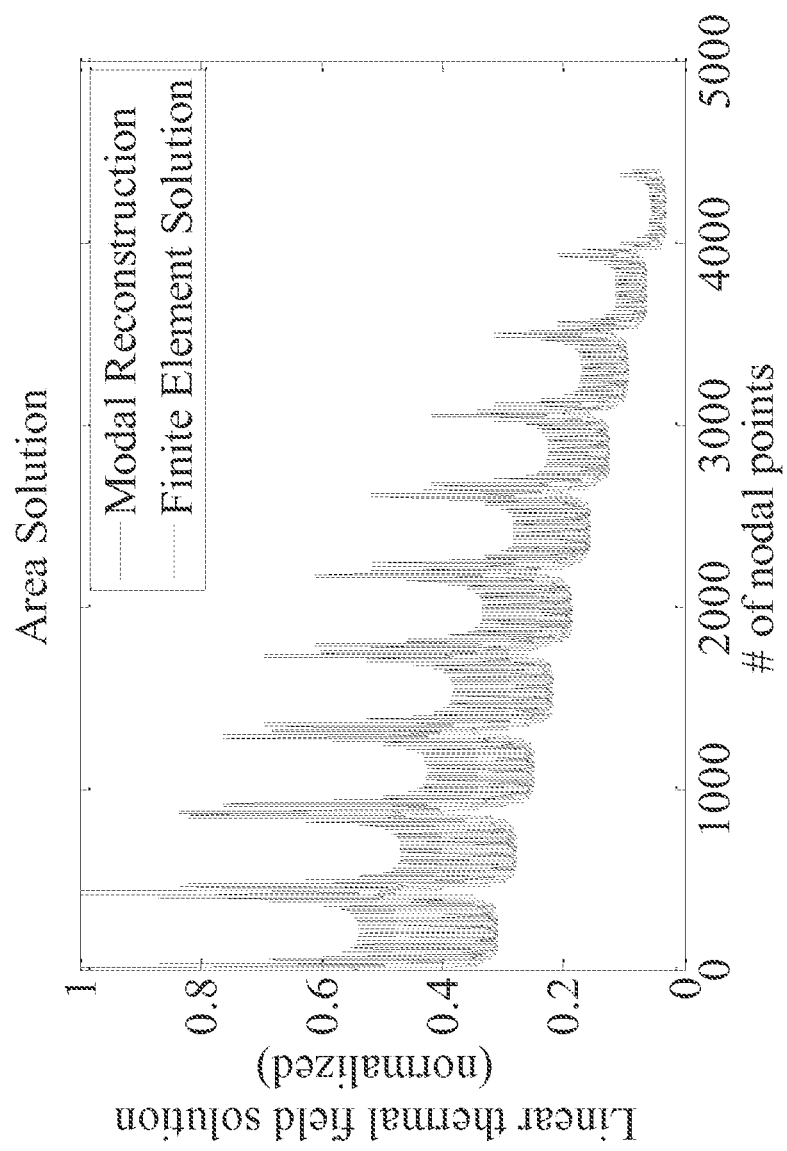
FIG. 32 illustrates error for a constant area source.

In the case of Ti6Al4V, accurate thermomechanical solutions can be calculated almost instantaneously 4 or more layers away from the point of laser exposure using a limited number of modes. The problem with 2.5 dimensional extrusion of the solid geometry in the powder bed due to its scalar nature of eigenmode decay equations turns out to be extremely uncomplicated. In terms of the amount of error introduced using this approach, is negligibly small for a point energy source (FIG. 30) while the speed improvement is substantial. For cases of a line energy source (FIG. 31), the match is good but not excellent. For cases of a constant area source, due to unrefined orthogonal modes the trend of solutions is replicated but the error is much worse when compared to a point energy-source solution (FIG. 32). The use of Arnoldi and other methods for refinement of modes for this scenario, which is relevant for manufacturing processes in which point sources of energy are not used. For focused energy sources such as SLM and EBM, this approach completely eliminates the need to re-compute thermomechanical fields using fine-scale FFDAMRD for the problem domains which are more than a few layers away from the laser; thus eliminating the vast majority of the computational time necessary to simulate real parts (which are made up of thousands or tens of thousands of layers).

Figure 33:
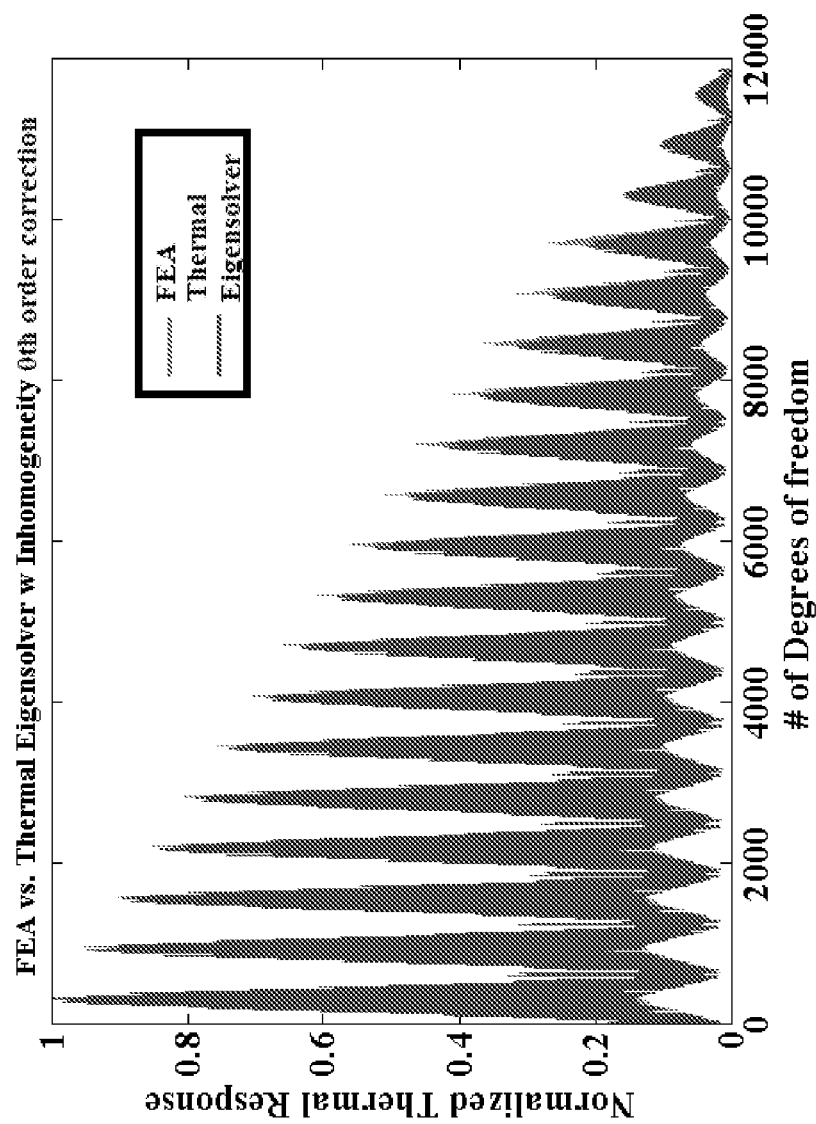
FIG. 33 illustrates FEA and thermal eigensolver with $0^{th}$ order correction one-on-one DOF comparison using homogenous modes for computation.
Figure 34:
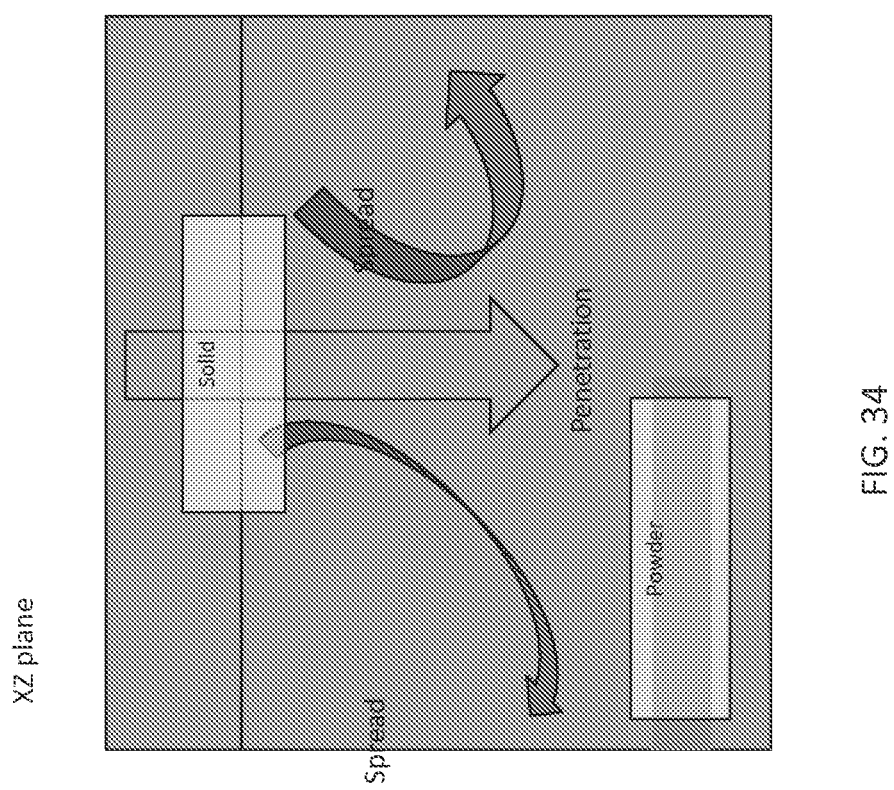
FIG. 34 illustrates the inhomegenous case for the data in FIG. 33.
Figure 35:
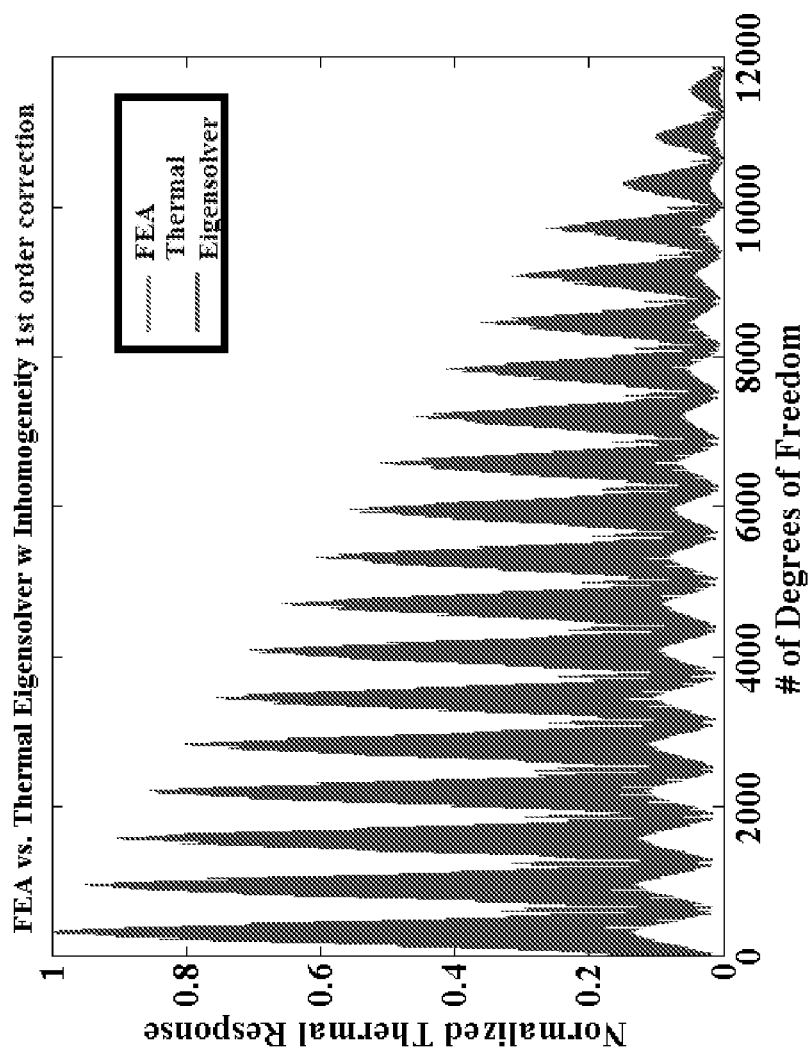
FIG. 35 illustrates FEA and Thermal eigensolver with 1st order correction one-on-one DOF comparison using homogenous modes for computation.

For problems which do not have an extruded geometry from the top surface to the bottom surface, the solution becomes intractable since the extruded geometry eigensolutions could no longer be used for these cases and they require further mathematical corrections to account for the inhomogeneity. The finite element solution has been superposed on extruded homogenous eigensolution in FIG. 33 for a case shown in FIG. 34. It can be clearly seen that there exists a significant mismatch between the finite element and thermal eigensolver results for this case if no correction is implemented. Using only a first order correction, the results match with a relative error of 0.14%. The FEM results superposed on the thermal eigensolver results with first order corrections is shown in FIG. 35. The eignesolver solution is ~8000 times for this small problem size. The computational advantage will be even greater on larger problems as the matrix size grows exponentially with number of layers.

Eigenvalues have been identified and reconstructed for the thermal case only. A parallel architecture is required for solving the deformation problem using our dislocation density based crystal plasticity (DDCP) finite element solver. For DDCP, the eigenvalue problem has orders of magnitude higher complexity than for the FFDAMRD thermal problem and will thus require a very fine refinement to compute the dispersion matrix and penetration matrices correctly in order to obtain the propagator matrix for its eigenvalue determination.

Multi-Rank Updates

Figure 36:
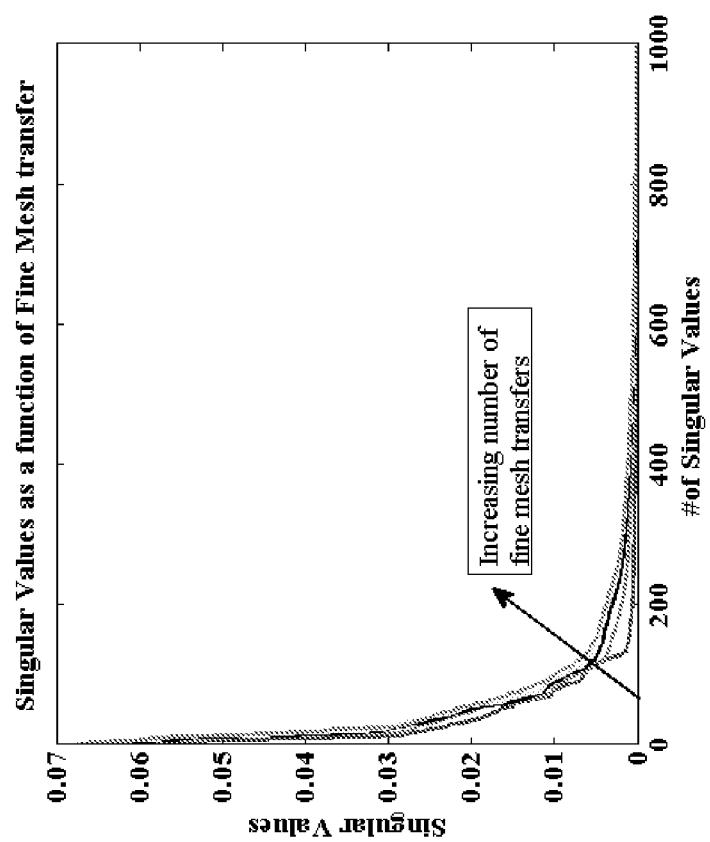
FIG. 36 plots singular values as a function of fine mesh transfers.
Figure 37:
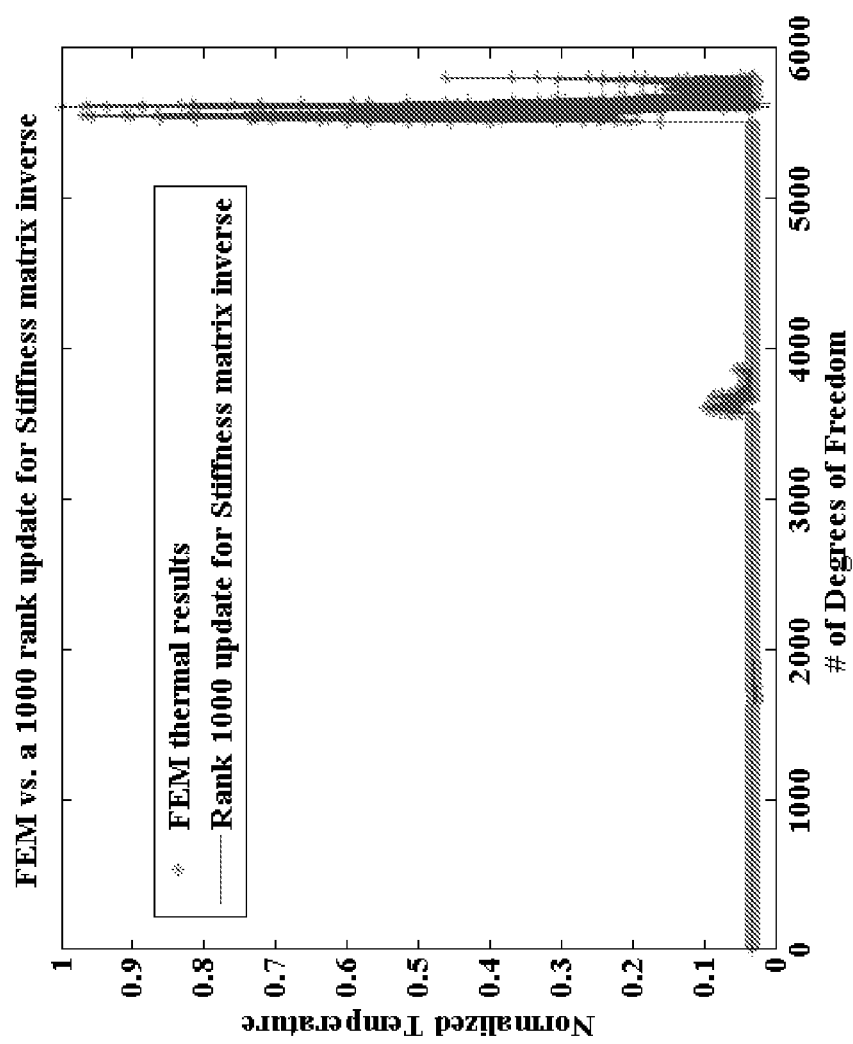
FIG. 37 plots thermal distributions computed by performing the LU/Cholesky Decomposition of the full thermal stiffness matrix against a much lower rank update of the inverse.

In order to use the multi-rank updates for computing the approximate inverse of the changing thermal stiffness as a function of offsets, the convergent singular values have been plotted against the total number of singular values in FIG. 36. It is clear from this illustration that the singular values converge as a function of increasing number of mesh transfers. Another important aspect from FIG. 36 is that the singular values follow a steeping decreasing curve similar to a rectangular hyperbola and hence the number of singular values required for computing the inverse could be less than the full size of the matrix and this ensures even more savings in computational effort and time along with convergence of the singular values as a function of number of offsets. A one-to-one match between the thermal distributions obtained using the LU decomposition and a much lower rank 1000 update of the thermal stiffness (including the dynamic C) has been shown in FIG. 37.

Multi-Order Updates

Figure 38:
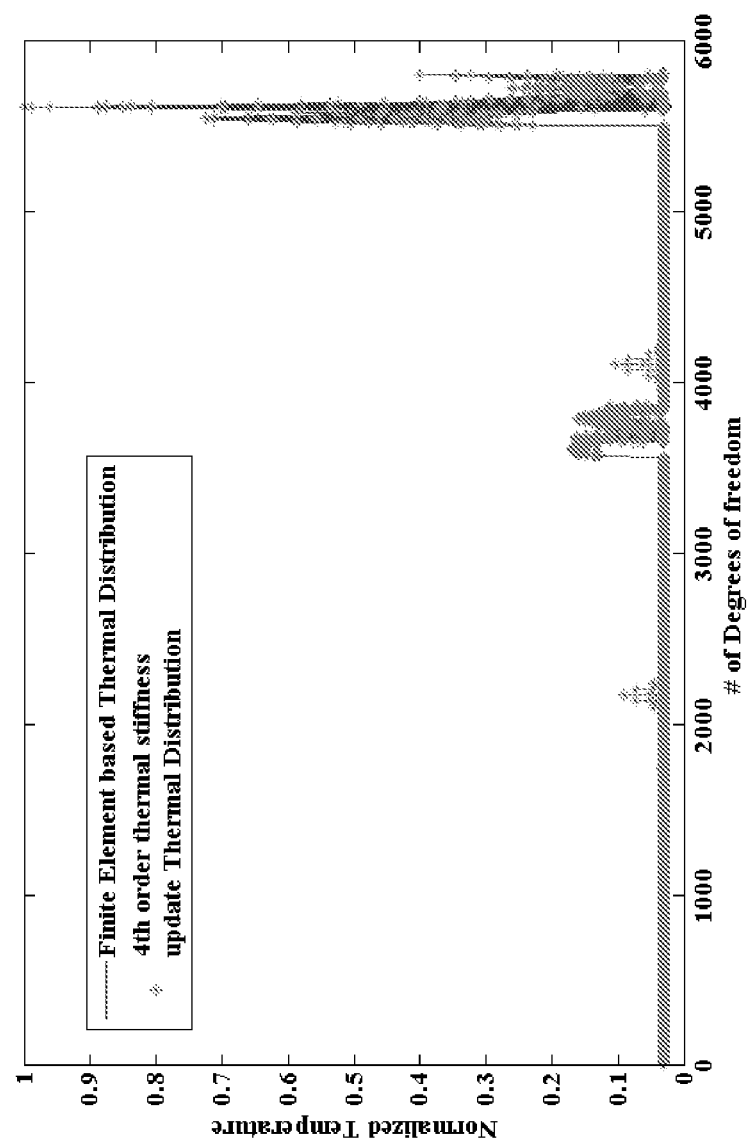
FIG. 38 plots thermal distributions computed by performing the LU/Cholesky Decomposition of the full thermal stiffness matrix against a much lower order update of the inverse.

For using the multi-order updates, the inverse of the thermal stiffness for the current time step has been updated using the thermal stiffness of the previous time step. While multi-rank updates were found to be more beneficial and faster in the case of fine mesh offset transfers, the multi-order updates find more suitability in case of updating the thermal distribution as a function of time steps. A one-to-one thermal DOF comparison using Cholesky factorization in Finite Element and using the $4^{th}$ order thermal stiffness update is shown in FIG. 38. The results are in excellent agreement with the thermal distribution obtained using the finite element method.

While specific embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

The invention claimed is:

1. A modeling and simulation software product in a control system for an additive manufacturing process, comprising code stored on a non-transient medium, the product comprising code for:

generating a coarse scale mesh to model coarse scale changes to at least a portion of a material substrate upon application of a stimulus for manufacturing an article;

performing multi-scale refinement or de-refinement operations for an area within boundaries of the coarse scale mesh in response to movement or changes of the stimulus, the multi-scale refinement or de-refinement operations comprising:

identifying the area within the boundaries of the coarse scale mesh where the stimulus has an effect on the article within the boundaries of the coarse scale mesh, generating a fine scale mesh for the area within the boundaries of the coarse scale mesh, the fine scale mesh configured to model changes that are finer in scale than the coarse scale changes, the changes that are finer in scale being attributed to the application of the stimulus on the article, wherein the fine scale mesh is based on a different fine scale mesh generated at a different time point, and replacing a portion of the coarse scale mesh corresponding to the area within the boundaries of the coarse scale mesh with the fine scale mesh wherein a nodal connectivity between the fine scale mesh and a separate portion of the coarse scale mesh is determined based on one or more stiffness matrices computed for the different fine scale mesh generated at the different time point; and generating, based on the multi-scale refinement or de-refinement operations, a simulated output representing the stimulus having the effect on the article.

2. The product of claim 1, wherein the changes that are finer in scale than the coarse scale changes comprise changes to at least one of geometry, internal features and microstructures of the article.

3. The product of claim 1, comprising code for solving directional finite element problems to determine an effect of the stimulus on the article within the boundaries of the coarse scale mesh using a numerical technique for dimensional reduction of physical field variable/tensor problems by computing Eigenmodes of a transformed non-dispersive stiffness matrix.

4. The product of claim 3, wherein the transformed non-dispersive stiffness matrix comprises a functional form of a $B^{-1} A$ equation where B indicates a first stiffness matrix of the one or more stiffness matrices between successive planes perpendicular to the direction in which the stimulus has been applied and A indicates an in-plane stiffness matrix of the corresponding plane.

5. The product of claim 4, comprising code for conducting multiscale homogenization of the coarse scale and fine scale meshes using periodic and higher order boundary conditions (PHOBC) at scale of the fine mesh based on dominant Eigenmodes computed at scale of the coarse mesh.

6. The product of claim 3, comprising code for conducting multiscale homogenization of the coarse scale and fine scale meshes using periodic and higher order boundary conditions (PHOBC) at scale of the fine mesh based on dominant Eigenmodes computed at scale of the coarse mesh.

7. The product of claim 6, wherein the PHOBCs are calculated from a Taylor expansion of dominant Eigenmodes.

8. The product of claim 7, further comprising computing a homogenized thermomechanical constitutive model computed from the PHOBCs.

9. The product of claim 8, wherein the constitutive model is used to iteratively determine the effect of the stimulus on the coarse scale mesh to model macroscopic Eigenmodes for multi-scale and/or non-linear phenomena.

10. The product of claim 1, wherein said performing multi-scale refinement or de-refinement operations further comprises solving simultaneous equations by:

calculating a stiffness matrix for initial material properties of the article;

assigning an initial value of a tolerance based on existing values in the stiffness matrix;

calculating an E matrix, in a Cholesky decomposition, using different criteria to compute each successive value in the Cholesky matrix such that the E matrix has information of which entities corresponding to a lower triangular matrix of the Cholesky matrix are to be computed;

determining a number of iterations for the value of the tolerance;

updating the tolerance by iteratively adjusting the tolerance until an error is within a predetermined acceptable limit; and subsequently using the E matrix for a next iteration for the same or a different stiffness matrix for the same coarse scale mesh with different material properties in case of any nonlinearity.

11. A manufacturing system including the product of claim 1, wherein the manufacturing system includes a tool to apply the stimulus, and a controller controlled by the product of claim 1 to move and/or modify output of the tool.

12. The system of claim 11, wherein the system is an additive manufacturing system, and the tool is a laser.

13. The system of claim 12, wherein the fine scale mesh characterizes a melt pool region of the article.

14. The system of claim 13, comprising Eigensolvers that predict thermo-mechanical variables away from the melt pool region.

15. The system of claim 14, wherein the Eigensolvers further predict areas where thermomechanical gradients are lower than within an area of stimulus.

16. The system of claim 14, comprising a banded vectorization that truncates a neighborhood of any nodal point used for computation of thermomechanical fields by extracting a lower triangular matrix from a stiffness matrix such that row-wise multiplication of any two lower triangular matrix vectors is less than a predetermined threshold then an entity corresponding to the lower triangular matrix is assumed to be zero and is not computed.

17. A material or space modeling system for modeling material or space subjected to an additive manufacturing process that uses a stimulus upon the material or space, the system comprising:

a memory storing instructions; and one or more processors coupled to the memory that execute the instructions to obtain physical property data about the material or space; and generate a coarse scale mesh to model coarse scale changes to at least a portion of the material or space upon application of the stimulus on the material or space; and perform multi-scale refinement or de-refinement operations for an area within the boundaries of the coarse scale mesh in response to movement or changes of the stimulus on the material or space, the multi-scale refinement or de-refinement operations comprising:

identifying the area within the boundaries of the coarse scale mesh where the stimulus has an effect on the material or space within the boundaries of the coarse scale mesh, generating a fine scale mesh for the area within the boundaries of the coarse scale mesh, the fine scale mesh configured to model changes that are finer in scale than the coarse scale changes, the changes that are finer in scale being attributed to the application of the stimulus on the material or space, wherein the fine scale mesh is based on a different fine scale mesh generated at a different time point, and replacing a portion of the coarse scale mesh corresponding to the within the boundaries of the coarse scale mesh area with the fine scale mesh wherein a nodal connectivity between the fine scale mesh and a separate portion of the coarse scale mesh is determined based on one or more stiffness matrices computed for the different fine scale mesh generated at the different time point; and generate, based on the multi-scale refinement or de-refinement operations, a simulated output representing the stimulus having the effect on an article manufactured using the additive manufacturing process, the simulated output being generated at least in part by sparsely propagating effects of the stimulus on the material or space through the coarse scale mesh using stiffness matrices characterizing the coarse scale mesh.

18. A computer program product comprising computer executable instructions stored on a non-transitory computer readable medium that, when executed, cause one or more processing devices to perform operations comprising:

characterizing a material or space with a finite element mesh, wherein generating the finite element mesh comprises:

generating a coarse scale mesh to model coarse scale changes to at least a portion of a material substrate upon application of a stimulus for manufacturing an article; and performing multi-scale refinement or de-refinement operations for an area within boundaries of the coarse scale mesh in response to movement or changes of the stimulus, the multi-scale refinement or de-refinement operations comprising:

identifying the area within the boundaries of the coarse scale mesh where the stimulus has an effect on the article within the boundaries of the coarse scale mesh, generating a fine scale mesh for the area within the boundaries of the coarse scale mesh, the fine scale mesh configured to model changes that are finer in scale than the coarse scale changes, the changes that are finer in scale being attributed to the application of the stimulus on the article, wherein the fine scale mesh is based on a different fine scale mesh generated at a different time point, and replacing a portion of the coarse scale mesh corresponding to the area within the boundaries of the coarse scale mesh with the fine scale mesh wherein a nodal connectivity between the fine scale mesh and a separate portion of the coarse scale mesh is determined based on one or more stiffness matrices computed for the different fine scale mesh generated at the different time point;

generating, based on the multi-scale refinement or de-refinement operations, a simulated output representing the effect of the stimulus on the article, wherein generating the simulated output comprises:

setting and solving an Eigenvalue problem of thermomechanical propagator matrices to determine orthogonal basis functions for thermomechanical fields of the material or space in response to the stimulus;

truncating fields in mesh in planes distant from the stimulus; and propagating the thermomechanical field through the finite element mesh.

19. A modeling and simulation system for a manufacturing process, comprising:

a memory storing instructions; and one or more processors coupled to the memory to execute the instructions to:

generate a multi-level mesh to model material or space such that the mesh provides a fine mesh that can be moved in a coarse mesh without recalculating the fine mesh, wherein the multi-level mesh is generated by:
  generating a coarse scale mesh to model coarse scale changes to at least a portion of the material or space upon application of a stimulus for manufacturing an article;
  performing multi-scale refinement or de-refinement operations for an area within boundaries of the coarse scale mesh in response to movement or changes of the stimulus, the multi-scale refinement or de-refinement operations comprising:
    identifying the area within the boundaries of the coarse scale mesh where the stimulus has an effect on the article within the boundaries of the coarse scale mesh,
    generating a fine scale mesh for the area within the boundaries of the coarse scale mesh, the fine scale mesh configured to model changes that are finer in scale than the coarse scale changes, the changes that are finer in scale being attributed to the application of the stimulus on the article, wherein the fine scale mesh is based on a different fine scale mesh generated at a different time point, and
    replacing a portion of the coarse scale mesh corresponding to the area within the boundaries of the coarse scale mesh with the fine scale mesh wherein a nodal connectivity between the fine scale mesh and a separate portion of the coarse scale mesh is determined based on one or more stiffness matrices computed for the different fine scale mesh generated at the different time point; and
  decompose the multi-level mesh to simulate thermo-mechanical effects based upon location of the fine mesh.

20. The system of claim 19, wherein the one or more processors further execute the instructions to apply periodic and higher order boundary conditions (PHOBC) on the fine mesh.

21. The system of claim 19, wherein the one or more processors further execute the instructions to propagate a thermal event in the coarse mesh as a plurality of orthogonal forward waves.

22. The system of claim 19, wherein the one or more processors further execute the instructions to update the multi-scale mesh via transition of information between the coarse and fine scale meshes.

* * * * *